(12) United States Patent
Hunstable et al.

(10) Patent No.: US 12,009,717 B2
(45) Date of Patent: *Jun. 11, 2024

(54) MULTI-TUNNEL ELECTRIC MACHINE

(71) Applicant: Linear Labs, Inc., Granbury, TX (US)

(72) Inventors: Fred E. Hunstable, Granbury, TX (US); Michael Van Steenburg, Granbury, TX (US); Andrei V. Popov, Granbury, TX (US)

(73) Assignee: Linear Labs, Inc., Granbury, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/962,076

(22) Filed: Oct. 7, 2022

(65) Prior Publication Data

US 2023/0179057 A1    Jun. 8, 2023

Related U.S. Application Data

(63) Continuation of application No. 17/003,905, filed on Aug. 26, 2020, now Pat. No. 11,502,570.

(60) Provisional application No. 62/989,653, filed on Mar. 14, 2020, provisional application No. 62/958,213, filed on Jan. 7, 2020, provisional application No. 62/942,736, filed on Dec. 2, 2019, provisional application No. 62/902,961, filed on Sep. 19, 2019, provisional application No. 62/895,498, filed on Sep. 4, 2019, provisional application No. 62/895,481, filed
(Continued)

(51) Int. Cl.
*H02K 1/27* (2022.01)
*H02K 3/47* (2006.01)
*H02K 3/52* (2006.01)
*H02K 11/30* (2016.01)
*H02K 15/00* (2006.01)
*H02K 15/095* (2006.01)
*H02K 16/02* (2006.01)
*H02K 21/12* (2006.01)
*H02K 21/14* (2006.01)

(52) U.S. Cl.
CPC ............... *H02K 3/47* (2013.01); *H02K 1/27* (2013.01); *H02K 3/522* (2013.01); *H02K 11/30* (2016.01); *H02K 15/0062* (2013.01); *H02K 15/095* (2013.01); *H02K 16/02* (2013.01); *H02K 21/12* (2013.01); *H02K 21/145* (2013.01); *H02K 2201/12* (2013.01); *H02K 2203/12* (2013.01); *H02K 2211/03* (2013.01)

(58) Field of Classification Search
CPC ............ H02K 21/14; H02K 1/02; H02K 3/28; H02K 1/30; H02K 1/14; H02K 21/12; H02K 3/12; H02K 15/08; H02K 1/27; H02K 1/276; H02K 1/12; H02K 1/17; H02K 3/04; H02K 21/24; H02K 1/18; H02K 1/146; H02K 15/0062; H02K 11/30; H02K 21/145; H02K 15/095; H02K 3/522; H02K 11/33; H02K 16/02; H02K 3/47

See application file for complete search history.

(56) References Cited

U.S. PATENT DOCUMENTS 6,891,306 B1 * 5/2005 Soghomonian .......... H02K 1/27
                                                             310/266
2008/0278020 A1* 11/2008 Ley ........................ H02K 21/24
                                                             310/156.01

* cited by examiner

*Primary Examiner* — Leda T Pham
(74) *Attorney, Agent, or Firm* — Run8 Patent Group, LLC; Peter Miller; Alexander Rodriguez

(57) ABSTRACT

Disclosed are various embodiments for an electric machine where the stator is a coil assembly and the rotor is a magnetic toroidal cylindrical tunnel or where the rotor is a coil
(Continued)

assembly and the stator is a magnetic toroidal cylindrical tunnel.

20 Claims, 37 Drawing Sheets

Related U.S. Application Data on Sep. 3, 2019, provisional application No. 62/891,949, filed on Aug. 26, 2019.

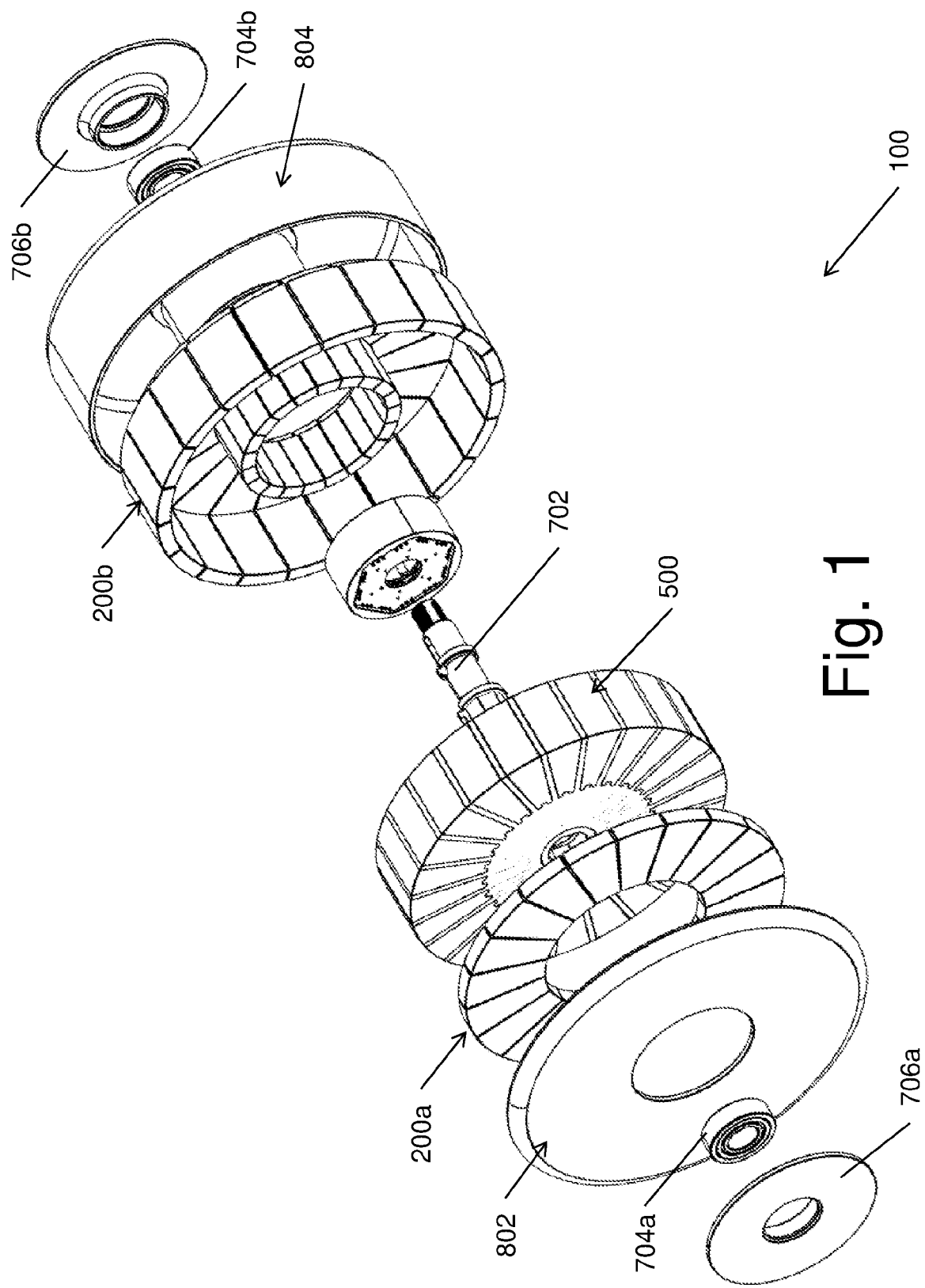

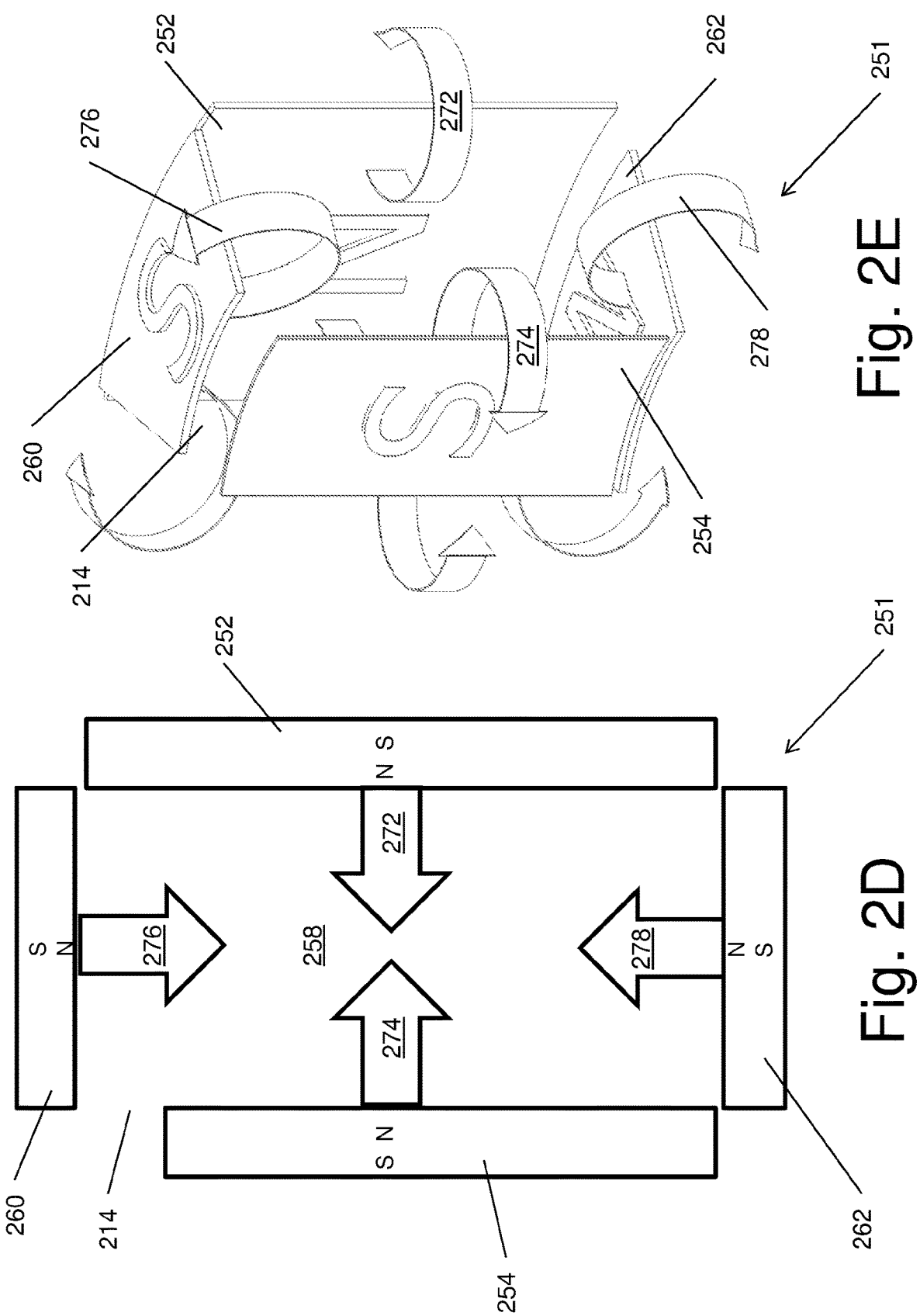

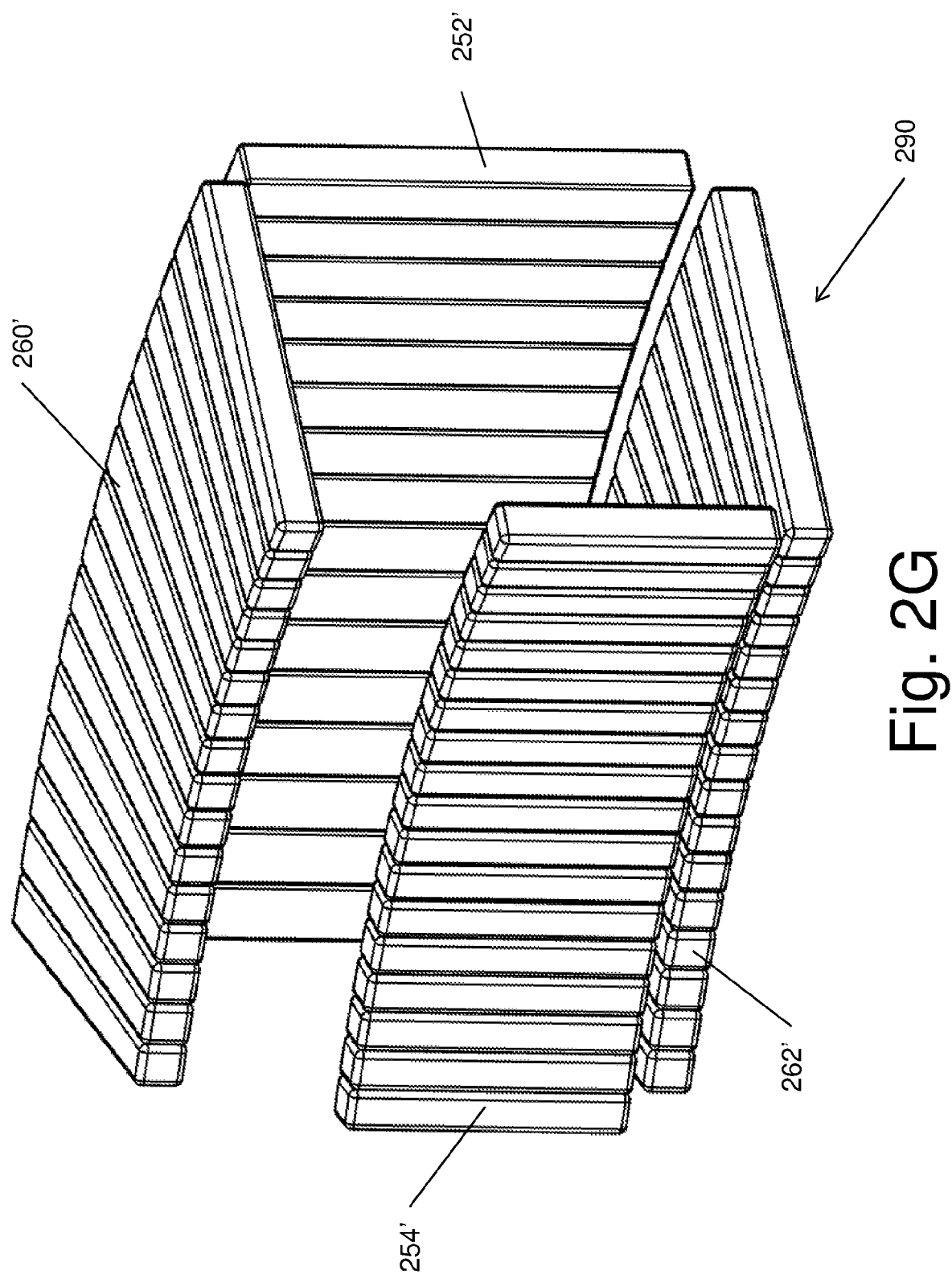

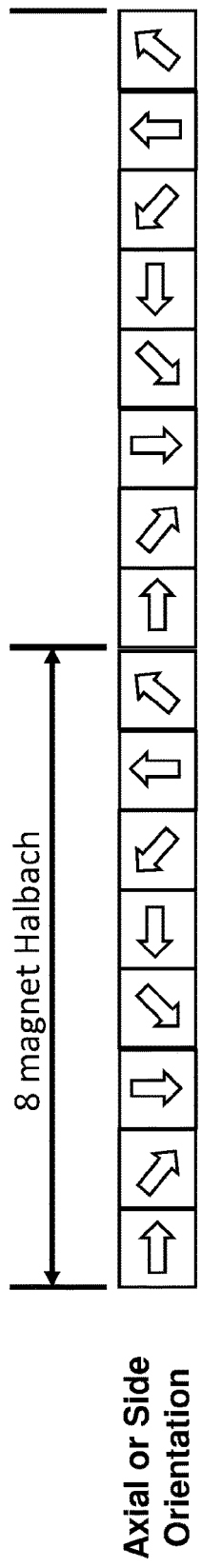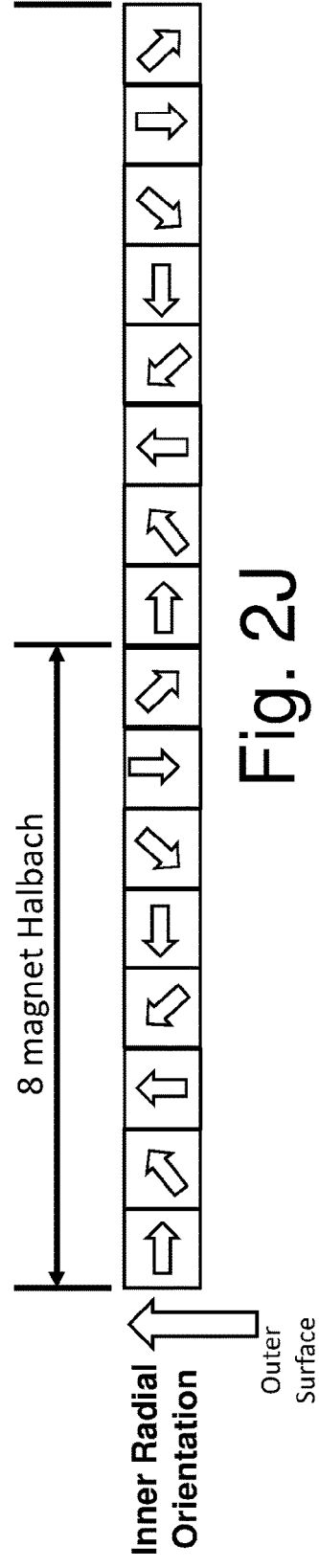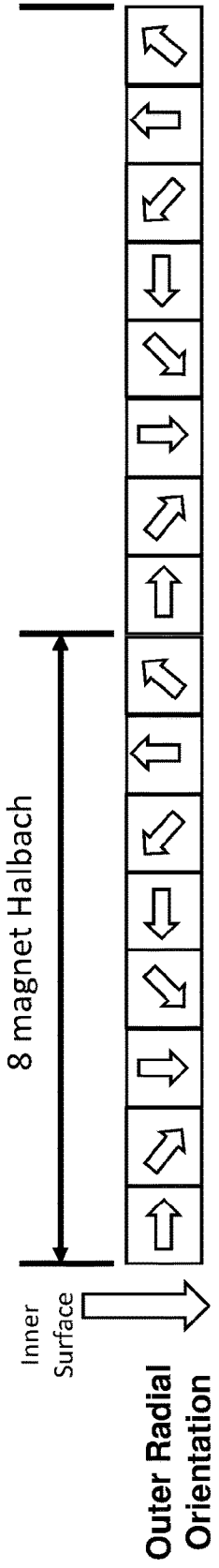

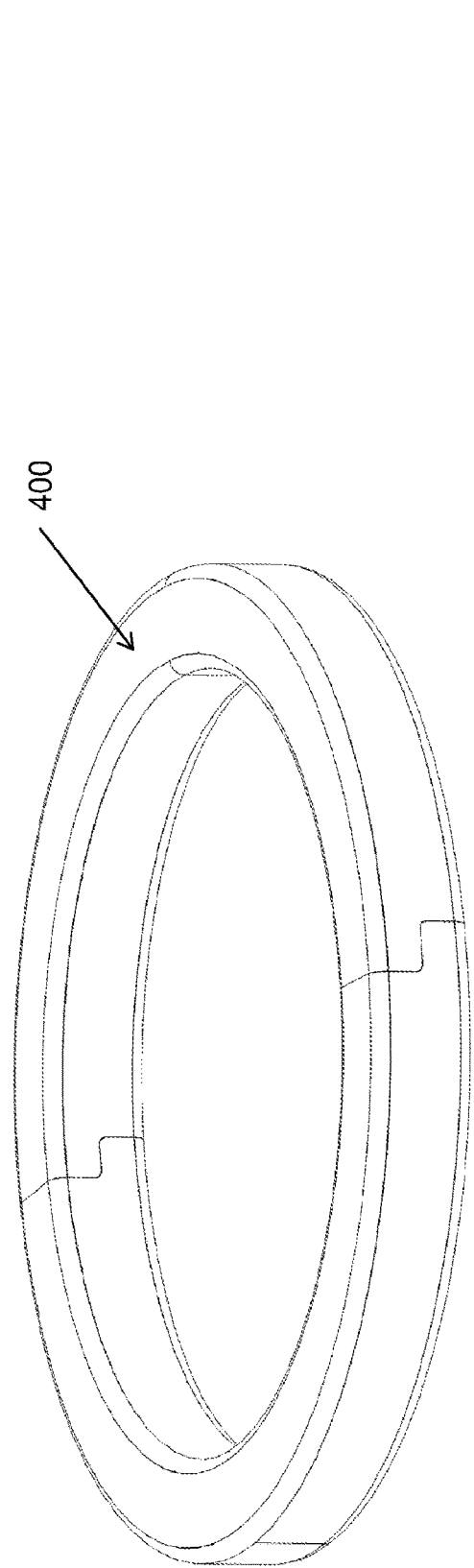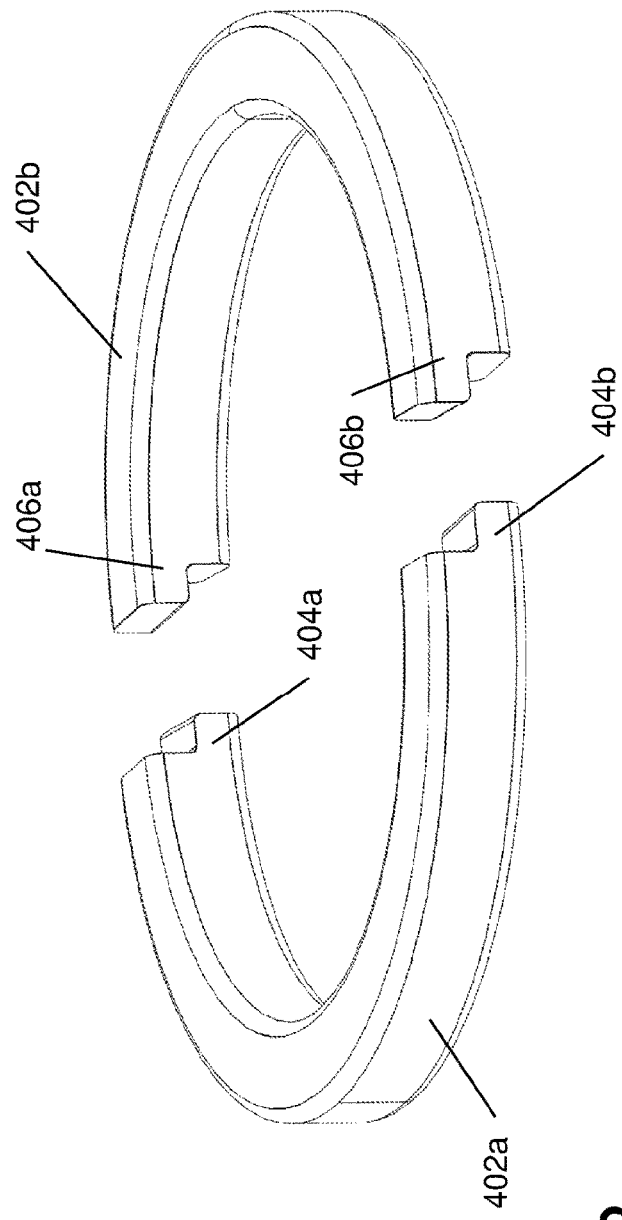
Fig. 3A
Fig. 3B

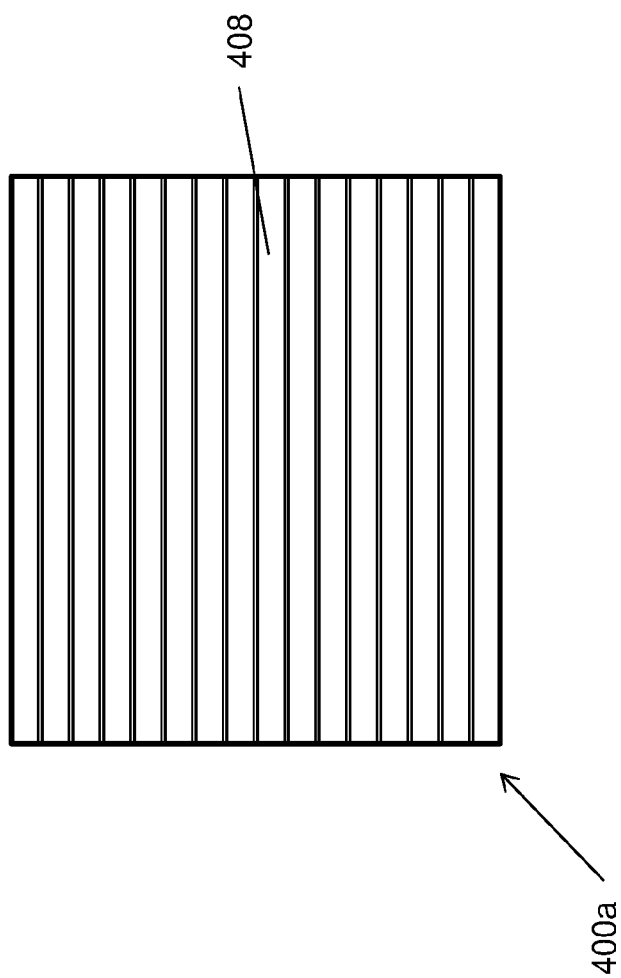

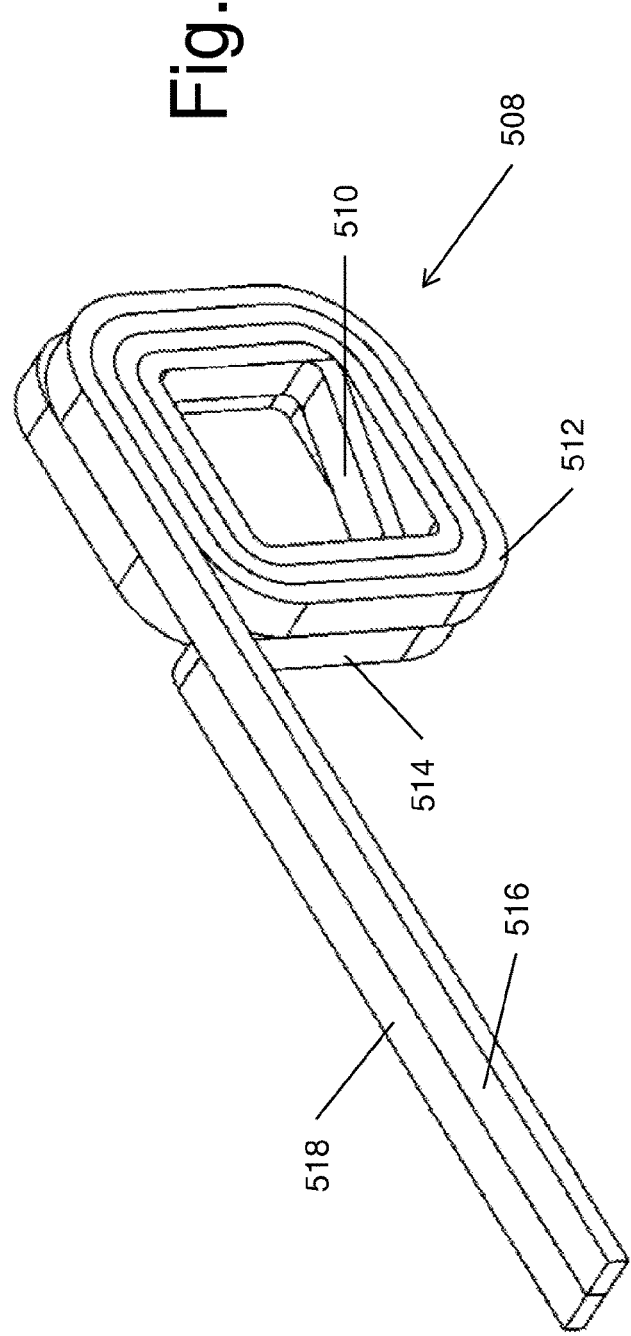
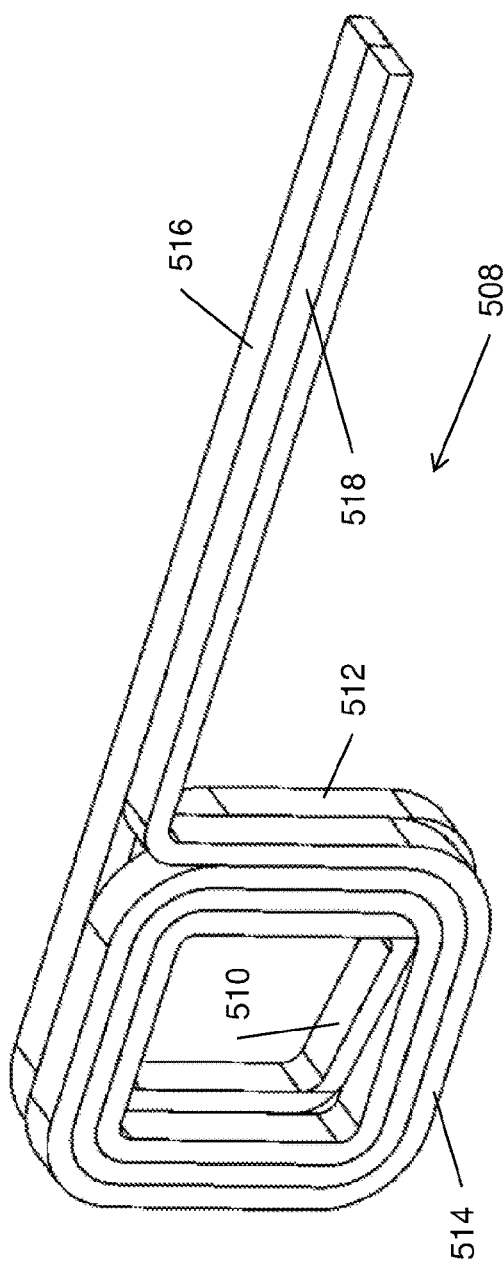

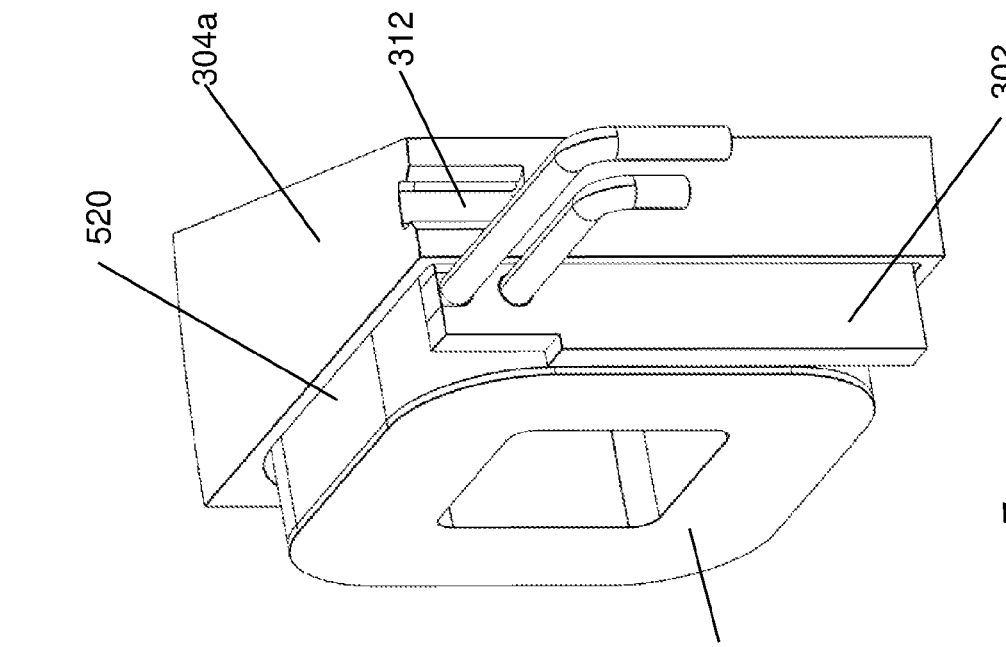
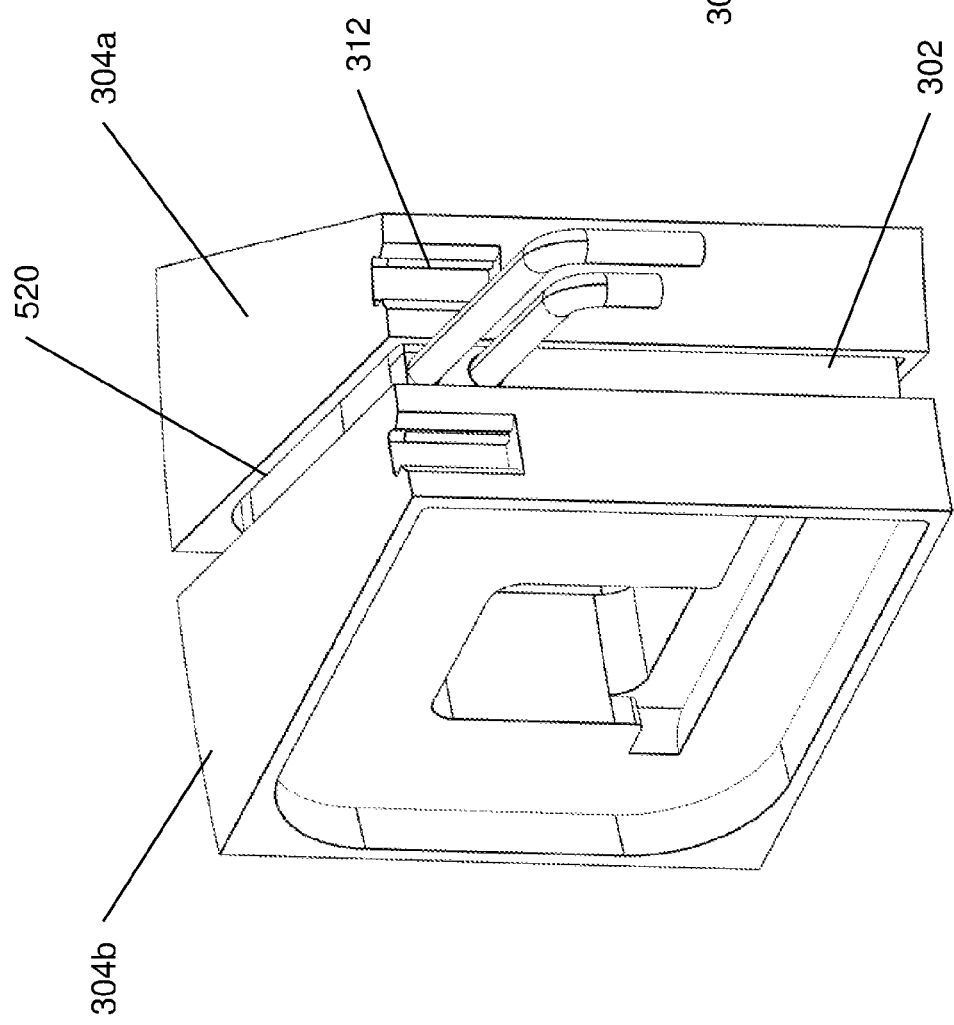
Fig. 5A
Fig. 5B

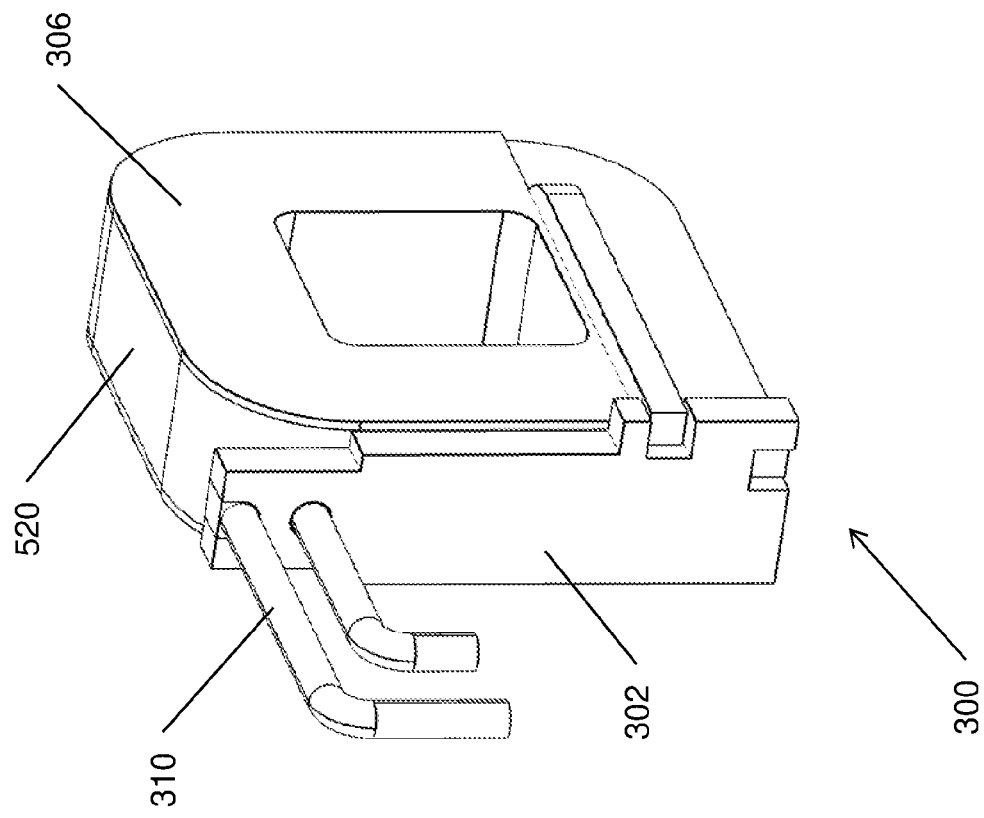
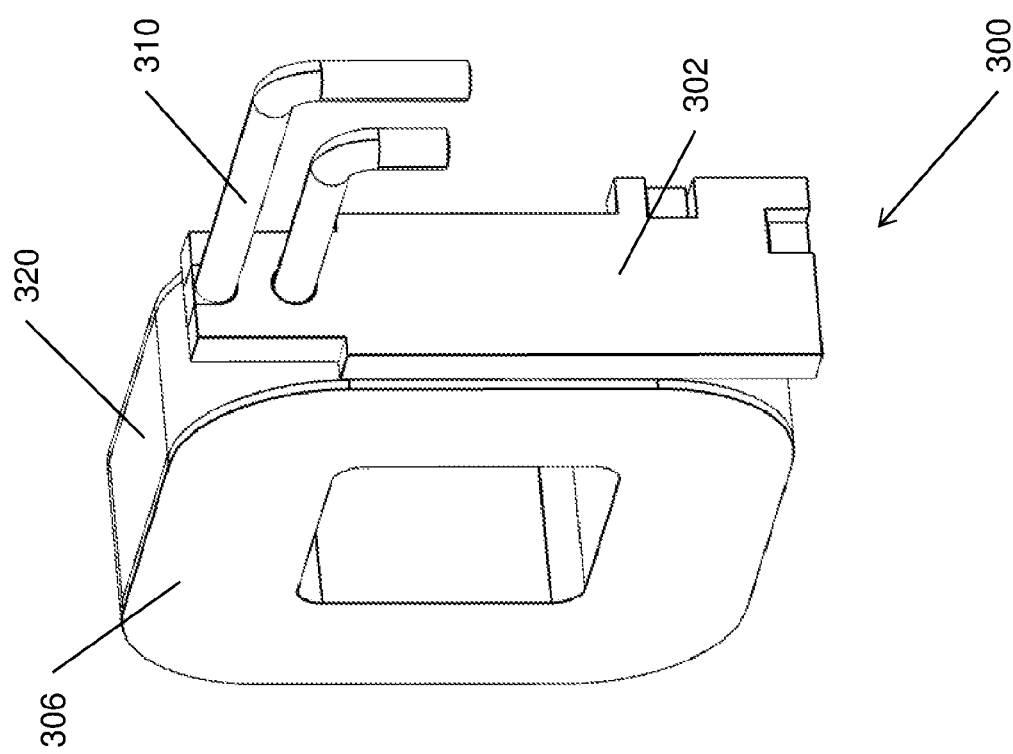
Fig. 5D
Fig. 5C

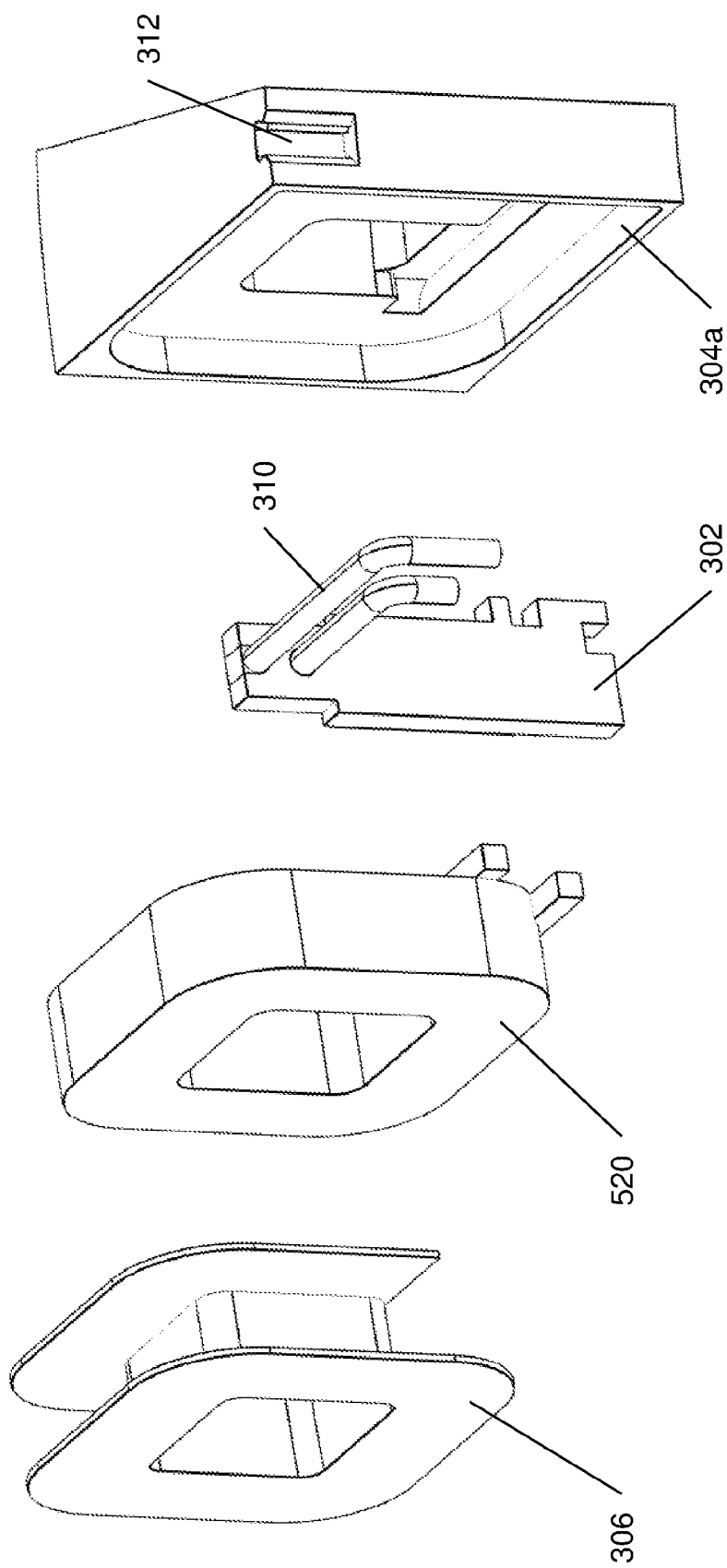

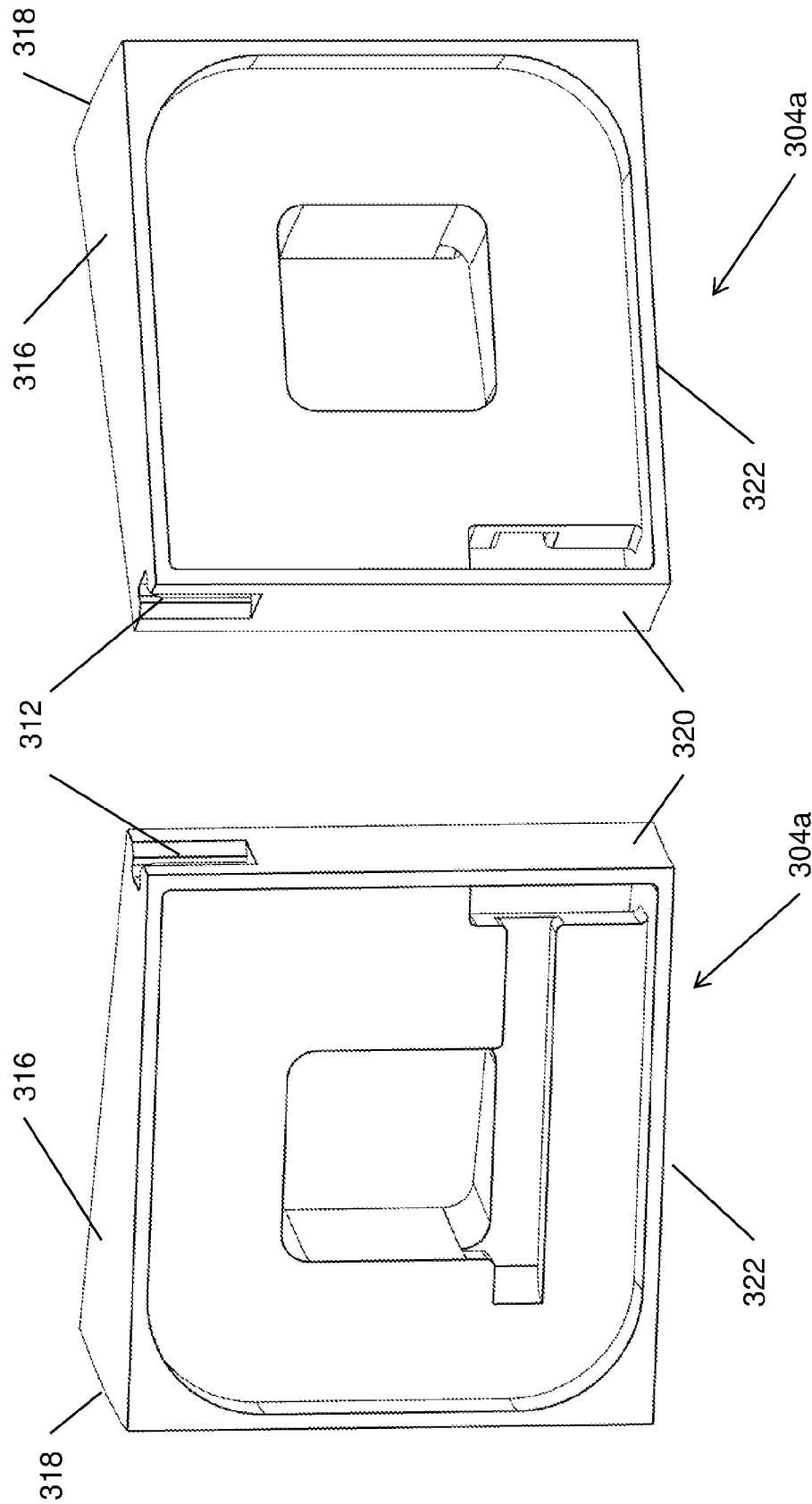

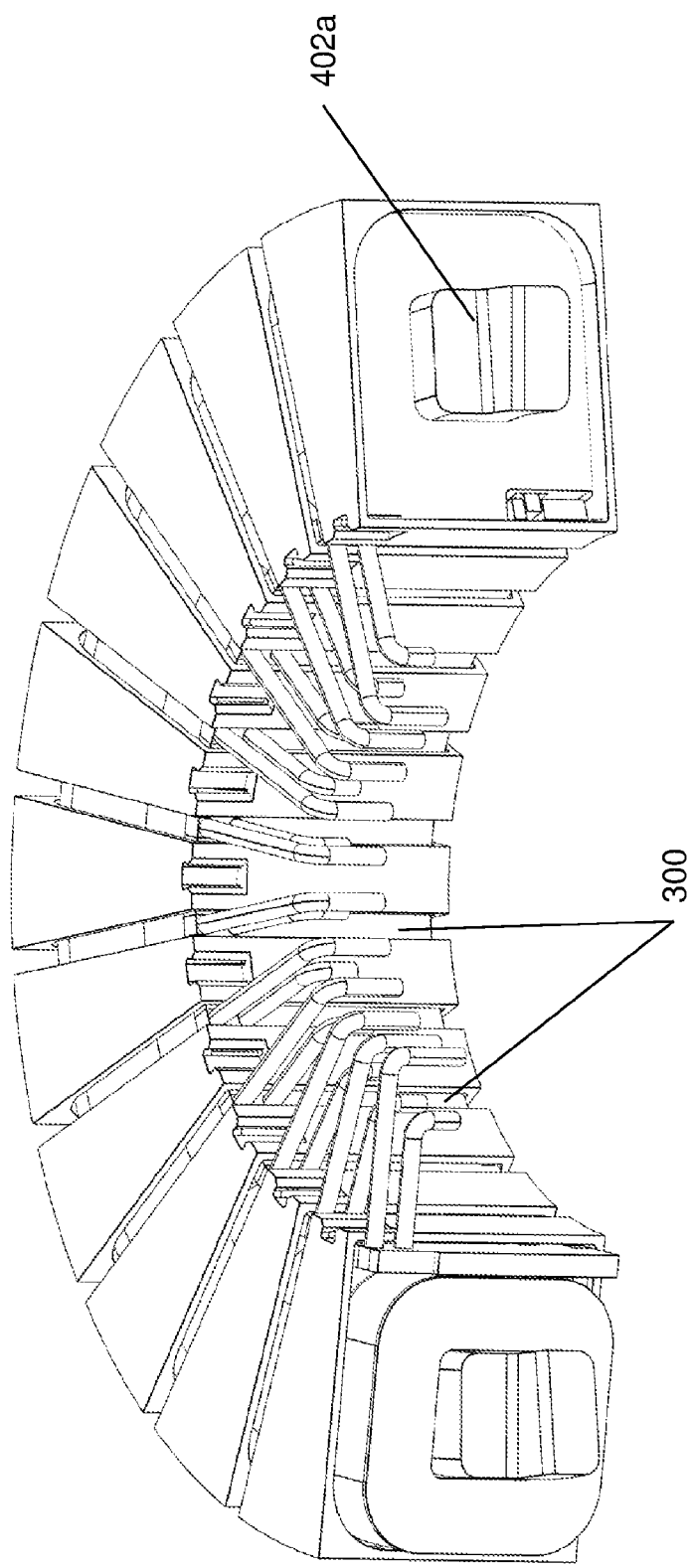

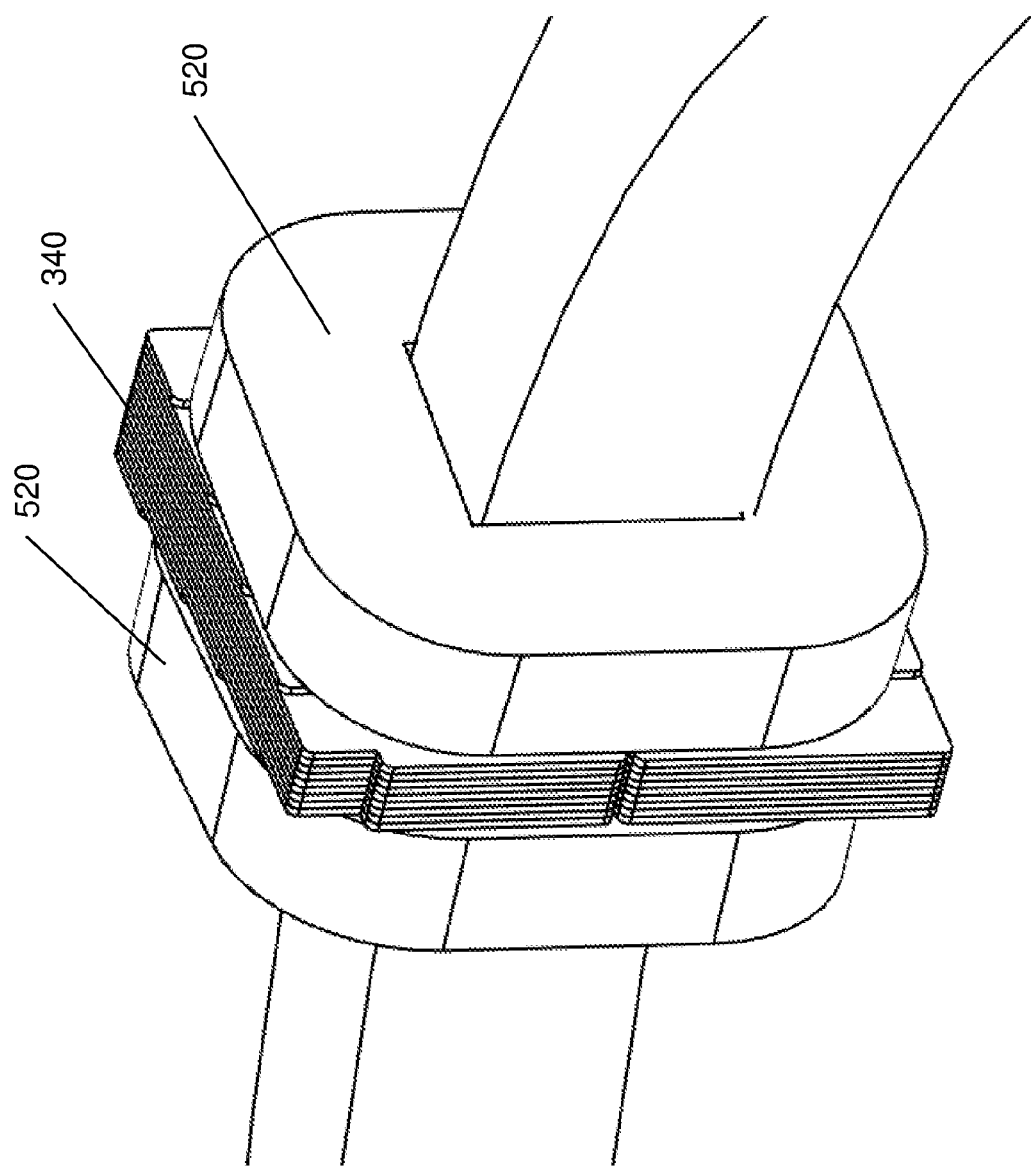

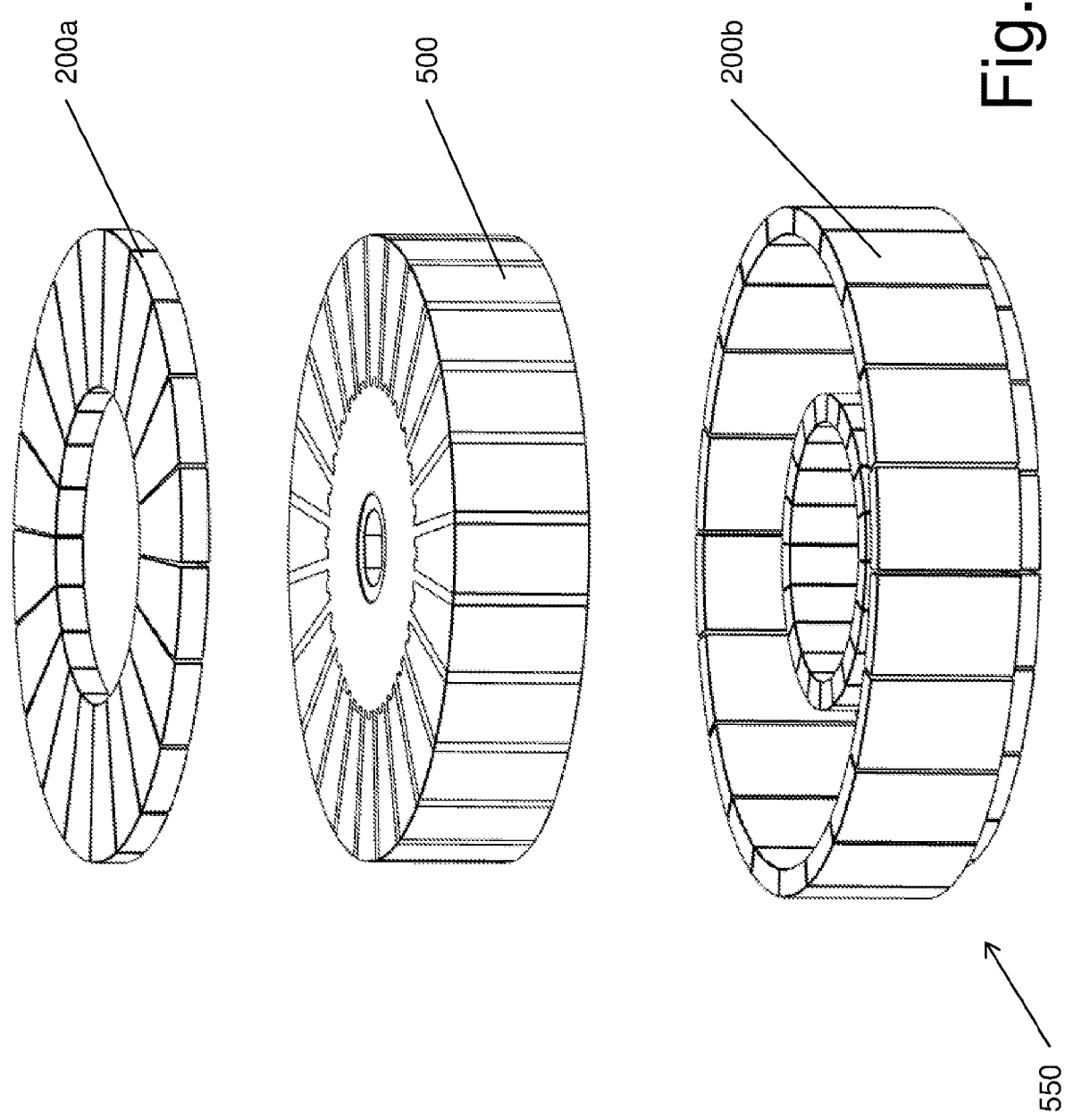

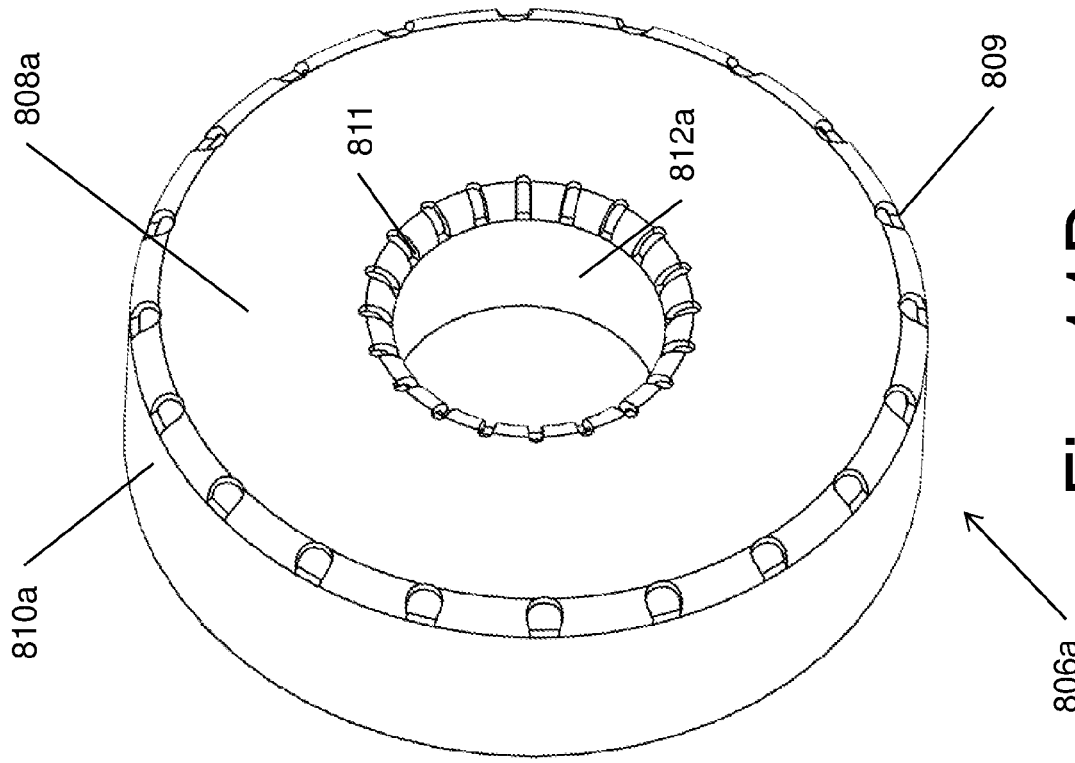
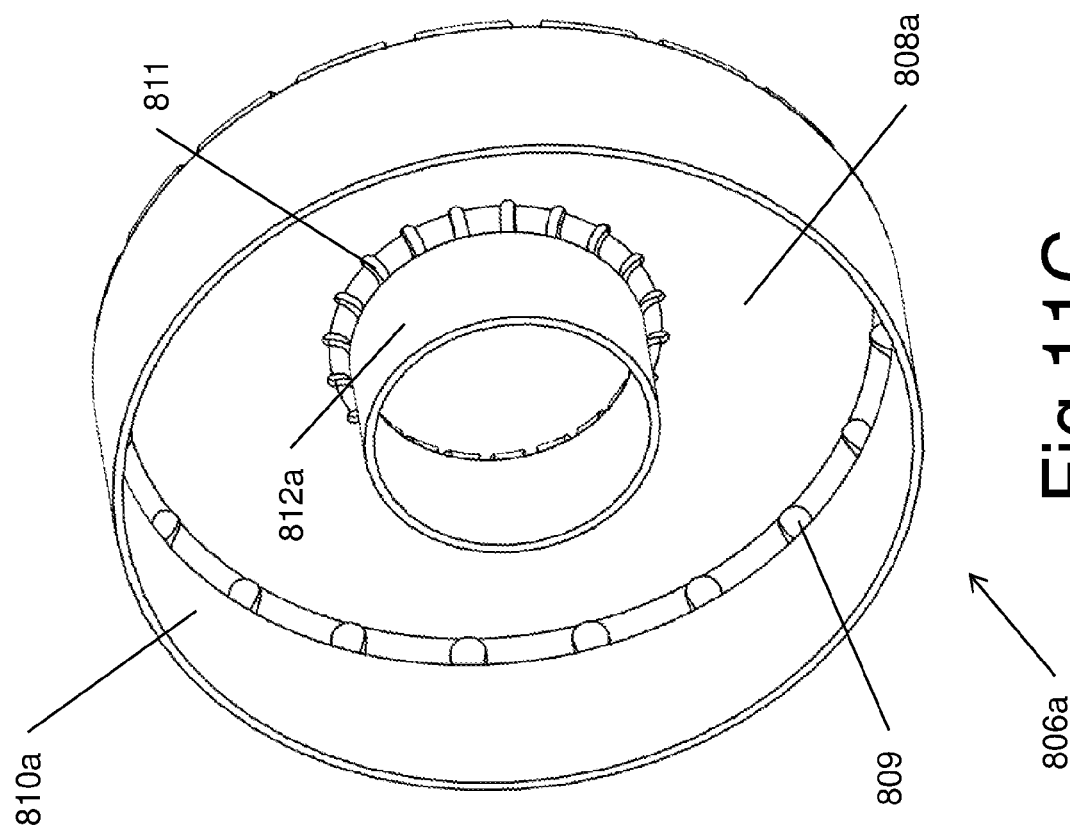

MULTI-TUNNEL ELECTRIC MACHINE

RELATED AND PRIORITY APPLICATIONS

This application is a continuation of U.S. Non-Provisional application Ser. No. 17/003,905, entitled "AN IMPROVED MULTI-TUNNEL ELECTRIC MACHINE" filed on Aug. 26, 2020 which is incorporated in its entirety by this reference.

U.S. Non-Provisional application Ser. No. 17/003,905 claims the priority and benefit of the filing date of the following: U.S. provisional application Ser. No. 62/902,961, entitled "AN IMPROVED DISCRETE COIL ELECTRIC MOTOR/GENERATOR," filed on Sep. 19, 2019; U.S. provisional application Ser. No. 62/942,736, entitled "AN IMPROVED DISCRETE COIL ELECTRIC MOTOR/ GENERATOR," filed on Dec. 2, 2019; U.S. provisional application Ser. No. 62/958,213, entitled "AN IMPROVED MULTI-TUNNEL ELECTRIC MACHINE," filed on Jan. 7, 2020; U.S. provisional application 62/989,653, entitled "AN IMPROVED DISCRETE COIL ELECTRIC MOTOR/ GENERATOR," filed on Mar. 14, 2020; U.S. provisional application Ser. No. 62/891,949, entitled "AN IMPROVED HALBACH ARRAY ELECTRIC MOTOR/GENERATOR," filed on Aug. 26, 2019; U.S. provisional application 62/895,481, entitled "AN IMPROVED HALBACH ARRAY ELECTRIC MOTOR/GENERATOR," filed on Sep. 3, 2019; U.S. provisional application Ser. No. 62/895,498, entitled "AN IMPROVED ELECTRIC MOTOR/GENERATOR," filed on Sep. 4, 2019. The disclosures of which are herein incorporated by reference for all purposes.

TECHNICAL FIELD

The invention relates in general to a new and improved electric motor/generator, and in particular to an improved system and method for producing rotary motion from a electromagnetic motor or generating electrical power from a rotary motion input.

BACKGROUND INFORMATION

Electric motors use electrical energy to produce mechanical energy, very typically through the interaction of magnetic fields and current-carrying conductors. The conversion of electrical energy into mechanical energy by electromagnetic means was first demonstrated by the British scientist Michael Faraday in 1821 and later quantified by the work of Hendrik Lorentz.

A magnetic field is generated when electric charge carriers such as electrons move through space or within an electrical conductor. In a traditional electric motor, a central core of tightly wrapped current carrying material creates magnetic poles (commonly known as the rotor) which spins or rotates at high speed between the fixed poles of a magnet (commonly known as the stator) when an electric current is applied. The central core is typically coupled to a shaft which will also rotate with the rotor. The shaft may be used to drive gears and wheels in a rotary machine and/or convert rotational motion into motion in a straight line.

Generators are usually based on the principle of electromagnetic induction, which was discovered by Michael Faraday in 1831. Faraday discovered that when an electrical conducting material (such as copper) is moved through a magnetic field (or vice versa), an electric current will begin to flow through that material. This electromagnetic effect induces voltage or electric current into the moving conductors.

Current power generation devices such as rotary alternator/generators and linear alternators rely on Faraday's discovery to produce power. In fact, rotary generators are essentially very large quantities of wire spinning around the inside of very large magnets. In this situation, the coils of wire are called the armature because they are moving with respect to the stationary magnets (which are called the stators). Typically, the moving component is called the armature and the stationary components are called the stator or stators.

Rotary motors and generators used today produce or utilize a sinusoidal time varying voltage. This waveform is generally inherent to the operation of these devices.

With conventional motors a pulsed electrical current of sufficient magnitude must be applied to produce a given torque/horsepower. Horsepower output and efficiency then is a function of design, electrical input power plus losses.

With conventional generators, an electrical current is produced when the rotor is rotated. The power generated is a function of flux strength, conductor size, number of pole pieces and speed in RPM.

In motors or generators, some form of energy drives the rotation and/or movement of the rotor. As energy becomes more scarce and expensive, what is needed are more efficient motors and generators to reduce energy consumption or run more efficiently and hence reduce costs.

SUMMARY

In response to this and other problems, there is presented various embodiments disclosed in this application, including methods and systems of increasing flux density by permanent magnet manipulation using multiple magnetic tunnels.

These and other features, and advantages, will be more clearly understood from the following detailed description taken in conjunction with the accompanying drawings.

It is important to note the drawings are not intended to represent the only aspects of the invention.

BRIEF DESCRIPTION OF THE DRAWINGS

FIG. 1 is an exploded view of one embodiment of an electrical machine component according to certain aspects of the present disclosure.

FIG. 2D is a detailed section view illustrating an alternative embodiment of a magnetic cylinder segment.

FIG. 2E is a detailed isometric view illustrating the embodiment of a magnetic cylinder segment of FIG. 2D.

FIG. 2G is a schematic representation of the system.

FIGS. 2H, 2J, 2K, and 2L are a schematic representation of the system.

FIG. 3A is a detailed isometric view of an exemplary power or coil module.

FIG. 3B is a detailed isometric view of the coil module of FIG. 3A with poles removed for clarity.

FIG. 3C is a detailed isometric view of the coil module of FIG. 3B from a different perspective.

FIG. 4A is a isometric view of a central core or yolk for a coil assembly.

FIG. 4B is an exploded view of the central core of FIG. 4A.

FIG. 5A is an isometric view of a coil module positioned about a portion of the central core. FIG. 5B is an isometric view of the central core portion of FIG. 5A illustrating additional coil modules positioned about the central core portion. FIG. 5C is an isometric view of the central core portion of FIG. 5A illustrating more additional coil modules positioned about the central core portion.

FIG. 5D is an isometric view of a toroidal coil module formed by joining the core portion illustrated in FIG. 5C with another core portion also having a full complement of coil modules.

FIGS. 5E, 5F, and 5G are a schematic representation of the system.

FIG. 6C is an isometric exploded view of the assembled coil module after potting.

FIGS. 7A, 7B, and 7C are a schematic representation of the system.

FIG. 10 is an isometric drawing illustrating a plurality of toroidal motor modules coupled together to form one motor.

FIG. 11C is a partial detailed isometric drawing illustrating the flux flow of the alternative embodiment illustrated in FIG. 11A.

FIG. 11D is a schematic representation of the system.

DETAILED DESCRIPTION

Figure 2A:
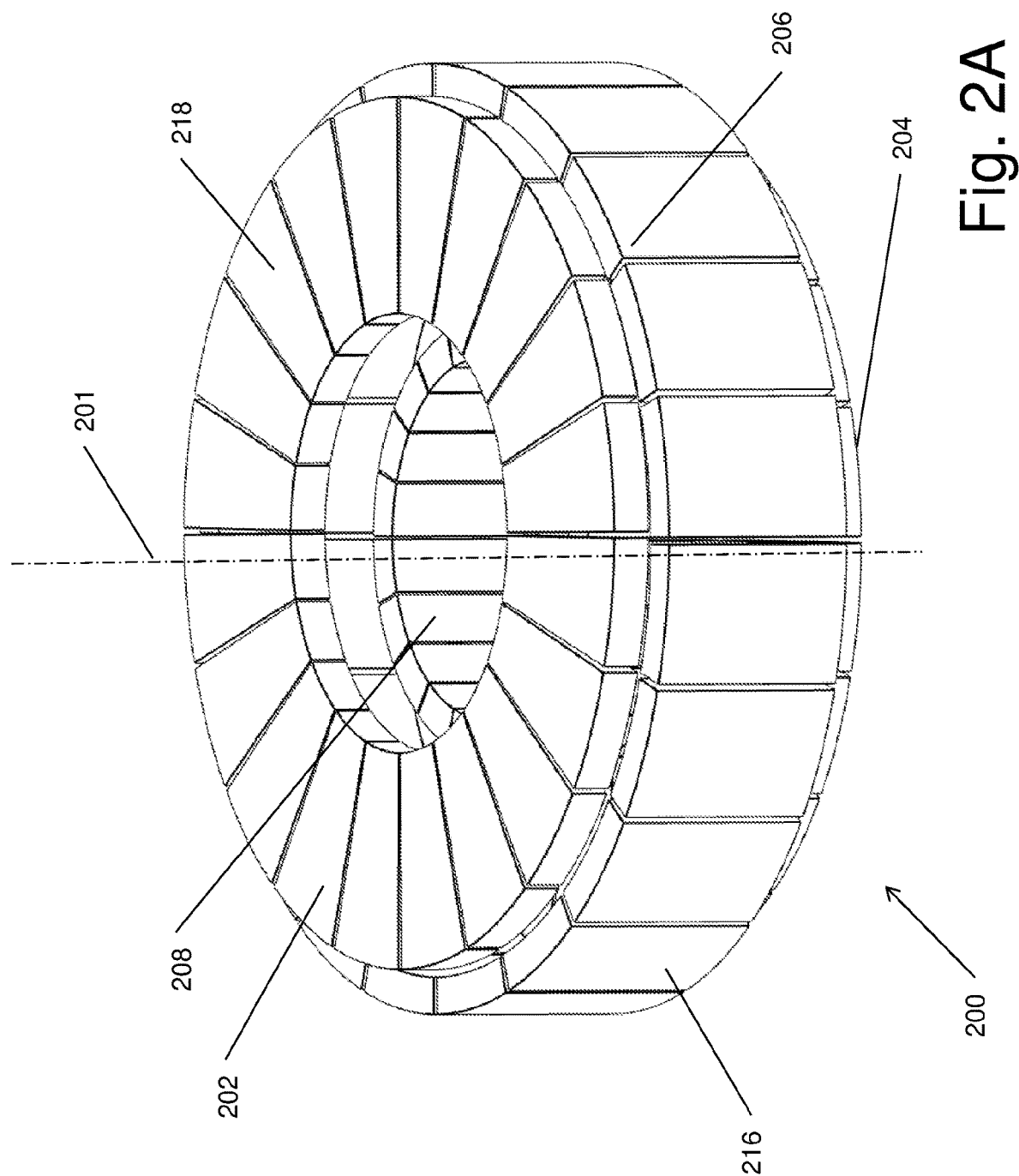
FIG. 2A illustrates a plurality of magnets forming one embodiment of a toroidal magnetic cylinder comprising a plurality of magnetic cylinder segments which may be used in the electrical machine component of FIG. 1.

Specific examples of components, signals, messages, protocols, and arrangements are described below to simplify the present disclosure. These are, of course, merely examples and are not intended to limit the invention from that described in the claims. Well-known elements are presented without a detailed description in order not to obscure the present invention in unnecessary detail. For the most part, details unnecessary to obtain a complete understanding of the present invention have been omitted inasmuch as such details are within the skills of persons of ordinary skill in the relevant art. Details regarding conventional control circuitry, power supplies, or circuitry used to power certain components or elements described herein are omitted, as such details are within the skills of persons of ordinary skill in the relevant art.

When directions, such as upper, lower, top, bottom, clockwise, or counter-clockwise are discussed in this disclosure, such directions are meant to only supply reference directions for the illustrated figures and for relative orientation of components in the figures. The directions should not be read to imply actual directions used in any resulting invention or actual use. Under no circumstances, should such directions be read to limit or impart any meaning into the claims except for relative positioning.

System Overview:

FIG. 1 is an exploded isometric view of an electric machine or an electric machine module 100 comprising a magnetic toroidal cylinder 200 (illustrated as a first portion 200a and a second portion 200b, a coil assembly 500, a back iron circuit 800 (illustrated as a first portion 802 and a second portion 806, a center shaft or axle 702 and structural components such as bearings 704a and 704b and bearing flanges 706a and 706b, respectively.

The Magnetic Toroidal Cylinder/Tunnel:

FIG. 2A is a detailed isometric view of one embodiment of the magnetic toroidal cylinder 200. In the embodiment illustrated in FIG. 2A, the magnetic toroidal cylinder 200 is centered about a longitudinal or axial axis 201. In certain embodiments, the magnetic toroidal cylinder 200 may include a first axial wall 202 (also called a side wall or radial wall) and a second or opposing axial wall 204 positioned a predetermined distance from the first axial wall 202 along the longitudinal axis 201. In certain embodiments, an outer cylindrical wall 206 and an inner cylindrical wall 208 are generally longitudinally positioned between the first axial wall 202 and the second axial wall 204. Additionally, the outer cylindrical wall 206 and inner cylindrical wall 208 are concentrically positioned about the longitudinal axis 201 where the inner cylindrical wall 208 is the inward wall or the wall with the shortest radius with respect to the longitudinal axis 201. When assembled together the axial walls 202-204 and cylindrical (or longitudinal walls) 206-208 form a toroidal magnetic cylinder 200, such as illustrated in FIG. 2A.

In the illustrative embodiment of FIG. 2A, the outer cylindrical wall 206 and the inner cylinder wall 208 may comprise a plurality of curved magnets 216. Similarly, the first axial wall 202 and the second axial wall 204 may comprise a plurality of wedge shaped magnets 218 having curved ends as illustrated in FIG. 2A.

In certain embodiments, the side walls 202-204 and cylindrical walls 206-208 discussed herein may be made of out any suitable magnetic material, such as: neodyium, Alnico alloys, ceramic permanent magnets, or electromagnets. The exact number of magnets or electromagnets will be dependent on the required magnetic field strength or mechanical configuration. The illustrated embodiment is only one way of arranging the magnets. Other arrangements are possible, especially if magnets are manufactured for a specific purpose or shape. In other embodiments, one of the side walls 202-204 or the cylindrical walls 206-208 may be made out of a magnetic reflective material.

Additionally, in each of the illustrated embodiments, whenever a plurality of magnets are shown and/or described as separate structures, they can equivalently be formed together as a one-piece structure. Conversely, in each of the illustrative embodiments, each magnet illustrated or described as though it were a one-piece structure can equivalently be formed of separate parts combined together. For example, in the embodiment illustrated in FIG. 2A, the outer cylindrical wall 206 comprises one longitudinal row of curved magnets. In contrast, in the embodiment illustrated in FIG. 2F, the outer cylindrical wall 206 comprises two or more longitudinal rows of curved magnets, which when combined form a single cylindrical magnetic wall. Similarly, the inner cylindrical wall 208 may comprise a single row of curved magnets as illustrated in FIG. 2A or two or more rows of curved magnets as illustrated in FIG. 2F.

In the embodiment illustrated in FIG. 2A, the magnetic toroidal cylinder 200 also comprises a plurality of "pie shaped" magnetic cylinder segments (or magnetic tunnel segments) arranged around the longitudinal axis to form a toroidal cylinder 200. As explained below, each magnetic cylinder segment comprises a portion of the side walls 202-204 and cylindrical walls 206-208. In certain embodiments, there may be two, four, six, ten, twelve, eighteen, twenty segments or more. The number of cylinder segments will depend on the particular design and performance characteristics for particular application.

Figure 2C:
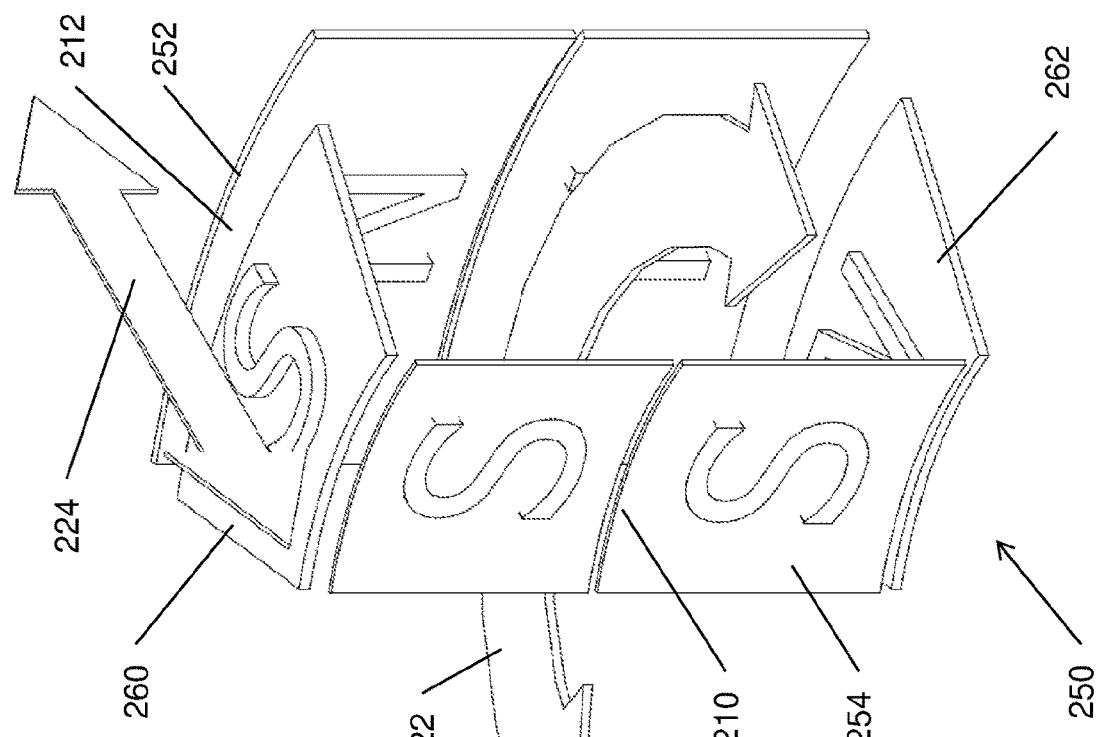
FIG. 2C is a detailed isometric view illustrating one embodiment of a magnetic cylinder segment of FIG. 2B with the addition of directional reference arrows.
Figure 2B:
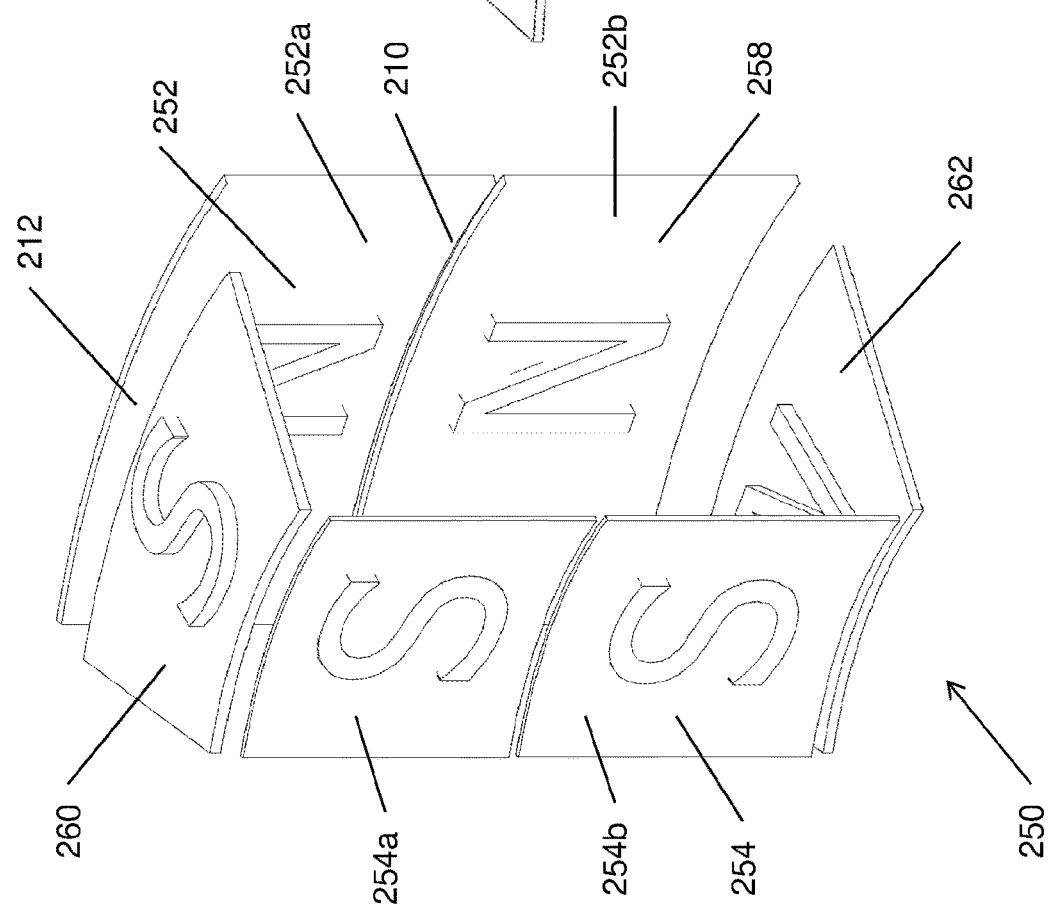
FIG. 2B is a detailed isometric view illustrating one embodiment of a magnetic cylinder segment of the magnetic toroidal cylinder.
Figure 2F:
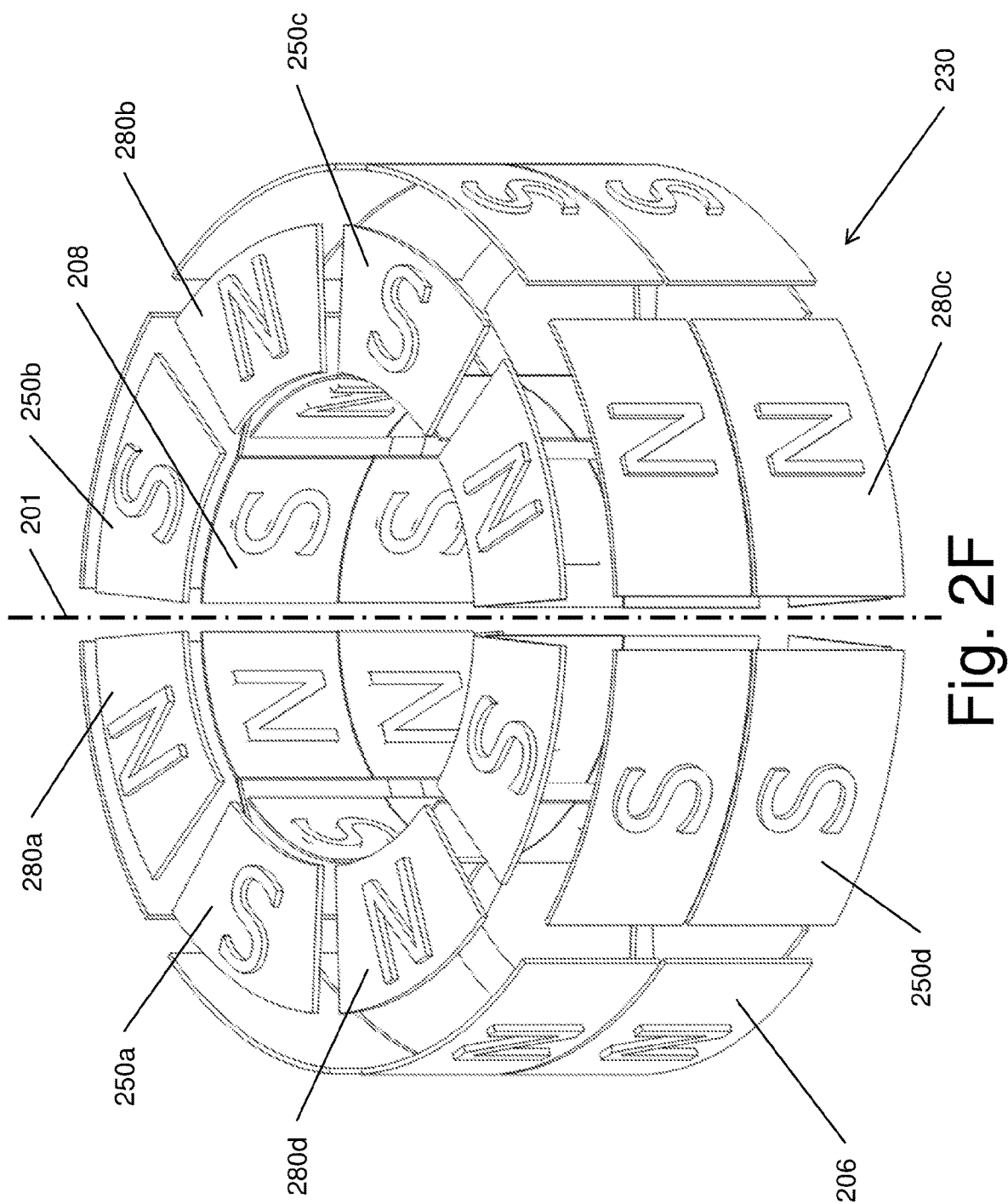
FIG. 2F is a detailed view illustrating one embodiment of a magnetic toroidal cylinder showing the magnetic pole orientation of the individual magnetic segments.

FIGS. 2B and 2C are isometric views of one embodiment magnetic cylinder segment 250 (or a magnetic tunnel segment) which defines an interior section or "magnetic tunnel" 258 and portion of a circular path (to be explained later). For instance, the magnetic cylinder segment 250 illustrated in FIGS. 2B and 2C may be a portion of the magnetic toroidal cylinder illustrated in FIG. 2F. In contrast, an alternative magnetic cylinder segment 251 is illustrated in the section view FIG. 2D and the isometric view FIG. 2E. The magnetic cylinder segment 251 may be a cylinder segment from the magnetic toroidal cylinder illustrated in FIG. 2A.

Turning now to FIGS. 2B through 2E, the magnetic toroidal cylinder segments 250 or 251 have an outer magnetic wall 252, (which is a portion of the outer cylinder or longitudinal wall 206 discussed above) and an inner curved or longitudinal magnetic wall 254 (which is a portion of the inner magnetic cylinder wall 208 discussed above). In addition to the partial cylindrical magnetic walls 252 and 254, there are also magnetic axial walls 260 and 262, which in these illustrated embodiments, may be made of generally wedge shape members or magnets. The axial side wall 260 may be a portion of the first axial wall 202 and axial wall 262 may be a portion of the second axial wall 204 of the magnetic toroidal cylinder 200 discussed above in reference to FIG. 2A. Similarly, the outer wall 252 may be a portion of the outer wall 206 and inner wall 254 may be a portion of the inner wall 208 of the magnetic toroidal cylinder 200 discussed above in reference to FIG. 2A.

For a matter of drawing interpretation convenience, in some of the drawings, an "S" or "N" is placed on the face of the wall segments or magnets to indicate that the orientation of the respective magnetic pole polarity of the magnets (e.g. north or south) comprising the respective magnet or magnetic wall segment. For instance, in FIGS. 2B, 2C and 2E, the magnets forming the axial wall 262 and the outer longitudinal wall 252 (e.g. wall portions 252a and 252b) are illustrated with an "N" on their interior surfaces. In contrast, the magnets forming the axial wall 260 and the inner longitudinal wall 254 are illustrated with an "S" on their exterior surfaces—indicating the orientation and/or polarity of the south poles. Of course, if the south poles are on the exterior faces, it follows that the north poles are on the interior faces.

Note that because FIG. 2D is a section view, the magnet pole polarity for each magnet or magnetic structure for this segment is illustrated by an "N" or an "S" placed close to the face of the magnet—rather than placed on the face of the magnets as illustrated in the isometric views 2B, 2C and 2E.

FIG. 2C is an isometric illustration of the radial segment 250 similar to FIG. 2B, but with the addition of directional arrows. Arrow 222 illustrates a circumferential direction with respect to the longitudinal axis 201 (not shown in FIG. 2C) and arrow 224 illustrates a radial direction with respect to the longitudinal axis 201. Arrow 222 also indicates a relative circular path of motion.

For the particular magnetic segment 250 or 251, the north magnetic pole(s) of the magnet(s) forming the outer wall 252 are orientated in a radial direction such that they face inward towards the inner space or "tunnel" 258. Similarly, the north magnetic pole(s) of the magnet(s) forming the inner wall 254 are orientated in a radial direction such that they also face inward towards the space or tunnel 258. Thus, both the outer wall 252 and the inner wall 254 have their magnetic poles generally orientated in the radial direction with respect to the longitudinal axis 201 as indicated by the arrow 224 of FIG. 2C. In contrast, the magnetic poles of the magnets forming the first axial wall 260 and the second axial wall 262 have their magnetic poles orientated generally parallel to the longitudinal axis 201.

Thus, in the illustrative embodiments of FIGS. 2B through 2E, the individual magnets in the magnetic walls 252, 254, 260, and 262 all have their "like" magnetic poles orientated towards or away from an interior space 258 enclosed by the walls 252, 254, 260, and 262 of the magnetic toroidal cylinder segment 250. The term "like magnetic poles" used in this disclosure refers to a group of magnetic poles of either all north poles or all south poles. For instance in the embodiment illustrated in FIGS. 2B through 2E, the magnets forming the walls 252, 254, 260, and 262 have their like poles (in this case, their north poles) facing inward and their south poles facing outward as indicated by the "N" positioned on the interior surface (as in FIGS. 2B, 2C and 2E) or positioned close to the interior surface of the magnetic walls (as in FIG. 2D). The magnetic pole orientation or configuration illustrated in FIGS. 2B through 2E may be called a "NNNN" magnetic pole configuration because all of the magnets forming the magnetic walls 252, 254, 260 and 262 have their north poles facing inward. In contrast, if the magnets forming the magnetic walls 252, 254, 260, and 262 had their south poles facing inward, this would be a SSSS magnetic pole configuration for purposes of this disclosure.

Turning back to FIG. 2D, as explained above, the magnet(s) forming the magnetic wall 252 has its north pole orientated towards the center of the tunnel 258 and as such, flux forces (represented by arrow 272) would conventionally flow from the north pole of the magnetic wall 252 to a corresponding south pole of some magnet. For instance, in a conventional electric motor, the magnet(s) forming the magnetic wall 254 would probably have its south pole orientated towards the center of the tunnel 258. Thus in a conventional motor, the flux forces represented by arrow 272 would flow from the north pole of the magnetic wall 252 across the interior space 258 to the south pole of the corresponding magnet or magnetic wall. In contrast, in the present embodiment, the magnet(s) forming the magnetic wall 254 also has its north pole orientated towards the center of the interior space 258. Thus, its flux forces (represented by arrow 274) also flows towards the interior space 258. As is known, like forces of different magnets repel each other. So, the flux forces represented by arrow 274 repel the flux forces represented by arrow 272 and will prevent them from reaching the interior face of the magnetic wall 254. (In convention situations, the flux forces would normally travel "in plane" around the edges of the magnets to reach their pole of magnetic attraction (e.g. a south pole)).

Note that in the present invention, the magnet(s) forming the axial magnetic walls 260 and 262 also have their north poles orientated towards the center of the tunnel 258 and that flux forces (represented by arrows 276 and 278, respectively) point towards the center of the tunnel. Thus, the flux forces represented by arrows 276 and 278 also repel the flux forces represented by the arrows 274 and 272. Having nowhere else to turn, the flux forces represented by arrows 272, 274, 276, and 278 must travel "out of plane" and around the openings of the tunnel 258 (or cylinder segment 251) to the south poles located on the exterior faces of the magnetic walls as illustrated in FIG. 2E.

The term "closed magnetic tunnel" as used in this disclosure refers to using an arrangement of the magnets forming the cylinder segment 250 or 251 that that "forces" or "bends" the flux forces from one side of the tunnel to the other in essentially a circumferential direction without letting most of the magnetic flux forces escape in an "in plane" direction relative to the section (i.e., through a large slot or other opening).

In the illustrated embodiment of segment 251 of FIGS. 2B and 2C, there may be small slots between the magnetic walls, such as slot 212 formed between the exterior wall 252 and the wall 260. In other embodiments, there may be a slot 214 between the interior wall 254 and the axial wall 260 as illustrated in FIGS. 2D and 2E. As discussed above, in certain embodiments, there may also be slots formed within the walls. For instance, depending on the embodiment, the inner longitudinal wall of magnets 208 and/or the outer longitudinal of wall of magnets 206 may define a circumferential slot—such as slot 210 is defined within the wall 252 of the illustrative embodiment shown in FIG. 2B and separating the wall segment 252a from the wall segment 252b. In certain embodiments, the slots 210, 212 and 214 may be wide enough to be used to all the passage of a support structure, alignment structures, electrical wires and/or conduits or cooling conduits, but narrow enough to keep the flux forces from escaping. Thus, the slot widths are designed to be limited in size to keep most of the flux forces from exiting "in-plane" through the slots. In other embodiments, additional magnets may be inserted into the slots (or in proximity to the slots) to form blocking flux forces to keep most of the flux forces from escaping and thus, channeled to a predetermined or a circumferential direction as indicated by arrows 272, 274, 276, and 278 of FIG. 2E.

FIG. 2F illustrates four magnetic cylinder segments 250a, 250b, 250c and 250d having an NNNN magnetic pole configuration arranged circumferentially and inter-dispersed within four magnetic cylinder segments 280a, 280b, 280c and 280d having a SSSS magnetic pole configuration to form a single magnetic toroidal cylinder 230.

In FIG. 2F, all the magnetic cylinder segments 250a-250d and 280a-280d are arranged circumferentially around a common axial or longitudinal axis 201. In this exemplary embodiment, the magnetic cylinder segments 250a, 250b, 250c and 250d have their north poles orientated inwardly to form a NNNN magnetic pole configuration and the magnetic cylinder segments 280a, 280b, 280c and 280d have their south poles facing inwardly to form a SSSS magnetic pole configuration. Thus, FIG. 2F illustrates the complete magnetic toroidal cylinder 230 formed from combining and interspersing the four magnetic cylinder segments 250a-250d with a NNNN magnetic pole orientation with four the magnetic cylinder segments 280a-280d having a SSSS magnetic pole orientation.

When the cylinder segments are energized, the current running through the coil windings (illustrated and discussed below) positioned within the magnetic cylinder segments 250a to 250d runs in an opposite direction than the current running through the coil windings positioned in the magnetic cylinder segments 280a to 280d so that the direction of the generated magnetic force or torque is the same throughout the entire magnetic cylinder.

Although a total of eight magnetic cylinder segments are illustrated, any number of alternating NNNN and SSSS magnetic cylinder segments could be used. The scope of this invention specifically includes and contemplates multiple partial magnetic toroidal cylinders having an opposite polarity to the adjacent partial magnetic toroidal cylinders. However, this design choice is in no way meant to limit the choice or number of segments for any multi-tunnel magnetic toroidal cylinder.

FIG. 2G is an isometric view of an alternative magnetic cylinder segment 290. In the alternative magnetic cylinder segment 290, the exterior wall segment 252 has been replaced by a Halbach array 252'. The interior wall segment 254 has been replaced by an interior Halbach array 254'. Similarly, the axial wall 260 and the axial wall 262 have been replaced by Halbach arrays 260' and 262', respectively. A Halbach array is an arrangement of permanent magnets that augments or strengthens the magnetic field on one side of the array (the strong side) while cancelling the field to near zero on the other side (the weak side). This is achieved by having a spatially rotating pattern of magnetization.

In the illustrative embodiment of FIG. 2G, the segment comprises approximately 16 magnets in each wall or array to form the Halbach arrays 252', 254', 262', and 264'. The pattern of magnetization for the axial walls 260' and 262' is illustrated in FIG. 2H. The pattern of magnetization for the inner wall segment 254' is illustrated in FIG. 2J. Similarly, the pattern of magnetization for the outer wall segment 252' is illustrated in FIG. 2K. For each of these cylinder segments, the strong side of the Halbach array faces inward towards the center of the tunnel and the Halbach arrays forming the walls of the segment 290 forms a region of NNNN magnetic polarity which gradually alternates to a region of SSSS magnetic polarity. Although, the illustrated magnetization pattern use eight magnets, any number of magnets and corresponding magnetization patterns may be used to form the Halbach arrays.

Figure 2L:
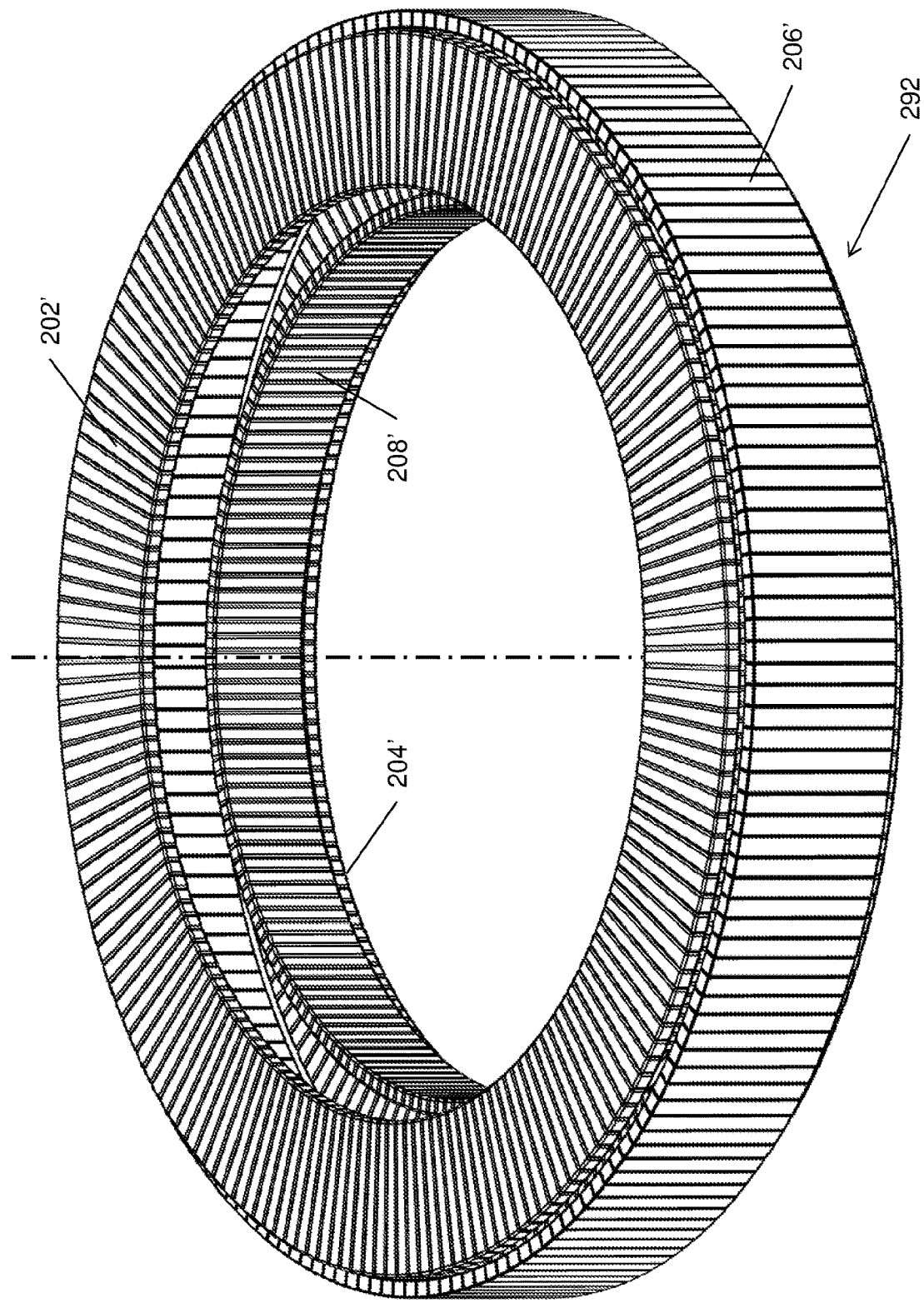

FIG. 2L is an isometric view of an alternative toroidal magnetic cylinder 292. In the alternative toroidal magnetic cylinder 292, the exterior outer wall 206 has been replaced by a outer wall made up of Halbach array 206' having a repeating pattern of magnetization as illustrated in FIG. 2K. The interior wall 208 has been replaced by an interior wall made up of a Halbach array 208' having a repeating pattern of magnetization as illustrated in FIG. 2J. Similarly, the axial wall 202 and the axial wall 204 have been replaced by walls formed by Halbach arrays 202' and 204', respectively having a repeating pattern of magnetization as illustrated by FIG. 2H. Thus, each magnetic wall 202', 204', 206', and 208' comprises a plurality of Halbach arrays wherein the strong side of each Halbach array faces inward and each Halbach array is radially aligned with the Halbach arrays of the other walls to form regions of NNNN magnetic polarities which gradually alternates to regions of SSSS magnetic polarities within the magnetic toroidal cylinder 292.

The Central Core or Yoke

Figure 3D:
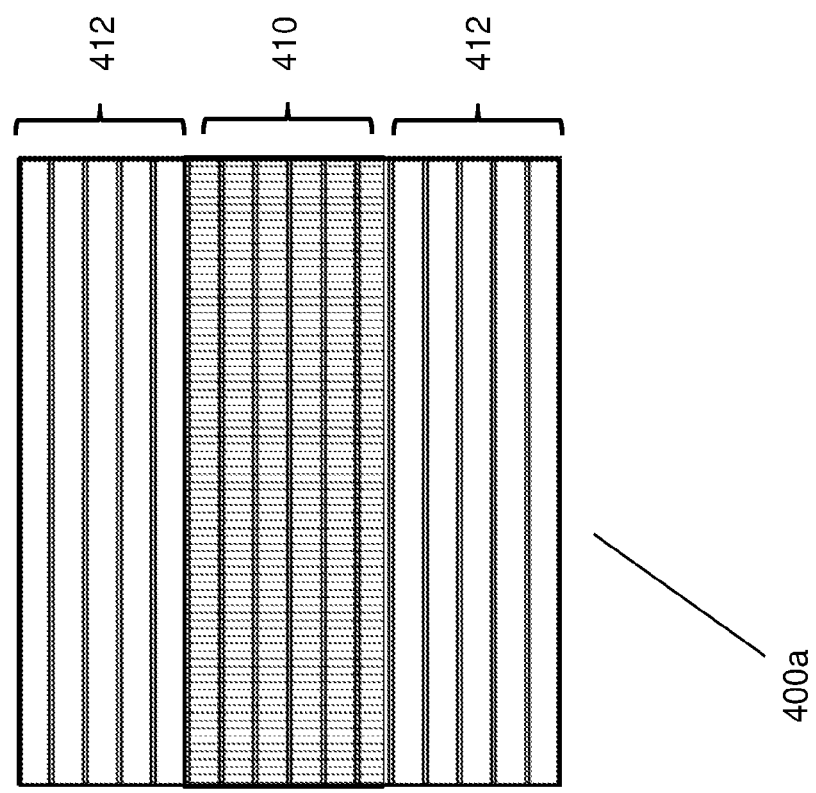
FIG. 3D is a detailed isometric view of various primary components comprising the coil module of FIG. 3A.

FIG. 3A is an isometric view of a central core or yoke 400 for the coil assembly 500. In certain embodiments, the core 400 may be made of at least two semi-circular segments 402a and 402b, as illustrated in FIG. 3B. In certain embodiments, the ends of the semi-circular segments may be shaped to mate with one another to provide structural integrity when the two semi-circular segments are joined. For instance, in FIG. 3B a leg 404a of segment 402a is designed to abut and engage an opposing leg 406a of the segment 402b. Similarly, a leg 404b of segment 402a is designed to abut and engage an opposing leg 406b of the segment 402b. The relative length of the legs 404a, 406a, 404b, and 404b depends on the structural forces the core 400 is subjected to during use.

In certain embodiments, the central core 400 distributes magnetic flux to each of stator pole portions 304a and 304b (discussed below in reference to FIGS. 5A through 5G). The central core 400 may be made out of iron or back iron materials so that it will act as a magnetic flux force concentrator. In yet other embodiments, other core materials maybe used when design considerations such as mechanical strength, reduction of eddy currents, cooling channels, etc. are considered. In some embodiments, the central core 400 may be hollow or have passages defined therein to allow liquid or air cooling.

In certain embodiments, embodiments of the central core 400 may be made from tape wound magnetic steel using high speed winding processes. In some embodiments, the material may be Hyperco 50, Metglas, Somaloy or even magnetic tape back. In other embodiments, the yoke may be made from back iron materials discussed below. A conceptual cross section of a core 1102 made from tape wound material is illustrated in FIG. 3C.

FIG. 3C is a section drawing illustrating an alternative embodiment for a core 400a. The core 400a is produced using high speed tape winding techniques. The tape may have an insulated coating which then separates each lamination 408 so that the magnetic flux cannot drift from one layer or lamination to the next. This action forces the flux to stay in each lamination 408 and to flow only in the plane of the magnetic steel tape. Such laminations may be made using laminate materials such Supermendur, Somaloy, or M19-29G. Electrical steel (lamination steel, silicon electrical steel, silicon steel, relay steel, transformer steel) is an iron alloy tailored to produce specific magnetic properties: small hysteresis area resulting in low power loss per cycle, low core loss, and high permeability. Electrical steel is usually manufactured in cold-rolled strips less than 2 mm thick. Cold-rolled grain-oriented steel is often abbreviated to CRGO. Grain-oriented electrical steel usually has a silicon level of 3% (Si:11Fe). The small amount of silicon dramatically increases the resistivity of the metal, which reduces the eddy currents, but does make the material more brittle. It is processed in such a way that the optimal properties are developed in the rolling direction, due to a tight control of the crystal orientation relative to the sheet. For instance, the magnetic flux density may be 30% higher in the coil rolling direction, although its magnetic saturation is decreased by 5%. These strips are cut to shape to make laminations which are stacked together to form the laminated cores of transformers, and the stator and rotor of electric motors. Electrical steel is usually coated to increase electrical resistance between laminations, reducing eddy currents, to provide resistance to corrosion or rust, and to act as a lubricant during die cutting. There are various organic and inorganic coatings, and the type of coating selected depends on the application. For instance, whether the finished laminations are to be immersed in oil, the working temperature of the finished apparatus and the like. Electrical steel made without special processing to control crystal orientation, non-oriented steel, usually has a silicon level of 2 to 3.5% and has similar magnetic properties in all directions. That is, it is an isotropic material. Cold-rolled non-grain-oriented steel is often abbreviated to CRNGO.

In certain embodiments of the core 400a, there may have adjacent laminations having a first permeability situated adjacent to or between of laminations having a second permeability, or wherein a plurality of lower permeability laminations is situated between laminations having a higher permeability. For instance, in FIG. 3D, the center plurality of laminations 410 may be of a different permeability of the plurality of laminations 412 positioned in the illustration on either side of the laminations 410. Furthermore, certain embodiments may have a plurality of lower permeability limitations is situated between a plurality of higher permeability limitations. FIG. 8B illustrates a central core or yoke 1200 made from tape wound soft-magnetic laminated steel (or electric steel) comprising a plurality of lower permeability limitations 1204 sandwiched between a plurality of higher permeability limitations 1202. Relative permeability refers to a material's ability to attract and conduct magnetic lines of flux.

In certain embodiments, the lamination is coated with an insulating layer of an electrically insulating polyimide sheet, an aromatic nylon sheet, a synthetic fiber sheet, or other non-surface core plating electrically insulating sheet to further reduce the flux and current flow.

The thickness of the laminations is directly related to the level of heat losses produced in the motor when operating, which is commonly referred to as eddy current losses. The thinner the laminations, the less the eddy current losses. The laminated stator and rotor core architecture creates a predominately 2D flux path inside the cores for the magnetic flux to follow when the motor is in operation. Some motor technologies have introduced 3D flux path materials which are comprised of ferromagnetic particles that are individually surrounded by an insulative material that when bonded together into a solid block form a composite material that enables the magnetic flux to flow in any direction throughout the block with low eddy current losses. In certain embodiments, the central core is tape wound and may have a thickness of less than thickness of a lamination is less than about 2 mm. In certain embodiments, the air gap between adjacent laminations is less than about one-half mm thick.

However, in certain embodiments, one can have many of the same features benefits of existing 3D flux path materials by using a ferromagnetic open cell metal foam material which is infused with a structural support matrix made of thermoset or thermoplastic resin material. The strands of the ferromagnetic open cell foam are small enough in cross-section to prevent eddy current losses while carrying the magnetic flux of the electric motor. The strands of the ferromagnetic open cell metal foam also act as a "structural fiber" that is supported by the thermoset or thermoplastic resin matrix which distributes the structural loads from one "structural fiber" to the next as is well known in any composite material structure.

The resulting ferromagnetic metal foam composite core motor structure would result in an electric motor that is substantially lighter in weight than other motors available on the market and enable a significantly higher torque density than existing motors whether they be of the 2D or 3D flux path motor architecture type.

Figure 3F:
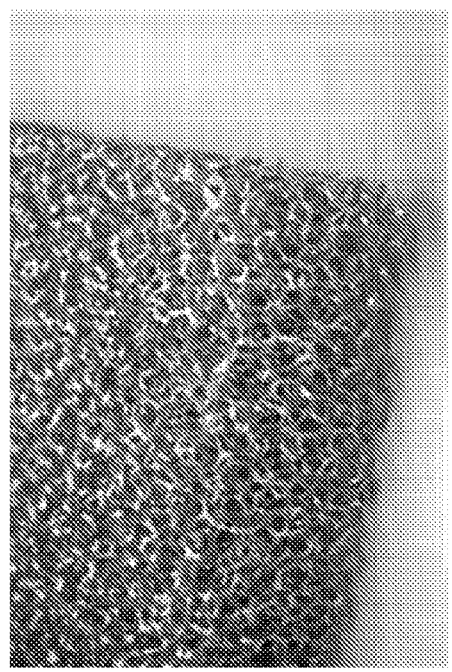
FIGS. 3E and 3F are a schematic representation of the system.
Figure 3E:
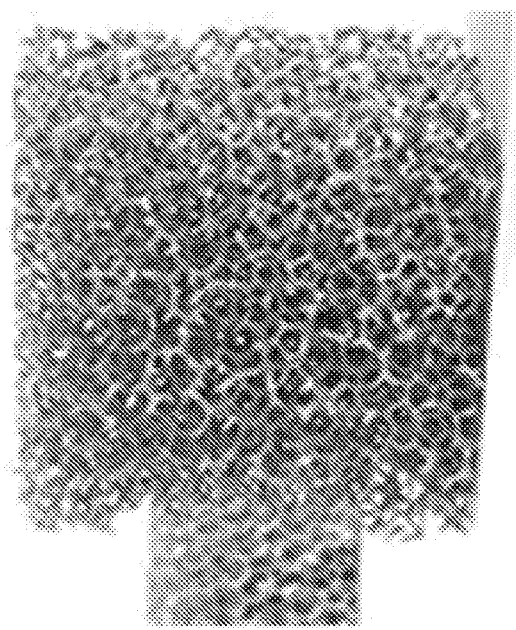

FIG. 3E represents an open cell metal foam structure which may be used as an alternative embodiment to the laminated core discussed above. FIG. 3F represents an alternative view of an open cell metal foam structure.

Thus, in certain embodiments, the electric motor stator (or rotor) core may be comprised of a ferromagnetic open cell metal foam. In certain embodiments, the ferromagnetic open cell metal foam is infused with a thermoset or thermoplastic resin matrix. In yet other embodiments, the ferromagnetic open cell metal foam is infused with a dissimilar ferrous metal matrix. In yet, other embodiments, the open cell metal foam is infused with a non-ferrous metal matrix.

In other embodiments, the core may also be comprised of electric insulated thin sections that are stacked together to form a predominantly 2D flux path motor architecture. In yet other embodiments, the ferromagnetic open cell metal foam core may be comprised of a roll of ferromagnetic metal foam material whose layers may or may not be separated from each other by an electrically insulative material.

In certain embodiments, the ferromagnetic open cell metal foam core maybe secondarily machined, pressed or formed by alternative means to a final desired shape.

In other embodiments, the ferromagnetic open cell metal foam core may have one or more wound magnet wire coils inserted into a preferred location and orientation before the thermoset or thermoplastic resin matrix is infused and solidified.

In certain embodiments, the ferromagnetic open cell metal foam core may have an electronic PCB with discrete electronic components placed within the ferromagnetic metal foam core in a preferred location and orientation before the thermoset or thermoplastic resin matrix is infused and solidified.

An in yet, other embodiments, the ferromagnetic open cell metal foam core may or may not have a roller bearing assembly or polymer bearing material inserted into the ferromagnetic metal foam core in a preferred location and orientation before the thermoset or thermoplastic resin matrix is infused and solidified thereby securing the roller bearing assembly or polymer bearing material to the resultant composite structure.

Coils:

FIG. 4A is a detailed illustration of coil showing an embodiment of a winding 508 from a first perspective. FIG. 4B is a detailed illustration of a coil showing the embodiment of FIG. 4A from a second perspective. In the illustrated embodiments, the coil windings are formed from wire having a rectangular cross-sectional shape. Note that a center portion of the wire 510 is positioned at an angle to cross over form two adjacent winding paths represented by a first winding portion 512 and a second winding portion 514. The first winding portion 512 then forms a lead 516 and the second winding portion 514 form the second lead 518.

Figure 4C:
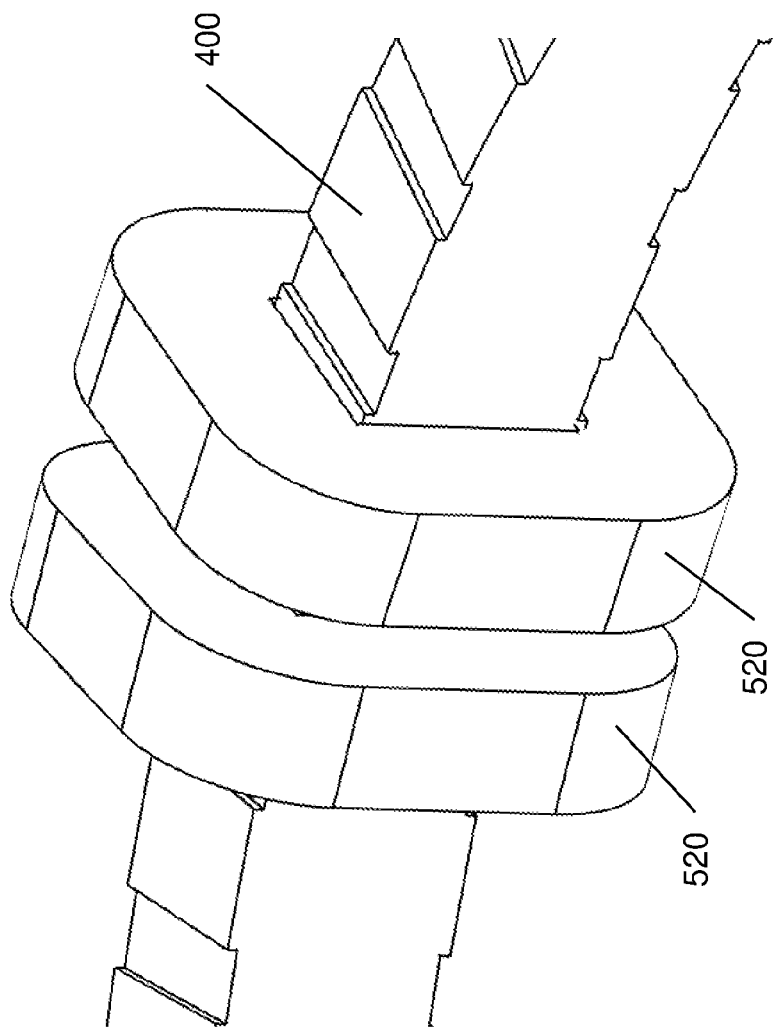
FIG. 4C is a schematic representation of the system.

FIG. 4C is a perspective view of two illustrative coils 520 positioned onto a core or yoke 400. In FIG. 4C the individually wirings are not shown for reasons of clarity. However, the coils 520 illustrated in FIG. 4C and the illustrations below could be wound as described above in relation to FIGS. 4A and 4B above or in any winding pattern known in the art.

The coils 520 may be made from a conductive material, such as copper (or a similar alloy) wire and may be constructed using conventional winding techniques known in the art—such as bobbin windings. In certain embodiments, concentrated windings may be used. In certain embodiments, the individual coils may be essentially cylindrical, square or rectangular in cross-sectional shape. In other embodiments, the individual coils can be used as a sensor by measuring the inductance of the coil.

The windings of each coil 520 are generally configured such that they are generally perpendicular to the direction of the relative movement of the magnets (e.g. the rotor). In other words, the coil windings are positioned such that their longitudinal sides are parallel with the longitudinal axis 201 and their ends or axial sides are radially perpendicular to the longitudinal axis. Thus, the coil windings 520 are also transverse with respect to the magnetic flux produced by the individual magnets of the rotor at their interior face. Consequently, essentially the entire coil winding or windings may be used to generate movement (in motor mode) or voltage (in generator mode).

Stator Poles and Coil Modules:

In certain embodiments, the coil assembly 500 (see FIG. 1) may be formed by a plurality of coil modules 300 radially positioned and coupled to the central core or yoke 400 as discussed above in relation to FIGS. 3A and 3B). An exemplary embodiment of a coil module 300 is illustrated in FIGS. 5A and 5B.

FIG. 5A is a detailed isometric view of the power or coil module 300. The coil 520 surrounds and is wound around the bobbin 306. In certain embodiments, the coil module 300 comprises a PCB module 302 coupled to a coil 520. The coil 520, the bobbin 306, and PCB module 302 may then be positioned within a recess formed in a pole portion 304a. FIG. 5B is similar to FIG. 5A, except that the coil 520, the bobbin 306, and PCB module 302 is sandwiched between the first pole portion 304a and a second pole portion 304b. In certain embodiments, the first pole portion 304a and second pole portion 304b function together to operate as a single pole for phasing purposes.

FIG. 5C is a detailed isometric illustration of the coil module 300 from a first perspective with the first pole portion 304a and second pole portion 304b removed for clarity. In contrast, FIG. 5D is a detailed isometric illustration of the coil module 300 viewed from an opposing side perspective. FIG. 5E is a detailed exploded isometric view of various components comprising the coil module 300 including a bobbin 306, the coil 520, the PCB module 302, and the first pole portion 304a.

Turning now to FIGS. 5A to 5D, the bobbin 306 is sized to be positioned onto the yoke 400 (discussed above). In certain embodiments, the bobbin 306 may be made from a PEEK material or a glass-reinforced thermoplastic.

In certain embodiments, the PCB module 302 is positioned radially adjacent to the inside face of the coil 520 and is electrically coupled to the coil 520. In certain embodiments, the PCB module 302 may include a number of sensors, including thermal sensors and Hall effect sensors (not shown). In some embodiments, the embedded sensors may be thermocouples. In yet other embodiments, there may be antennas and transceivers for wireless power transfer and/or communication transfer. In certain embodiments, there may be PCB connectors 310 that allow the coils 520 to plug directly into a controller (not shown) or a PCB power module (not shown).

As discussed above, the bobbin 306, the coil 520, and PCB module 302 may be sandwiched between the two pole portions 304*a* and 304*b* for phasing purposes as illustrated in FIG. 5B. In yet other embodiments, a "coil" for phasing purposes may be actually two physical coils 520 (and its associated bobbin 306 and PCB module 302) separated by the pole portions 304*a* or 304*b*.

For purposes of this application and to distinguish the pole portions 304*a* and 304*b* from an electric machine's magnetic poles for phasing, the term "pole portion" or "stator pole" will refer to the pole portions of the coil assembly. This terminology does not mean that the coil assembly will be stationary with respect to the magnetic tunnel. As explained above, the coil assembly may be stationary or rotate—depending on the embodiment and specific application. Similarly, the magnetic tunnel or cylinder described above may be stationary or rotate depending on the embodiment and application for the electric machine.

As discussed above, the pole portion 304 (e.g. either pole portion 304*a* or 304*b*) may be circumferentially positioned adjacent to the coil 520 onto the core 400 (see FIGS. 5A and 5B). In certain embodiments, the pole portion 304 is a flux concentrator and is formed such that one side of the coil 520 partially fits within an indent formed within the side of the respective pole portion. FIG. 5F is a detailed isometric illustration of a stator pole or pole portion, such as pole portion 304*a*. In contrast, FIG. 5G is a detailed isometric illustration of the pole portion 304*a* viewed from the opposing side. As illustrated in FIGS. 5F and 5G, both sides of the pole portion has an indent sized for partially enclosing the bobbin, the coil, and the PCB module. Forming a recess on both sides of the pole portion tends to maximize the external surface contact areas 316, 318, 320, and 322 which will be facing the interior of the magnetic tunnel described above. in certain embodiments, the pole portion 304 could be a solid material structure, which is sintered cast or 3D printed, solid block material, back iron material, and or/a heatsink material. In some embodiments, the pole portion 304 may be made from aluminum and be used as a heat sink to take the heat to the back iron circuit described below (or another cooling mechanism or heat sink).

In yet other embodiments, the pole portion 304 may be made from a composite material which would allow it to be sculptured to allow for cooling and wiring from inside. In other embodiments, the composite material may be formed of a "soft magnetic" material (one which will produce a magnetic field when current is applied to adjoining coils). Soft magnetic materials are those materials which are easily magnetized or demagnetized. Examples of soft magnetic materials are iron and low-carbon steels, iron-silicon alloys, iron-aluminum-silicon alloys, nickel-iron alloys, iron-cobalt alloys, ferrites, and amorphous alloys.

In certain embodiments, a spacer or heat sink (not shown) may be positioned adjacent to the pole portion 304*a* or 304*b* onto the core 400. The spacer isolates the pole portions from the poles next to it. In some embodiments, the spacer may be made from a lightweight non-magnetic filler material, such as aluminum, TPG, carbon fiber, or plastic. As described above, the magnets of the magnetic toroidal cylinder 200 focus the flux inwardly, but the poles and spacers can further direct the flux flow path as desired. In other embodiments, potting material may be used to act as a spacer as described below.

By positioning the individual coils 520 within the recesses and slots defined by the pole portions 304*a* and 304*b*, the coils 520 are surrounded by the more substantial heat sink capabilities of the poles and spacers. In certain embodiments, the poles and spacers channel the heat out of the motor towards the slots formed in the back iron (in embodiments which use a back iron). In certain embodiments, the rotation of the back iron then creates an active air cooling system. This allows much higher current densities than conventional motor geometries. Additionally, positioning the plurality of coils 520 within the pole portions 304*a* and 304*b* reduces the air gap between the coils. By reducing the air gap, the coil assembly 300 can contribute to the overall torque produced by the motor or generator.

Method of Manufacturing the Coil Assembly Using Coil Modules:

The coil modules 300 are modular and the size of a central aperture in the bobbin 306 and a central aperture in the pole portions 304*a* and 304*b* are designed to allow the assembled coil modules to slide over the central core segments 402*a* and 402*b*.

Figure 6A:
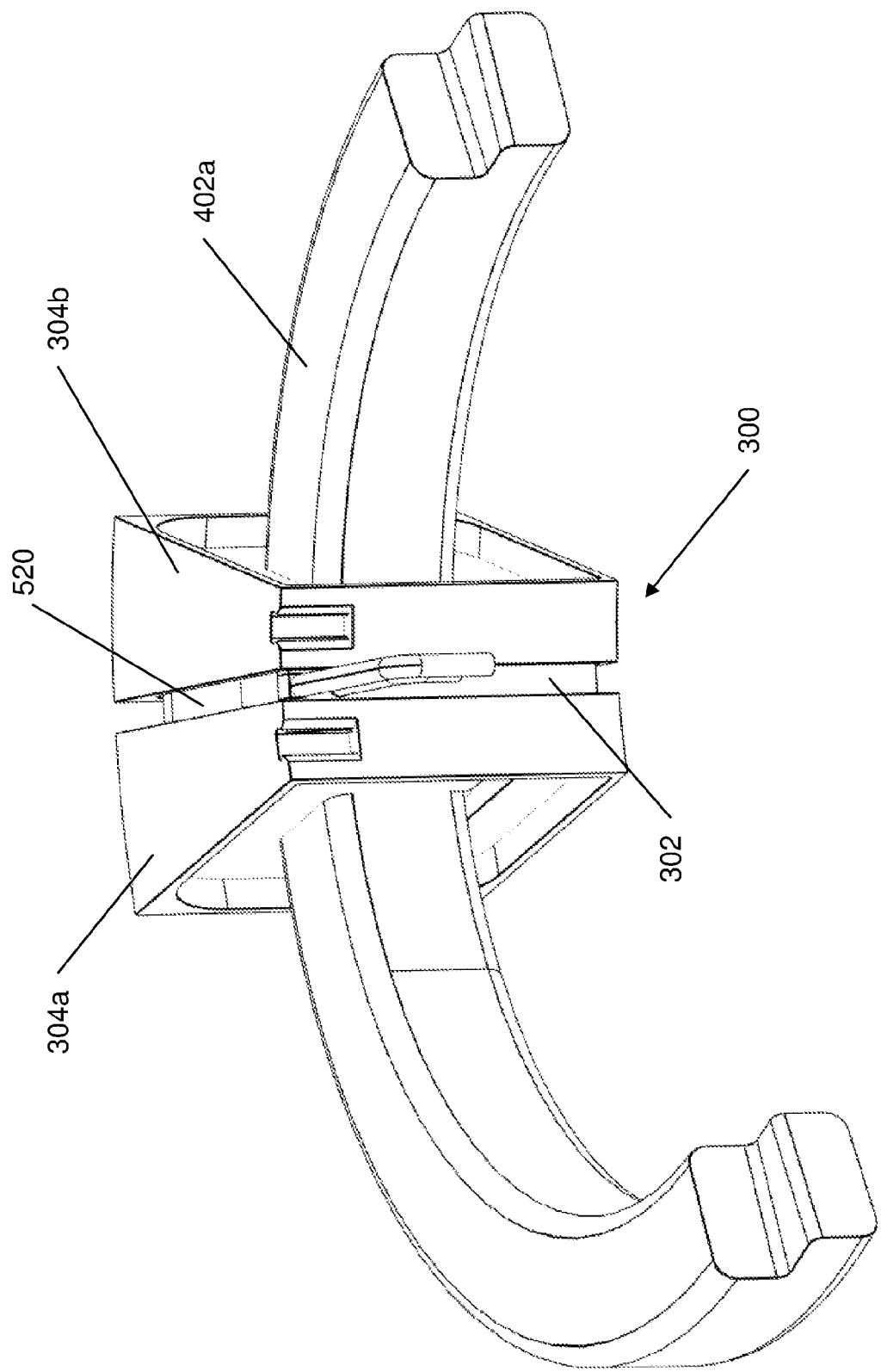
FIG. 6A is an isometric exploded view of the coil module of FIG. 5D and a structural supporting positioner or aligner for the coils.
Figure 6B:
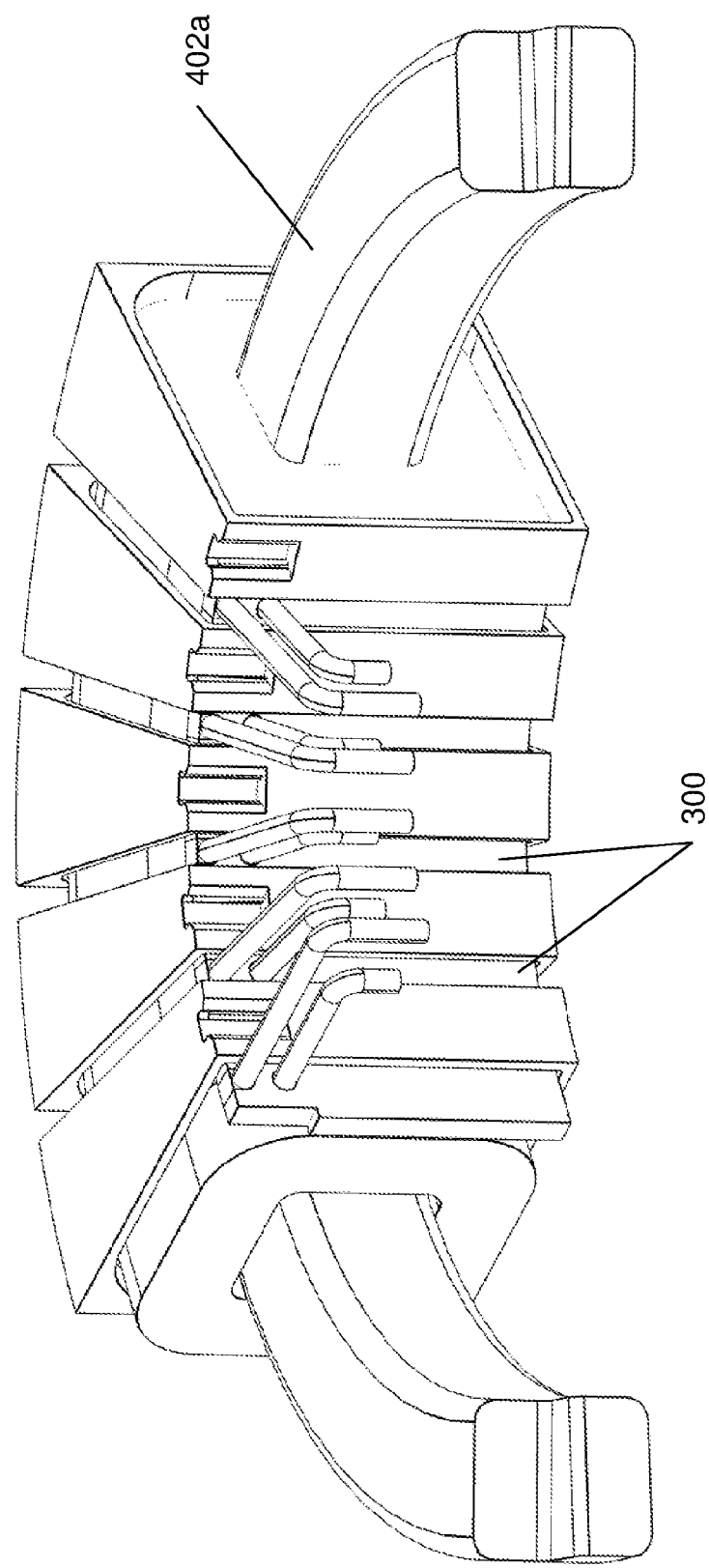
FIG. 6B is an isometric exploded view of the coil module of FIG. 5D and a PCB power board.

During manufacturing of the coil assembly 500, the pole portions 304 and core segments 402*a* or 402*b* may be cleaned with a solvent such as acetone. A pole portion 304*a* may then be slid over one of the core segments, such as coil segment 402*a*. The bobbin 306, coupled to its respective coil 520 and the PCB module 302, may then be slid over the core segment 402*a* such that it is positioned adjacent to the pole portion 304*a*. The pole portion 304*b* may then be slid over the core segment 402*a* until the pole portion 304*b* is also adjacent to the bobbin 306 as illustrated in FIG. 6A. The process may be repeated for additional coil modules 300. FIG. 6B is an isometric view of the central core segment 402*a* having a few additional coil modules 300 positioned about the coil segment 402*a*. FIG. 6C is an isometric view of the central core segment 402*a* illustrating coil modules completely positioned over the central core segment 402*a*.

Figure 6D:
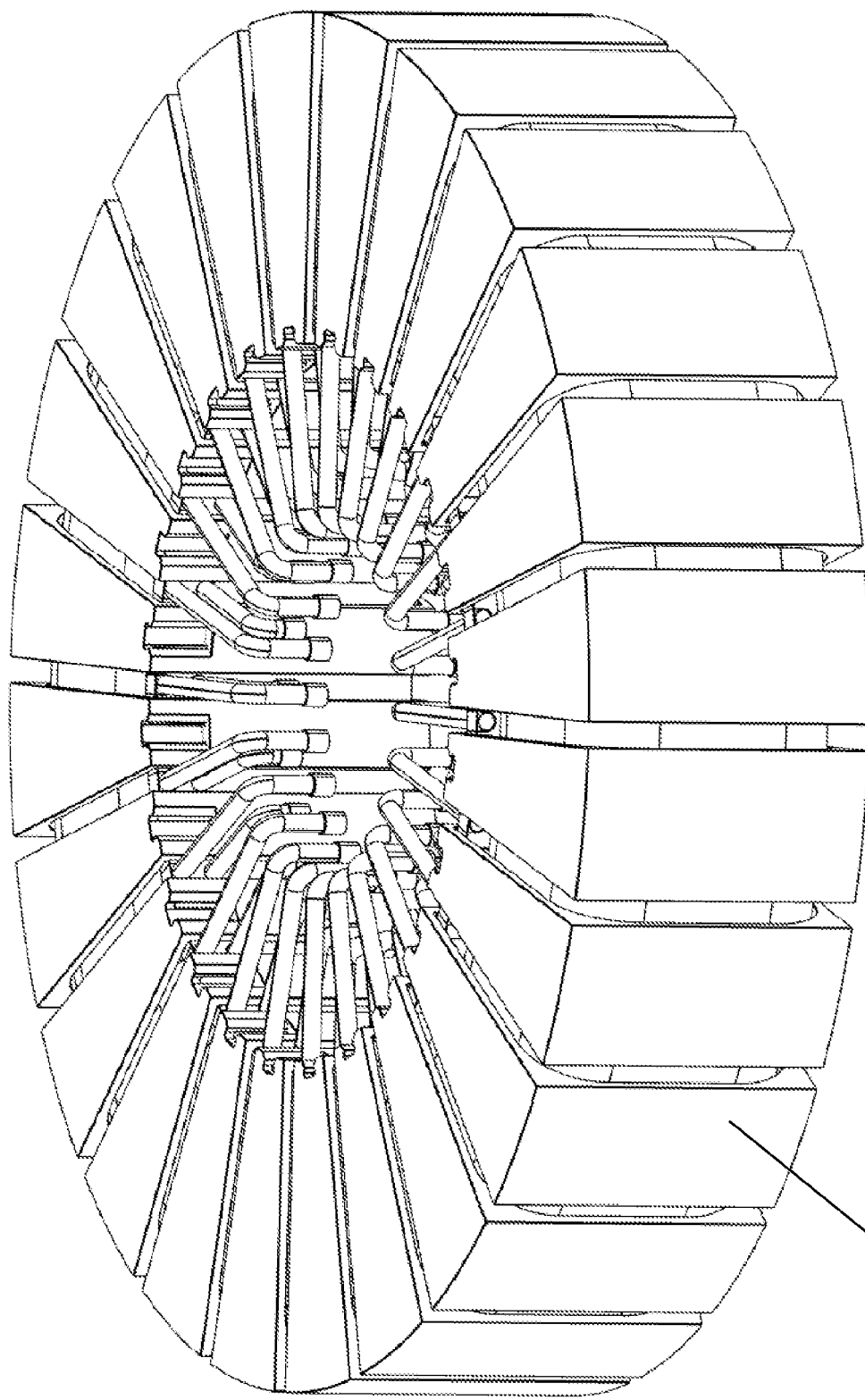
FIG. 6D is an isometric exploded view of the potted coil module and an controller module.

After a predetermined number of coil modules 300 have been coupled to the central core segment 402*a*, the process repeats for an additional number of coil segments 300 to be positioned over core segment 402*b*. The two halves may be joined together as illustrated in FIG. 6D. Any number of coil modules 300 may be coupled to the depending on the individual requirements of the motor and the number of modules that will physically fit within the desired volume and of a conductor length and size that produces the desired electrical or mechanical output for a particular application.

Alternative Embodiments of the Pole Portions or Stator Poles:

While the core(s) (i.e., yokes 402*a* and 402*b*) in an electric motor are usually not designed to have any current flow through it, the core(s) does however form a conducting loop within a changing magnetic field. The core(s) will therefore have small currents induced in them that are proportional to the area of the conducting loop. These induced currents are called eddy currents. In a conventional electric motor, the heat losses associated with these eddy currents may be reduced by constructing the stator core and/or the rotor core from stacked laminated ferromagnetic sheets that have an insulating coating on each side. Eddy currents losses will decrease as the lamination thickness is decreased and the effect will become amplified as the frequency of the eddy current increases. However, the laminated structure creates a predominately 2D flux path inside the core(s) for the magnetic flux to follow when the motor is in operation. In an electric motor having for instance a 3D magnetic flux tunnel comprising magnetic walls of like orientation magnets facing inwards this may not be the optimum solution.

Figure 7A:
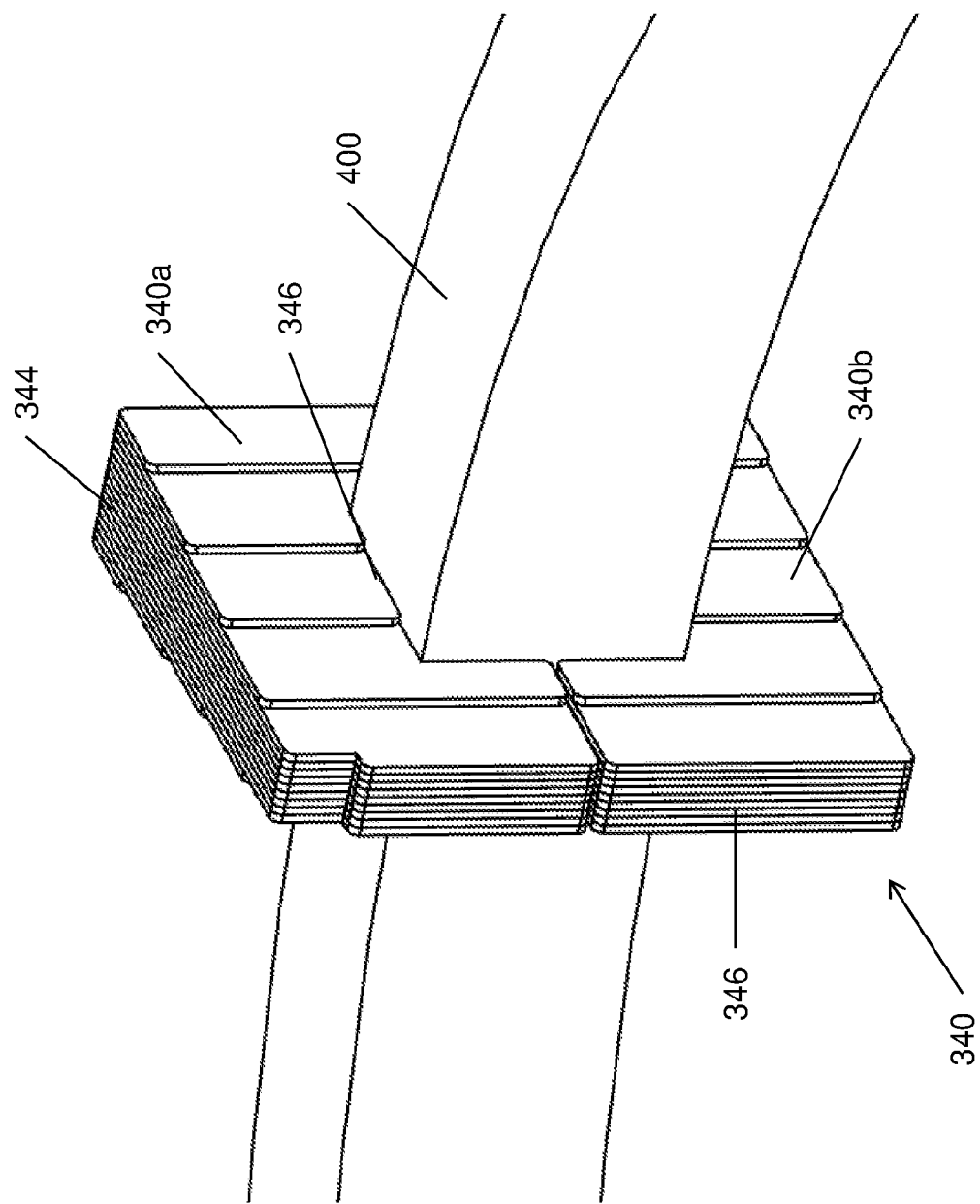

FIG. 7A is a detailed perspective view of an alternative pole portion or stator pole 340. In the embodiment illustrated in FIG. 7A, the pole portion 340 may be made up of laminated plates or laminated material having planes of laminations which are generally in a radial direction with respect to the longitudinal axis. In the illustrative embodiment, exterior plurality of plates are of different sizes. This allows the laminated stator pole 340 to maintain a wedge cross-section shape when perpendicular to the longitudinal axis because there are more plates on the exterior edge than on the interior edge.

Figure 7C:
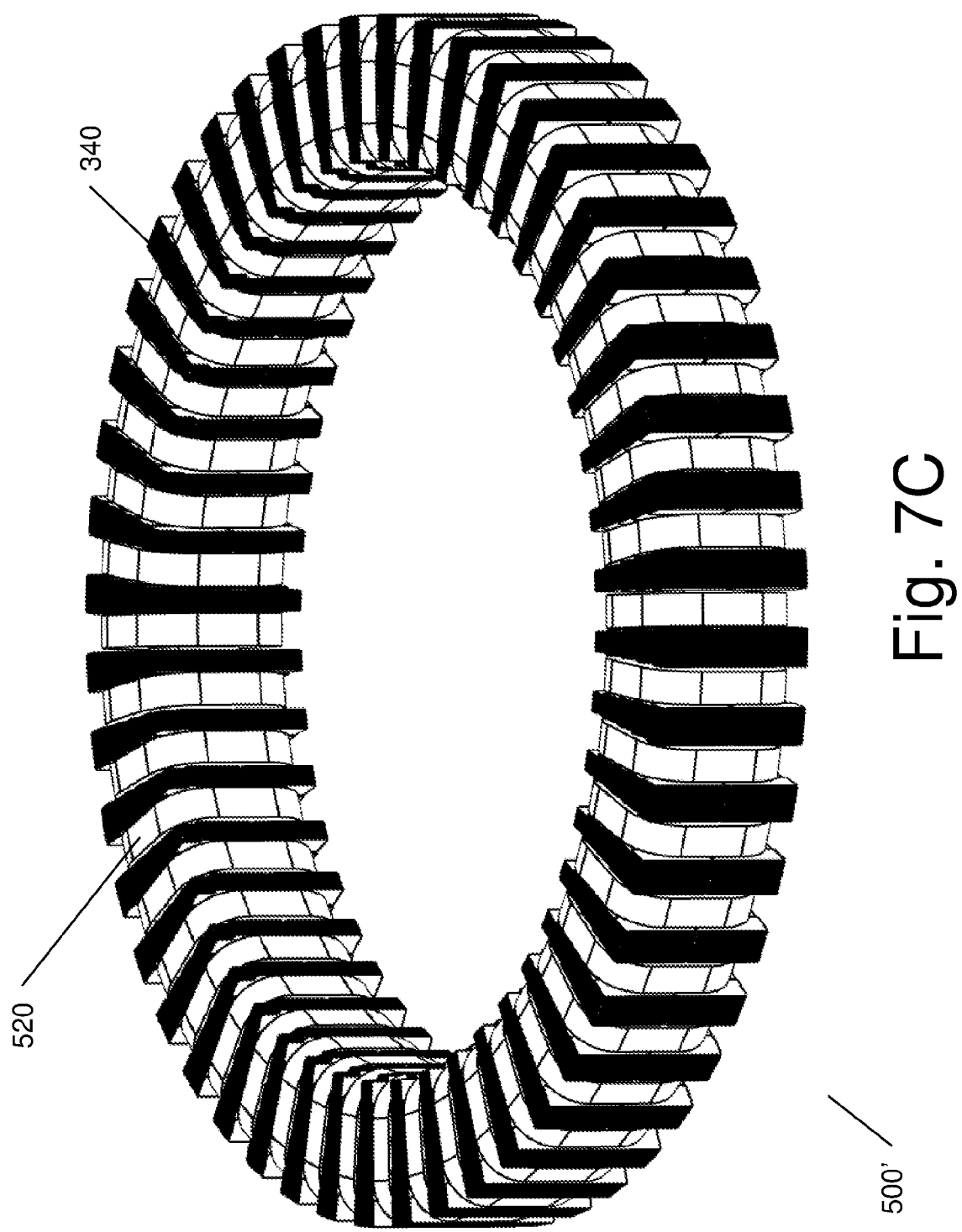

Note that in some embodiments, the stator pole 340 are made from two separate portions 340a and 340b. Thus, the stator pole 340 may be made from two halves 340a and 340b of laminated material, each half 304a and 304b having an indent 346 sized to engage the yoke Such embodiments allow for the coil windings to be wound directly onto the yoke 400, then the stator poles can be positioned between the windings—which can greatly simply the pole windings, as illustrated in FIG. 7B. FIG. 7C is a perspective view of a coil assembly 500' made from a yoke (not shown), having a plurality of coil windings where the stator poles 340 are interspersed between the coil windings.

Figure 8A:
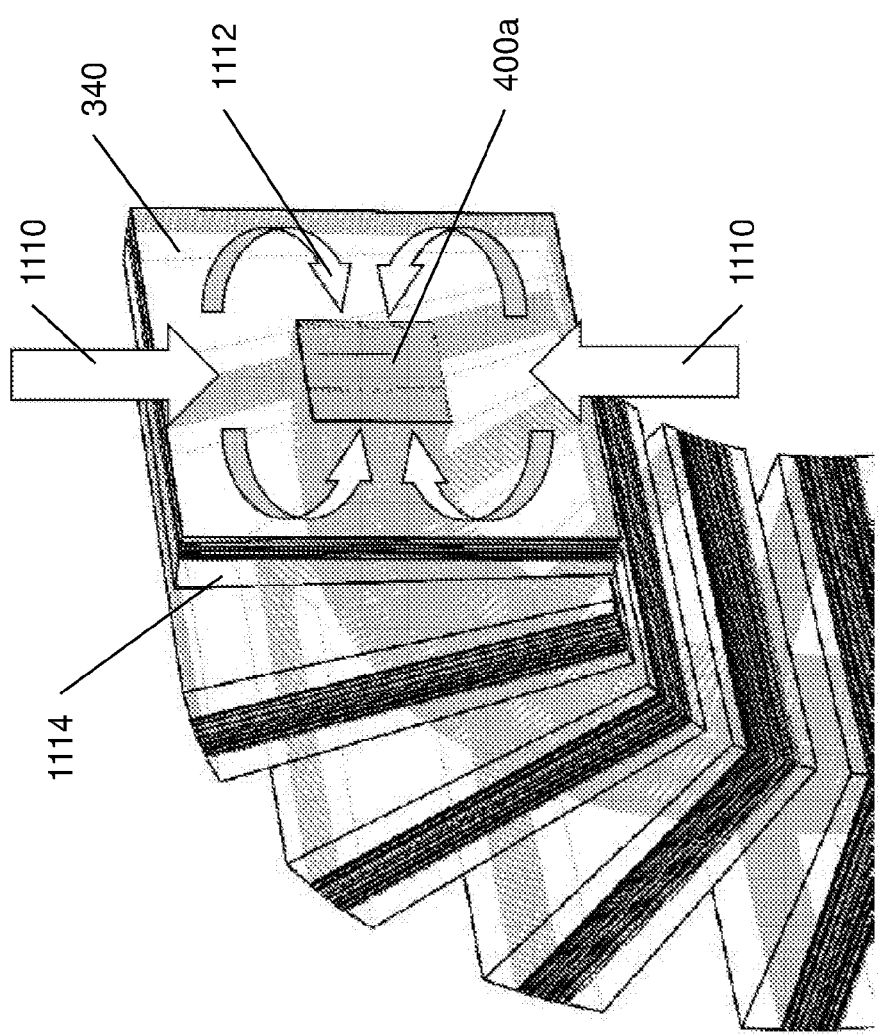
FIGS. 8A and 8B are a schematic representation of the system.
Figure 8B:
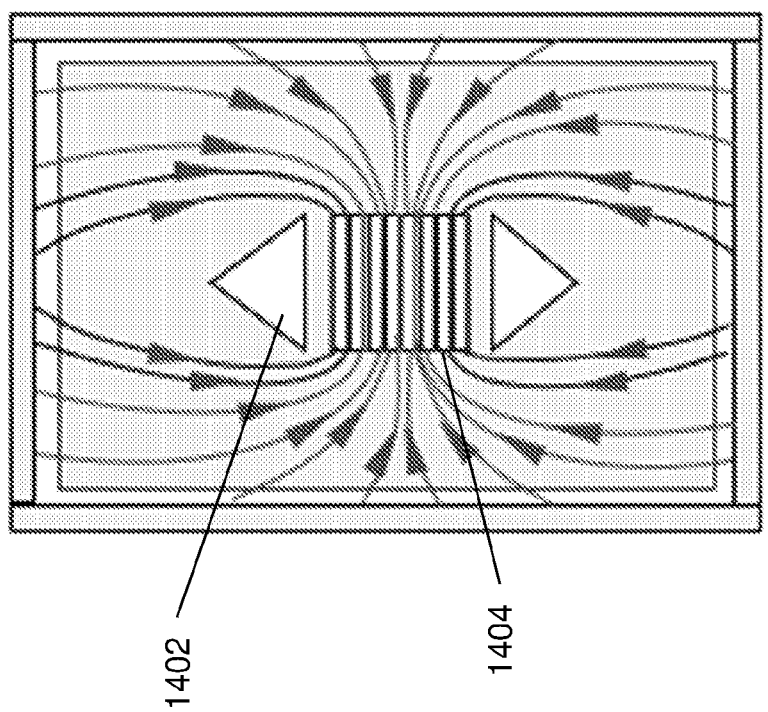

FIG. 8A is a partial detailed isometric drawing illustrating one embodiment of a laminated stator pole 340 with a laminated yoke 400a. The flux 1110 from an adjacent magnet flows into the laminated stator pole 340. Recall from above, that the tape is wound such that the width of the tape is parallel to the longitudinal axis. Because one face of the wound material is resistive to magnetic forces, the radial flux 1110 cannot easily penetrate inner and outer circumferential surfaces the core. So, the flux 1110 from the longitudinal magnets bends to enter the core 1102 as indicated by the arrows 1112 and enters the core from the side or the longitudinal direction—similar to the way the flux from the axial magnets enters the core. Such a configuration also reduces any unwanted eddy currents generated by the electrical machine.

Also illustrated are laminated stator poles 340 with SMC shoes 1114. In certain embodiments, the stator poles 1104 may be formed from thermal pyrolytic graphite (TPG). TPG is a "in plane" heat conductor and on the face planes, it reflects magnetic fields. So, using TPG may enhance and or direct the flux flow. Furthermore, the magnetic flux flow will not be able to go across the gap created by the TPG to close the circuit. So, the flux flow must leave the pole and cross the air gap into the rotor magnet before it returns. In yet other embodiments, the stator poles may be made from laminate materials such as Supermendur, Somaloy, or M19-29G.

Additionally, the materials can be combined. For instance, in certain embodiments, the core may be formed with Supermendur and the poles are formed with Somaloy. In yet other embodiments, the core may be formed with M19-2G and the poles are formed with Somaloy.

The choice of materials may be based on cost effectiveness rather than performance. In certain situations all three materials have substantially the same performance. For instance, Supermendur has higher saturation limit at 2.1 T compared to 1.7 T saturation limit of M19. This allows the max torque to rise 1 Nm, and also may allow to reduce the size of the yoke with further optimization. Somaloy 700 and Somaloy 1000 are almost the same except the losses at high frequency are lower for 700 grade, but in situations where the electrical machine operates at 167-250 Hz, the grade of Somaloy at high frequency is not necessary from a performance perspective. The differences in the performance results between Somaloy 700 and 1000 may be due to different thicknesses of the material. For instance, a 5 mm thickness will have higher losses than a 2.6 mm thickness.

The embodiment of the core or yoke described above in relation to FIGS. 3C through 3F related to how flux and/or current passes through the core/yoke. In an alternative embodiment, illustrated in FIG. 8B, flux and current may be further manipulated before it flows into the core/yoke. For instance, in certain embodiments the pole portions 340 discussed above may have defined within them flux-shaping cavities 1402 to configure the flux density distribution (FDD) in a stator core 1404 of an electric machine having a 4-rotor flux tunnel. The flux-shaping cavities 1402 in the stator core 1404 configure the 3D magnetic flux field of the 4-rotor flux tunnel, such that the FDD in a 2D laminated stator core concentrator is increased—which can work with the various core centers discussed above to further manipulate and concentrate the FDD.

Higher efficiency for electric machines is usually desired and FDD within an electric machine has a significant effect on the electric machine's torque, efficiency, torque ripple, and pulsation performance. Cavities formed in the stator provide higher performance in these areas. That is, a stator with cavities may result in a more efficient use of the permanent magnetic material in the electric motor.

The use of flux-shaping cavities to optimize the Flux Density Distribution (FDD) in the stacked laminated ferromagnetic sheets of the stator core recognizes and addresses this problem. FIG. 8B is an illustrative embodiment of the use of flux-shaping cavities 1402 to optimize the FDD in the laminated core 1404. In the illustrate embodiment of FIG. 8B the shape of the cavity(s) in each portion of the stator is a substantially a triangle. In some embodiments, the shape of the cavity may deviate from the illustrated triangle. In certain embodiments, there may be more than one cavity and/or shape in each portion of the stator in order to focus and direct the flux field towards the desired orientation as illustrated in this exemplary embodiment.

In some embodiments, the shape of the cavity(s) may substantially a two-dimensional shape, that is, the length and the height of the shape do not change with the width (depth). In certain, embodiments, the shape of the cavity(s) may be three-dimensional, that is, the length and/or height of the shape may vary with the width. In some embodiments, the cavity may be a void that is completely empty of material. In certain embodiments, the cavity may be filled, partly or completely, with a non-magnetic material. In alternative embodiments, various topologies may also reduce torque ripple and the like.

Figure 9A:
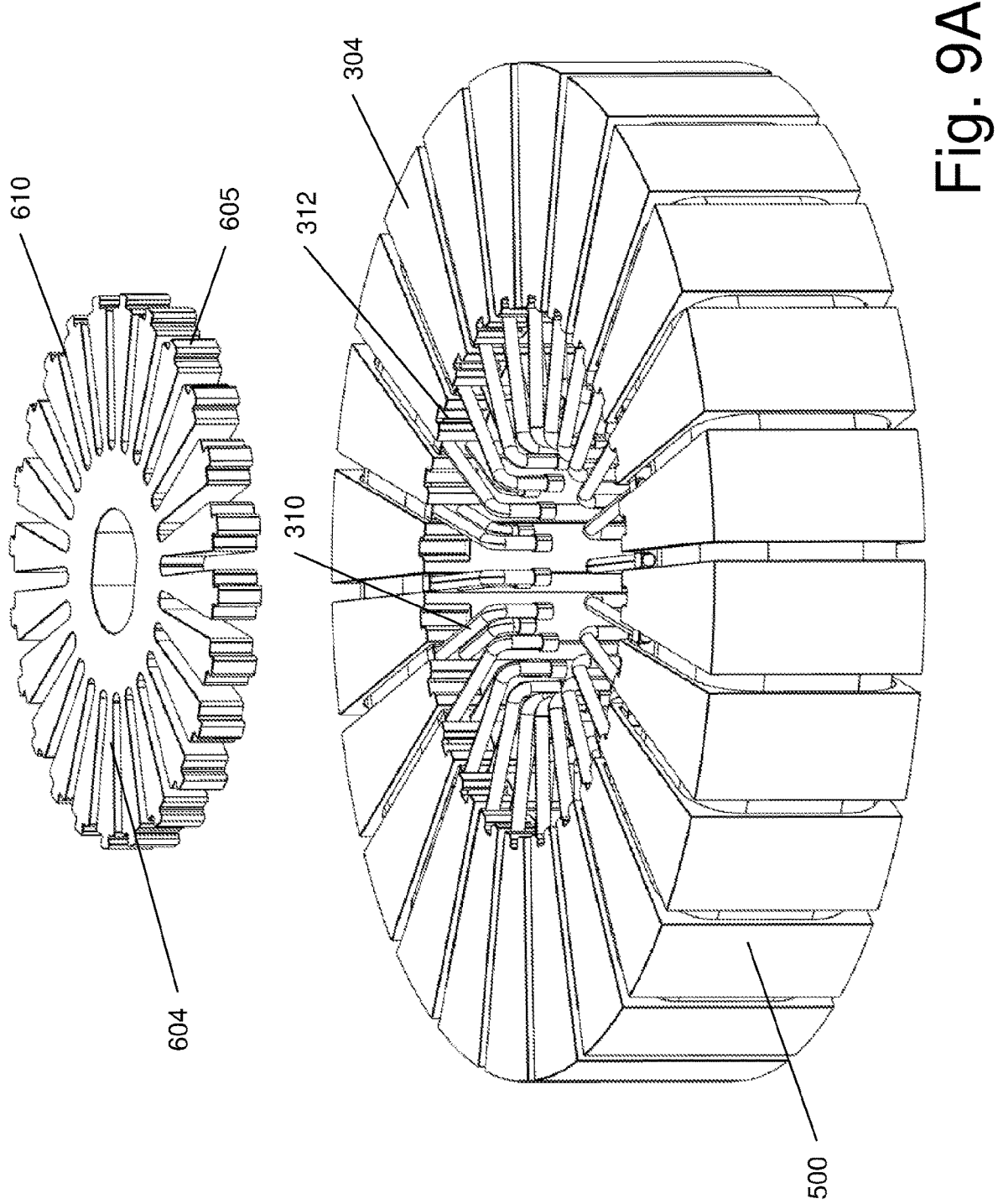
FIG. 9A is an isometric exploded view of the toroidal motor module with the back iron circuit and structural members such as a supporting shaft and bearing assemblies.

Assembling the Electric Machine:

FIG. 9A is an isometric exploded view of the coil assembly 500 and a spider or alignment device 604. In certain embodiments, the spider 604 assists with placement and alignment of the coil modules 300 and is designed to fit within a central interior space of the coil module 500 as illustrated in FIG. 9A.

In certain embodiments, the spider 604 has a plurality of radial arms 610. At the distal end of each arm is a dovetailed engagement notch 605. The engagement notch 605 are sized to be slid into the respective receiving slot 312 formed in the pole portions 304a and 304b of the coil modules 300 (see FIGS. 5A through 5D). The spider 604 helps align the individual coil modules 300 and also indirectly joins the two yoke segments 402a and 402b together (see FIG. 3B). After the spider 604 is in position, a check for overall flatness can determine if the engagement notches 605 are fully within the respective receiving slots 312.

Figure 9B:
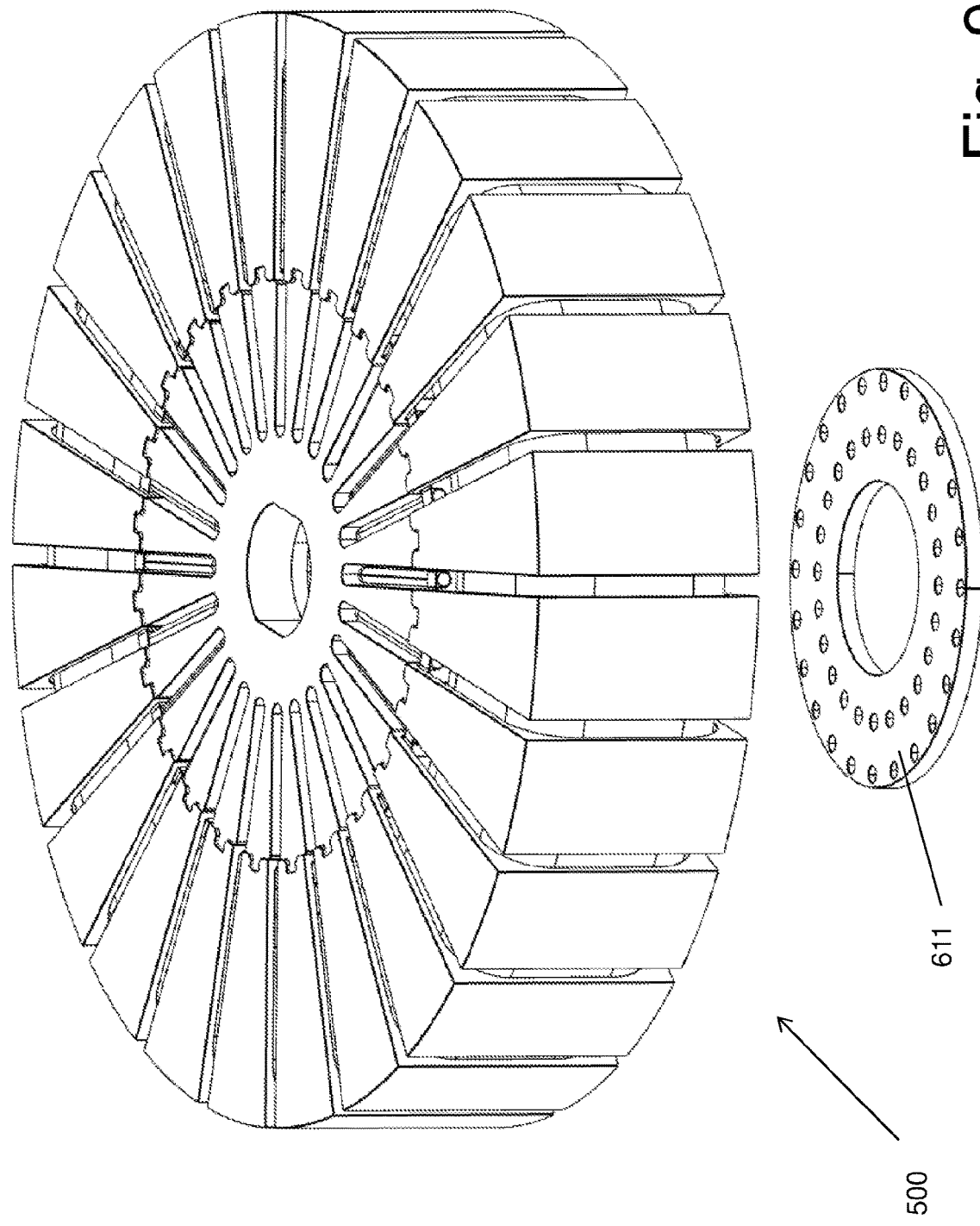
FIG. 9B is an isometric assembled view of the toroidal motor module with the back iron circuit and structural members such as a supporting shaft and bearing assemblies illustrated in FIG. 9A.

Once the spider 604 is in position, a PCB power module 611 can then be added to the coil assembly 500 as illustrated in FIG. 9B. In certain embodiments, the PCB connectors 310

(FIG. 9A) can be electrically coupled to the PCB power module 611 (via soldering). The PCB power module 611 is designed to fit within a central interior space of the coil module 500.

Figure 9C:
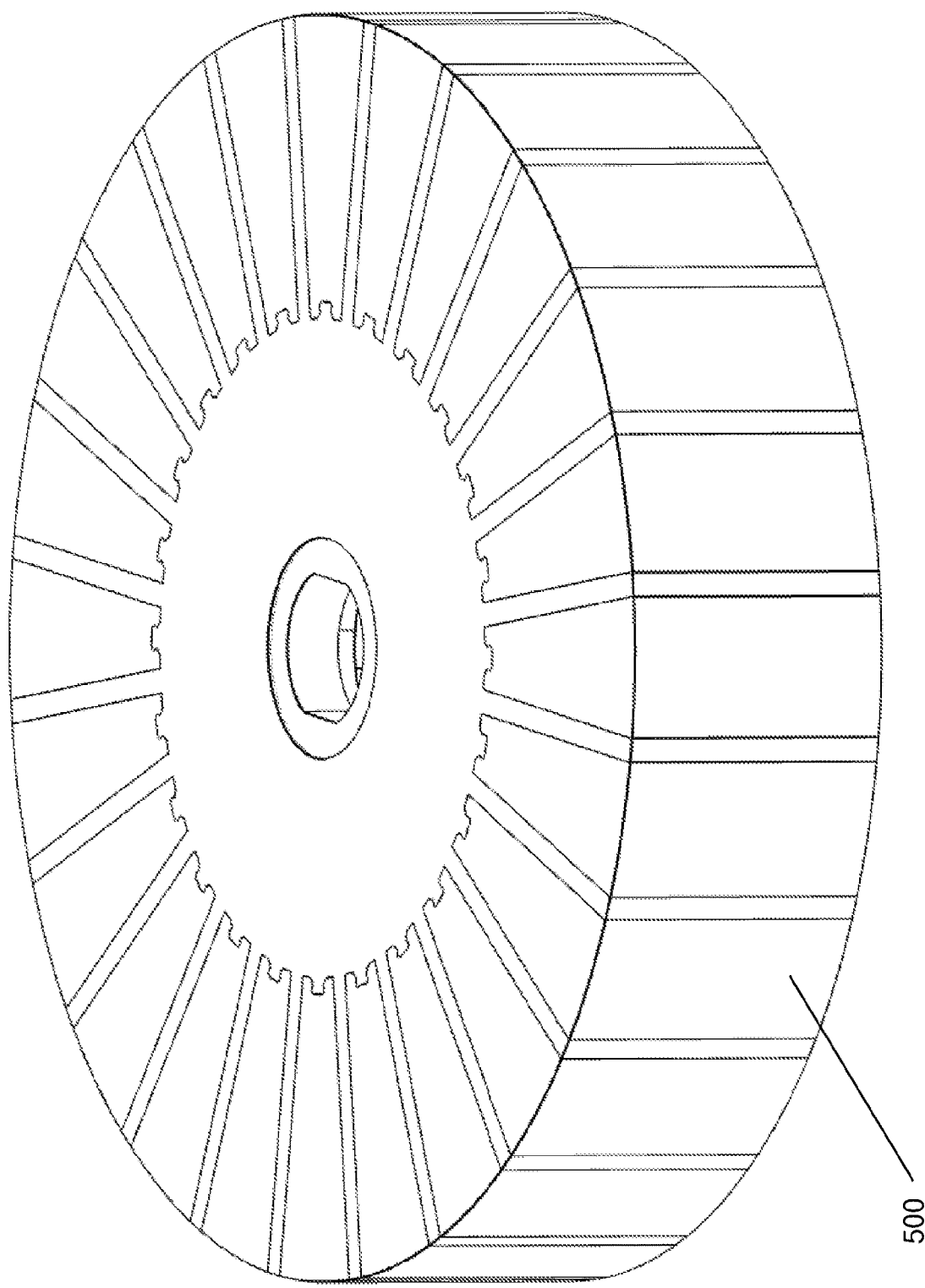
FIGS. 9C and 9D are a schematic representation of the system.

Once the PCB power module 611 has been successfully coupled to the PCB connectors 310, the entire coil assembly may be set into a potting fixture (not shown). In certain embodiments, an epoxy material may be used a potting compound. The potting compound may then be poured into the potting fixture where it will dry. FIG. 9C is an isometric view of the assembled coil module 500 after potting.

Figure 9D:
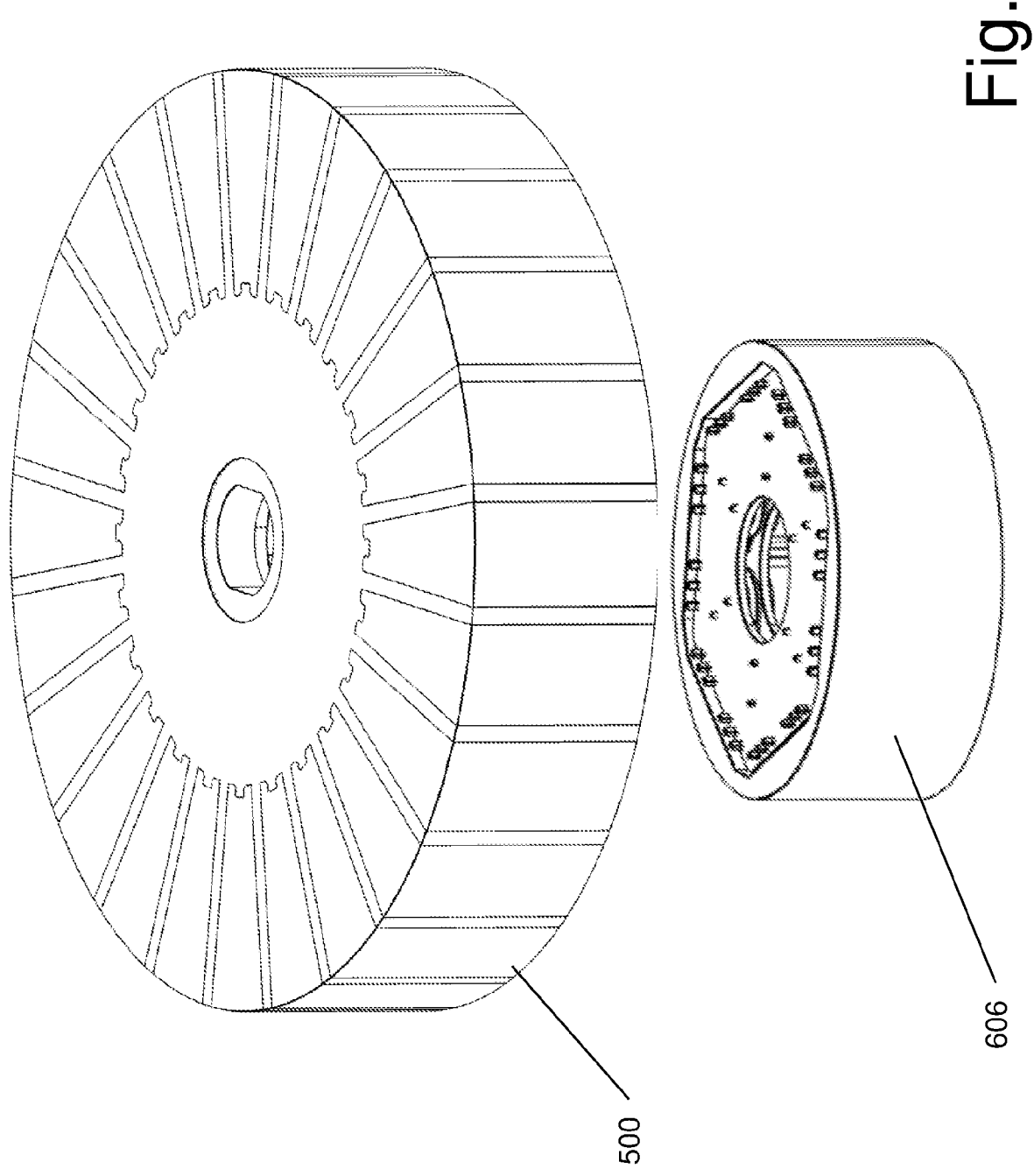

After the potting compound has dried, wires from the PCB power module 602 may be coupled to a controller 606. In certain embodiments, the controller 606 is also designed to fit within an interior central space of the coil module as illustrated in FIG. 9D. In additional embodiments, the controller 606 may be coupled to the PCB power module 602 before potting such that the controller 606 is integrated into the coil assembly 500.

FIG. 10 is an exploded view of the coil assembly 500 and the magnetic toroidal cylinder 200 with the back iron circuit removed for clarity. As previously discussed, the coil assembly 500 is designed to fit within the magnetic toroidal cylinder or tunnel 200 (or alternatively the magnetic toroidal cylinder 292) as illustrated by the exploded isometric view of FIG. 10 which shows the coil assembly module 500 sandwiched between the first magnetic tunnel portion 200a and the second magnetic tunnel portion 200b to form a toroidal electric machine element 550.

In the embodiment illustrated above, the coil assembly 500 is the stator and the magnetic toroidal cylinder 200 is the rotor. In other configurations, the coil assembly 500 may be a rotor and the magnetic toroidal cylinder 200 the stator.

Back Iron Circuit

Figure 11A:
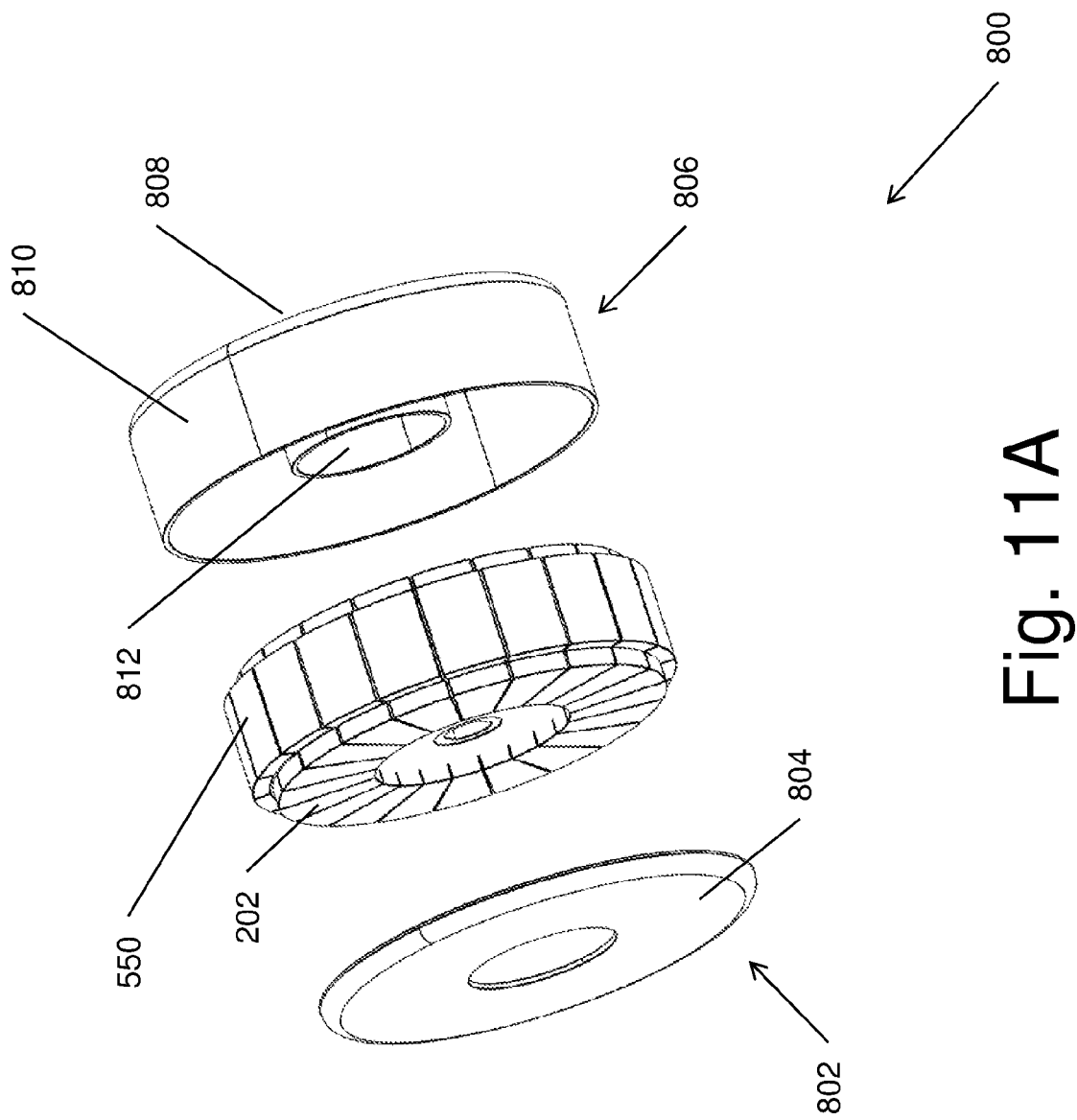
FIG. 11A is a partial isometric drawing illustrating an alternative embodiment for a coil assembly.

FIG. 11A is an isometric exploded view of the toroidal motor element 550 sandwiched between two portions of an optional back iron circuit 800. As discussed above, in certain embodiments using Halbach arrays, the back iron circuit may be reduced or substantially decreased.

The first portion 802 of the back iron circuit 800 comprises a first side wall 804 made of back iron material. The first side wall 804 may be coupled to and provide structural and positioning support for the magnetic cylinder side wall 202. The second portion 806 of the back iron circuit 800 comprises a second side wall 808 and an outer circumferential wall 810, and an inner circumferential wall 812. As illustrated, the outer circumferential wall 810 and the inner circumferential wall 812 protrude longitudinally away from the second side wall 808. The second portion 806 of the back iron circuit provides structural and positioning support for the magnets in the corresponding magnetic walls of the toroidal tunnel 200.

Although FIG. 11A illustrates the back iron circuit 800 apart from the magnetic toroidal cylinder 200, in most embodiments, the magnets forming the magnetic toroidal tunnel 200 would be first positioned and affixed to the back iron circuit during assembly. In some embodiments, therefore, the magnets may be first glued and then potted to the back iron circuit 800. Thus, the back iron circuit provides positioning and structural support for the magnets forming the magnetic toroidal tunnel 200. In embodiments which use a Hallbach array, a housing may be used made from a lighter weight material such as aluminum.

In certain embodiments, the back iron circuit may be used as part of the magnetic flux path. The back iron material channels the magnetic flux produced by the magnetic toroidal cylinder through the back iron material (as opposed to air) to reduce the reluctance of the magnetic circuit. In certain embodiments, therefore, the amount or thickness of the magnets forming the magnetic toroidal cylinder (if permanent magnets are used) may be reduced when using the appropriately designed back iron circuit.

Figure 11B:
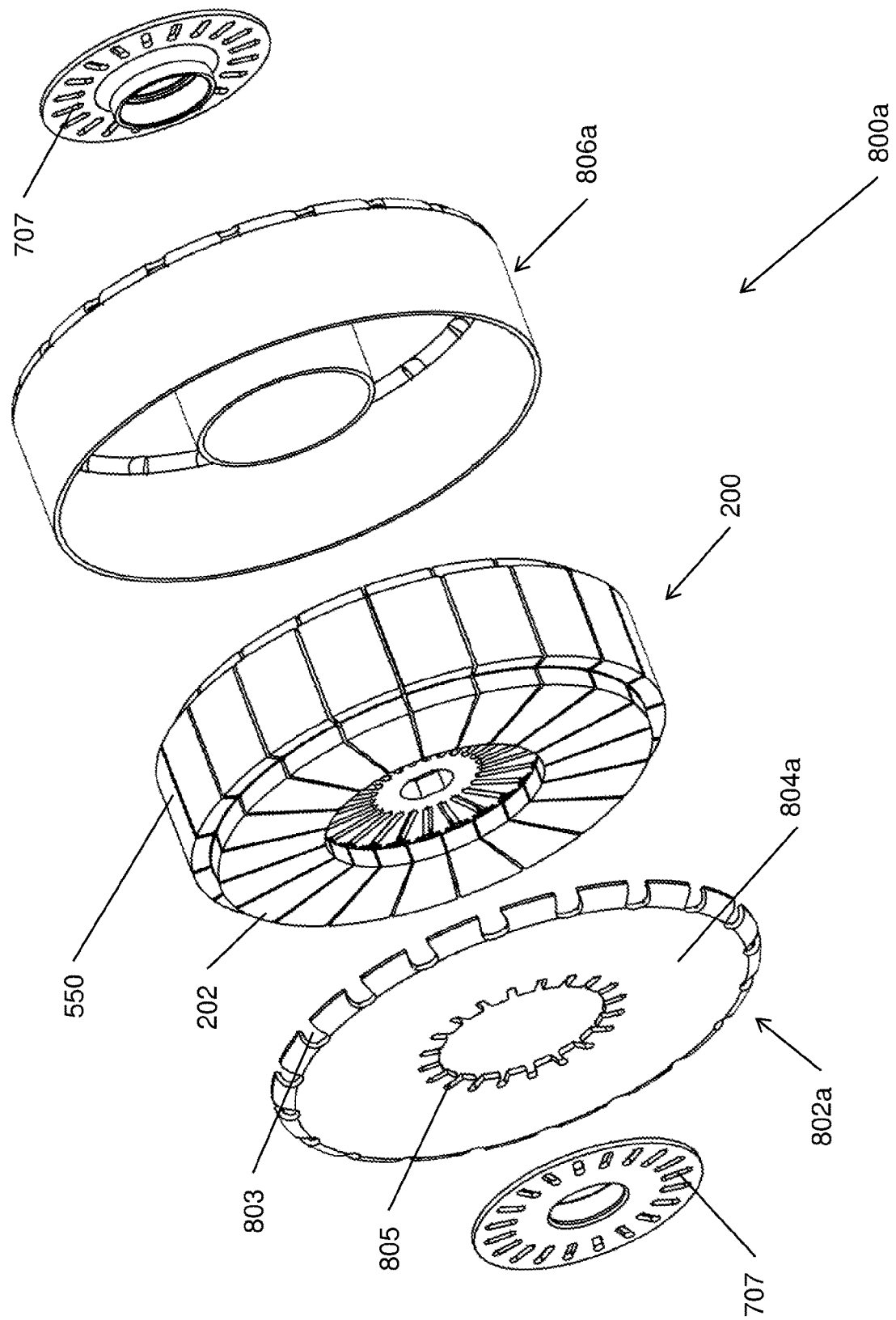
FIG. 11B is a detailed section view of a central core for the alternative embodiment illustrated in FIG. 11A.

In certain embodiments, the back iron circuit may have air flow vents for circulation. Such an embodiment of the back iron circuit 800a with air flow vents is illustrated in FIG. 11B. The back iron circuit 800a in FIG. 11B comprises a first portion 802a including a first side wall 804a made of back iron material. In this embodiment the first side wall 804a includes a plurality of outer notches or vents 803 defined around the outer circumference wherein the notches are sized to induce an air flow. There is also a plurality of inner notches or vents 805 defined around the inner circumference of the first side wall 804a.

The second portion 806a of the back iron circuit 800a is illustrated in FIGS. 11C and 11D. FIG. 11C is a perspective view of the second portion 806a looking at the interior of the back iron circuit while FIG. 11D is a perspective view of the exterior of the second portion of the back iron circuit. Similar to the non-vented back iron circuit portion 806, the second portion 806a comprises a second side wall 808a and an outer circumferential wall 810a, and an inner circumferential wall 812a. As illustrated, the outer circumferential wall 810a and the inner circumferential wall 812a protrude longitudinally away from the second side wall 808a. A plurality of air flow vents 809 are radially spaced about the exterior "corner" formed by the intersection of the second side wall 808a and the outer circumferential wall 810a. Another plurality of air flow vents 811 is radially spaced about the interior corner formed by the intersection of the second side wall 808a and the inner circumferential wall 812a.

Back Iron Materials:

As explained above, the core, poles and back iron circuit may be formed out of back iron materials. For purposes of this application the term "back iron" may refer to iron or a soft magnetic material, such as any ferrous compound or alloy, such as stainless steel, any nickel or cobalt alloy, soft magnetic material, sintered specialty magnetic powder, or any laminated metal comprising laminated sheets of such material. In certain embodiments, such laminated materials may include such Supermendur, Somaloy, or M19-29G.

In some embodiments, the back iron may be produced with a transformer tape winding method using tape wound lamination steel. This production method reduces the waste during the manufacturing process. In yet, other embodiments, the back iron may be electric steel (magnet steel) that also serves as structural integrity due to high rigidity/stiffness while in embodiments using a Halbach array such heavy materials are not needed (although a stiff structure may be required for structural integrity—such as plastic (PEEK), aluminum or carbon fiber).

Figure 12A:
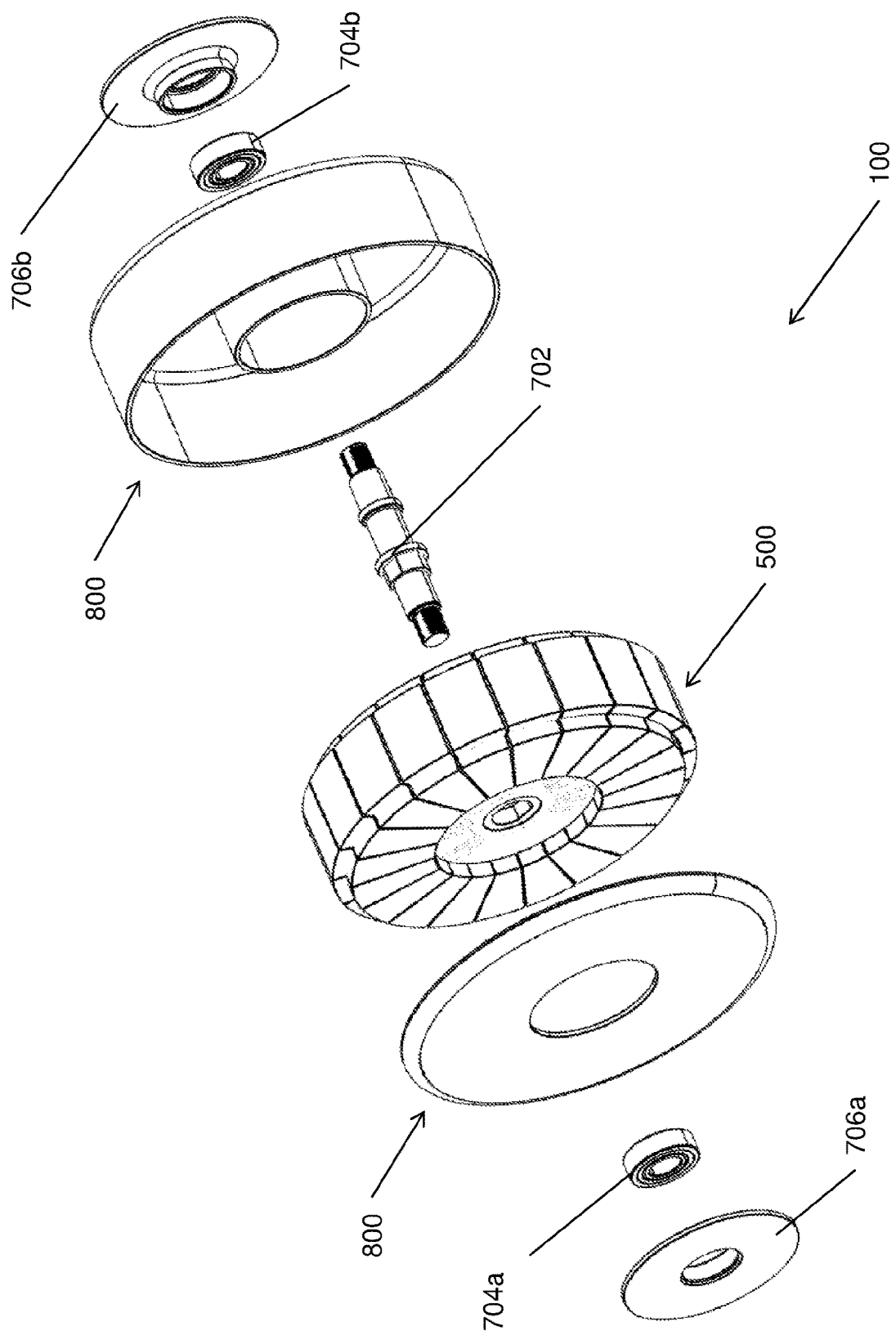
FIGS. 12A and 12B are a schematic representation of the system.
Figure 12B:
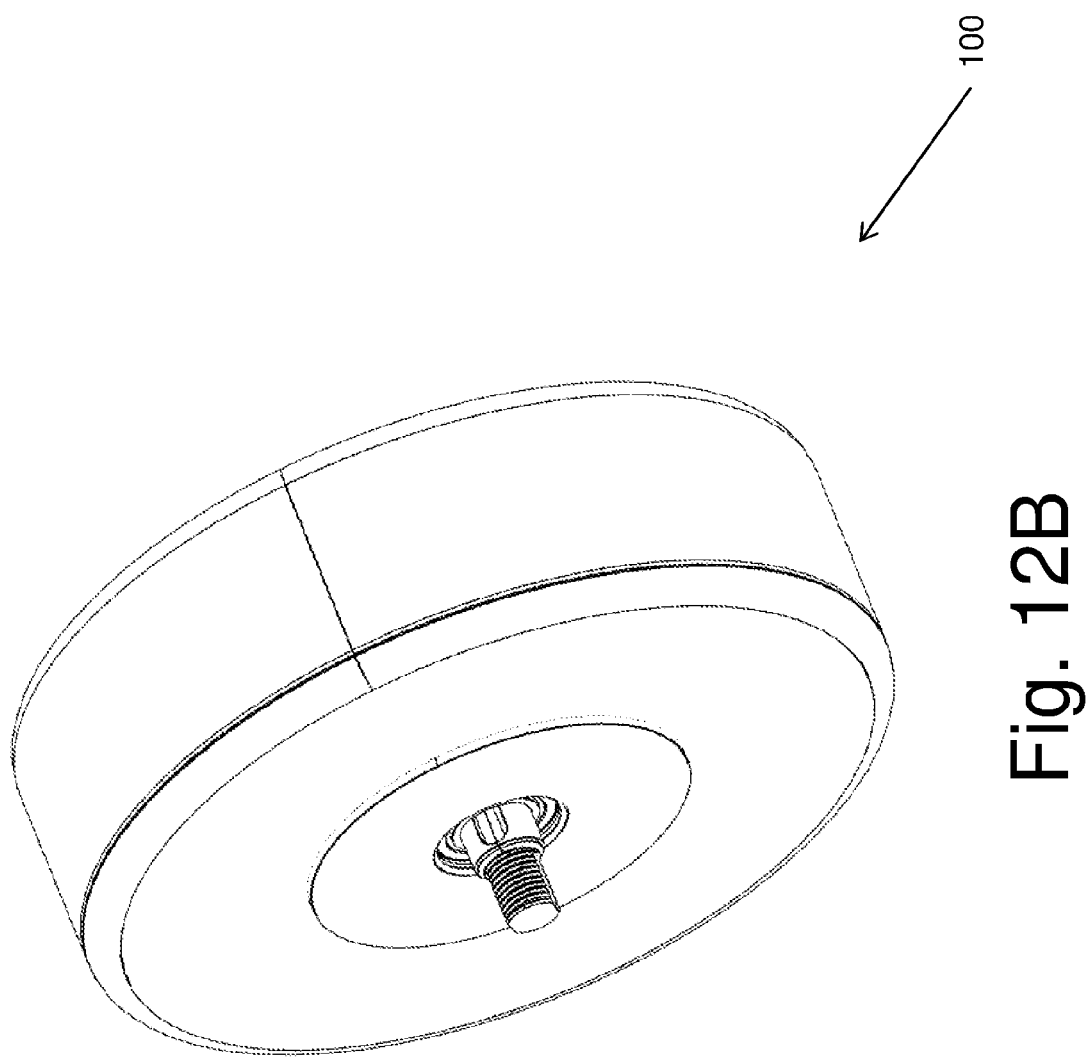

The Center Shaft and Structural Components:

FIG. 12A is an isometric exploded view of the electrical machine 100 illustrating the toroidal electrical machine element 550 with the back iron circuit 800 and structural members exploded. FIG. 12B is an isometric assembled view of the electrical machine 100 illustrating the toroidal electrical machine element 550 with the back iron circuit 800 and structural members assembled.

In certain embodiments, structural members, such as bearing flanges 706a and 706b and bearings 704a and 704b position the electrical machine element 550 about a shaft or axle 702. In other embodiments, such as when the back iron circuit is vented, there may also be a plurality of radially distributed vents 707 defined in the bearing flanges 706a and 706b which align with the vents 805 and vents 811 of the back iron circuit 800a (see FIG. 11B).

Furthermore, the illustrated embodiment is only one way of configuring and supporting the motor modules and/or the coil assembly. In other embodiments the coil assembly may be supported by support ring extending through a center slot between the outer cylindrical walls from the coil assembly to an exterior casing or housing. In yet other embodiments when the coil assembly is functioning as a rotor, the coil assembly may be supported by a support ring extending through a center slot between the inner cylindrical walls from the coil assembly to the a shaft. The exact configuration depends on design choices as to whether the coil assembly is to be the stator or the rotor.

Operation/Controller:

In order maintain the generated torque and/or power the individual coils 526 in the coil assembly may be selectively energized or activated by way of a switching or controller (not shown). The individual coils in the coil assembly may be electrically, physically, and communicatively coupled to switching or controller which selectively and operatively provides electrical current to the individual coils in a conventional manner.

For instance, the controller may cause current to flow within the individual coil when the individual coil is within a magnetic tunnel segment with a NNNN magnetic pole configuration. On the other hand when the same individual coil moves into an adjacent magnetic tunnel segment with a SSSS magnetic pole configuration, the controller causes the current within the individual coil to flow in a direction opposite to so that the generated magnetic force is in the same direction.

The individual coils may use toroidal winding without end windings and in some embodiments be connected to each other in series. In other embodiments, a three phase winding may be used where adjacent coils are connected together to form a branch of each phase. For instance, two adjacent coils may be phase A coils, the next two adjacent coils may be phase B coils, and the next two adjacent coils may be phase C coils. This three phase configuration would then repeat for all individual coils within the coil assembly. In one embodiment, there are eight (8) pairs of adjacent phase A coils for a total of 16 phase A coils. Similarly, there are eight (8) pairs of adjacent phase B coils for a total of 16 phase B coils, and there are eight (8) pairs of adjacent phase C coils for a total of 16 phase C coils. Thus, in such an embodiment, there are 48 individual coils.

When the coils are energized, the three phase winding can produce a rotating magnetic field in the air gap around the coil assembly. The rotating magnetic field interacts with the magnetic field generated by the toroidal magnetic tunnel producing torque and relative movement between the coil assembly and the toroidal magnetic tunnel.

In such embodiments, the individual coils may be connected to a brushless motor controller (not shown) to be activated in a manner known in the art. For each phase, the controller can apply forward current, reverse current, or no current. In operation, the controller applies current to the phases in a sequence that continuously imparts torque to turn the magnetic toroidal cylinder in a desired direction (relative to the coil assembly) in motor mode. In certain embodiments, the controller can decode the rotor position from signals from position sensors or can infer the rotor position based on current drawn by each phase.

In yet other embodiments, a brushed electric machine may be used. In such embodiments, one or more commutators (not shown) may be used and positioned, for instance, within a hub or shaft. In certain embodiments, the number of brushes used may equal the number of toroidal magnetic segments used in the design of the particular electric machine. For instance, if four toroidal magnetic segments are used, then four brushes may be used. The individual coils in the coil assembly may be connected in series having toroidal wound windings. In a brushless design in motor mode, a simplified switching circuit is all that is necessary to switch the current direction as the coils enter and exit the respective toroidal magnetic segment.

Advantages of Certain Embodiments

In conventional configurations, the opposing poles of the magnets are usually aligned longitudinally. Thus, the magnetic flux lines will "hug" or closely follow the surface of the magnets. So, when using conventional power generating/utilization equipment, the clearances must usually be extremely tight in order to be able to act on these lines of force. By aligning like magnetic poles radially or perpendicular to the coil assembly 500 the magnetic flux forces flow from the surface of the magnets across the coil assembly. This configuration allows for greater tolerances between coils and magnetic surfaces.

One of the advantages of this configuration over conventional motors is that the end turns (in this case the radial section of the coils) are part of the "active section" or force generation section of the electric machine. In conventional motors, usually only the axial length of the copper conductor is the section that produces power. In conventional motors, the end turns are a penalty, adding weight and losses, but not producing power because the end region fields are not effectively linking the end windings. However, as explained above, the entire coil winding is effectively producing torque due to the side wall or axial magnets which are axially magnetized. Therefore, essentially the entire conductor of the coils is active producing a greater force.

In sum, certain disclosed embodiments have several advantages when compared to traditional motors and generators. Surrounding the coils with magnets as described above creates more flux density and the forces are now all in the direction of motion which may create more torque, minimize vibration, and minimize noise—as compared to conventional motors where forces may try to pull the coil downwards or push it upwards (depending on the polarity), not in the direction of motion. As discussed above, most of the magnetic fields generated are in the direction of motion so there is little, if any, wasted field structure. Continuous torque and continuous power, therefore, are greatly increased. Furthermore, continuous torque density, continuous power density by volume, and continuous power density by weight are also increased when compared to conventional electric motors.

In certain embodiments, the equivalent full torque is available at start with no or minimal locked rotor current losses. The permanent magnet configuration has reduced inrush current at start.

In certain embodiments, the coil assembly may be compact and yet the coils are easily cooled because they are surrounded by an effective heat sink. Because there is little to no overlap of the coil windings, there is little, if any unwanted field induction—which also contributes to a more efficient design. One of the advantages of this configuration over conventional motors is that the end turns (in this case the radial section of the coils) are part of the "active section" of the invention. In conventional motors, the axial length of the copper conductor is the section that produces power. The end turns are a penalty, adding weight and losses, but not producing power because the end region fields are not effectively linking the end windings. However, in the above disclosed embodiments, the entire coil winding is effectively used to produce torque due to the side wall or axial magnets which are axially magnetized—efficiently utilizing the copper windings.

As discussed above, surrounding the coils with magnets as described above creates more flux density and the forces are now all in the direction of motion which may create more torque, minimize vibration, and minimize noise—as compared to conventional motors where forces may try to pull the coil downwards or push it upwards (depending on the polarity), not in the direction of motion.

Continuous torque and continuous power, therefore, are greatly increased. Furthermore, continuous torque density, continuous power density by volume, and continuous power density by weight are also increased when compared to conventional electric motors.

In a "DC" configuration, the motor may run independent of power line frequency or manufactured frequencies reducing the need for expensive pulse width modulated drive controllers or similar controllers.

The foregoing description of the embodiments of the invention has been presented for the purposes of illustration and description. It is not intended to be exhaustive or to limit the invention to the precise form disclosed. Many combinations, modifications and variations are possible in light of the above teaching. For instance, in certain embodiments, each of the above described components and features may be individually or sequentially combined with other components or features and still be within the scope of the present invention. Undescribed embodiments which have interchanged components are still within the scope of the present invention. It is intended that the scope of the invention be limited not by this detailed description, but rather by the claims or future claims supported by the disclosure.

For instance, in certain embodiments, there may be a rotary electric machine comprising: a magnetic toroidal cylinder radially arranged about an axial axis to form a circular path, the magnetic toroidal cylinder comprising: a first plurality of magnetic tunnel segments, wherein each magnetic tunnel segment of the first plurality of magnetic tunnel comprises: a first magnetic outer wall; a first magnetic inner wall; a first side magnetic wall; a first side opposing magnetic wall; wherein each magnetic tunnel segment of the first plurality of magnetic tunnel segment has an NNNN magnetic polarity configuration; a second plurality of magnetic tunnel segments, wherein each magnetic tunnel segment of the second plurality of magnetic tunnel segments is interspersed between the individual tunnel segments of the first plurality of tunnel segments and each magnetic tunnel segment of the second plurality of tunnel segments comprises: a second magnetic outer wall; a second magnetic inner wall; a second side magnetic wall; a second side opposing magnetic wall; wherein each magnetic tunnel segment of the second plurality of magnetic tunnel segment has a SSSS magnetic polarity configuration; a coil assembly positioned within the magnetic toroidal cylinder, the coil assembly comprising: a circular yoke, a plurality of coil modules radially positioned about the longitudinal axis and wherein a portion of the coil goes through an aperture defined in each coil module, wherein each coil module comprises; at least one coil winding, a PCB module positioned radially adjacent to an inside face of the coil winding and is electrically coupled to the coil winding and having a PCB connector for electrically connecting the coil to a controller or a PCB power module, at least one stator pole positioned on the yoke adjacent to the coil winding wherein the stator pole consists of a vertical element, an outer face, an inner face, a side face, and an opposing side face wherein the faces are wider than the vertical element to define recesses on each side of the stator pole sized to partially enclose adjacent coils and the PCB board, an alignment feature formed on the interior side of each coil module; at least one alignment ring having a plurality of alignment spokes sized and shaped to couple to the alignment feature of each coil module; the controller in electronic communication with the plurality of coil modules, the controller positioned within the space created by the plurality of first magnetic inner walls and by the plurality of second magnetic inner walls.

There may also be a rotary electric machine comprising: a magnetic toroidal cylinder radially arranged about an axial axis to form a circular path, the magnetic toroidal cylinder comprising: a first magnetic outer wall; a first magnetic inner wall; a first side magnetic wall; a first side opposing magnetic wall; wherein each magnetic wall comprises a plurality of Halbach arrays wherein a strong side of each Halbach array faces inward and each Halbach array is radially aligned with the Halbach arrays of the other walls to form regions of NNNN magnetic polarities and gradually alternating to regions of SSSS magnetic polarities within the magnetic toroidal cylinder; a coil assembly positioned within the magnetic toroidal cylinder, the coil assembly comprising, a circular yoke; a plurality of coil windings radially arranged about the longitudinal axis and positioned on the circular yoke; a first plurality of laminated stator poles radially arranged about the longitudinal axis and interspersed within the plurality of coil windings on the circular yoke, wherein each laminated stator pole in the first plurality of laminated stator poles has a notch sized to engage a portion of the circular yoke; a second plurality of laminated stator poles radially arranged about the longitudinal axis and interspersed within the plurality of coil windings on the circular yoke and axially aligned with the first plurality of laminated stator poles.

There may also be the embodiments described above, wherein the coil module further comprises a bobbin having an aperture sized to fit over the yoke and the coil is wound around the bobbin.

There may also be the embodiments described above, wherein the coil module further comprises a second stator pole positioned on an opposing and adjacent side of the coil wherein the stator pole and the second stator pole function together to operate as single stator pole for phasing purposes.

There may also be the embodiments described above, wherein the recesses of the stator pole on each side of the stator pole is sized to also partially enclose the bobbin surrounded by an adjacent coil winding.

There may also be the embodiments described above, wherein the coil module further comprises a spacer positioned adjacent to the stator poles for electrically isolating the stator poles and for conducting heat away from the coils and stator poles.

There may also be the embodiments described above, wherein the yoke comprises a first semi-circular portion and a second semi-circular portion.

There may also be the embodiments described above, wherein the first semi-circular portion includes a first coupling extension at a first end and a second coupling extension at the second end.

There may also be the embodiments described above, wherein the second semi-circular portion includes a third coupling extension at a third end and a fourth coupling extension at the fourth end, wherein the third coupling extension is shaped to mate with the first coupling extension and the fourth coupling extension is shaped to mate with the second coupling extension.

There may also be the embodiments described above, wherein the yoke is formed from laminated electrical steel tape wherein the laminations are generally parallel to the direction of the axial axis.

There may also be the embodiments described above, wherein the yoke is formed from laminated electrical steel tape wherein the laminations are generally perpendicular to the direction of the axial axis.

There may also be the embodiments described above, wherein the yoke is formed from tape wound soft-magnetic laminated steel having one area in cross-section which has a lower relative permeability than a second area in cross-section having a higher relative permeability.

There may also be the embodiments described above, wherein the yoke is formed from ferromagnetic open cell foam material which is infused with a structural support matrix made of thermoset or thermoplastic resin material.

There may also be the embodiments described above, wherein the yoke is formed from ferromagnetic open cell foam material which is infused with a dissimilar ferrous metal matrix.

There may also be the embodiments described above, wherein the yoke is formed from ferromagnetic open cell foam material which is infused with a non-ferrous metal matrix.

There may also be the embodiments described above, where the stator poles are made from a laminated material having planes of laminations which are generally radial to the axial axis.

There may also be the embodiments described above, where the stator poles are made from a laminated material having planes of laminations which are generally radial to the axial axis and the stator poles also defining flux-shaping cavities configured to optimize a flux density distribution within the stator poles and the yoke.

There may also be the embodiments described above, where the stator poles are formed from soft magnetic material.

There may also be the embodiments described above, where the stator poles are made from planes of material of different sizes laminated together such that the stator poles will have a different thickness at one exterior edge than the opposing interior edge.

There may also be the embodiments described above, wherein the stator poles are made from two halves of laminated material, each half having an indent sized to engage the yoke.

There may also be the embodiments described above, including at least one alignment ring sized and shaped to radially align the first or second plurality of stator poles; and the controller in electronic communication with the plurality of coil windings, the controller positioned within the space created by the plurality of first magnetic inner walls and by the plurality of second magnetic inner walls.

There may also be the embodiments described above, wherein each laminated stator pole in the second plurality of laminated stator poles has a notch sized to engage a portion of the circular yoke.

There may also be a method of manufacturing a coil assembly, the method comprising: providing a bobbin with a first central aperture; winding a wire around the bobbin to form a coil winding, coupling a PCB module to an inside face of the coil winding and electrically coupling the coil winding to the PCB module; positioning the bobbin, the coil winding, and PCB module within a recess of a pole portion to form a coil module, wherein the pole portion also defines a second central aperture; repeating the providing, winding, coupling, and positioning steps above to form a plurality of coil modules; sliding a single coil module of the plurality of coil modules over a first semi-circular yoke segment; sliding additional coil modules over the first semi-circular yoke segment until a predetermined number of coil modules has been positioned onto the first semi-circular yoke segment; sliding another single coil module of the plurality of coil modules over a second semi-circular yoke segment; sliding additional coil modules over the second semi-circular yoke segment until a second predetermined number of coil modules has been positioned onto the second semi-circular yoke segment; and joining the first semi-circular yoke segment to the second semi-circular yoke segment to form a complete coil assembly.

There may also be the embodiments described above, further comprising coupling a spacer to the stator pole when forming the coil module.

There may also be the embodiments described above, further comprising coupling an alignment ring to alignment notches on each of the plurality of coil modules to the stator pole when forming the coil module.

There is also a method of manufacturing an electric machine, the method comprising: providing a bobbin with a first central aperture; winding a wire around the bobbin to form a coil winding, coupling a PCB module to an inside face of the coil winding and electrically coupling the coil winding to the PCB module; positioning the bobbin, the coil winding, and PCB module within a recess of a pole portion to form a coil module, wherein the pole portion also defines a second central aperture; repeating the providing, winding, coupling, and positioning steps above to form a plurality of coil modules; sliding a single coil module of the plurality of coil modules over a first semi-circular yoke segment; sliding additional coil modules over the first semi-circular yoke segment until a predetermined number of coil modules has been positioned onto the first semi-circular yoke segment; sliding another single coil module of the plurality of coil modules over a second semi-circular yoke segment; sliding additional coil modules over the second semi-circular yoke segment until a second predetermined number of coil modules has been positioned onto the second semi-circular yoke segment; joining the first semi-circular yoke segment to the second semi-circular yoke segment to form a complete coil assembly; coupling an alignment ring to alignment notches on each of the plurality of coil modules to the stator pole when forming the coil module; positioning the coil assembly with toroidal magnetic cylinder comprising an outer cylindrical wall, an inner cylindrical wall, a first magnetic side wall, a second magnetic side wall; and electrically coupling the coil modules to an electrical controller to form an electric machine.

There may also be the embodiments described above, further comprising coupling a spacer to the stator pole when forming the coil module.

The invention claimed is:

1. A rotary electric machine comprising:
a magnetic toroidal cylinder radially arranged about a motor axis and comprising:
  a first magnetic tunnel segment comprising a first set of magnetic elements defining a first magnetic polarity configuration; and
  a second magnetic tunnel segment:
    arranged adjacent the first magnetic tunnel segment; and
    comprising a second set of magnetic elements defining a second magnetic polarity configuration, opposite the first magnetic polarity configuration; and
a coil assembly positioned within the magnetic toroidal cylinder, the coil assembly comprising:
  a yoke;
  a set of coil modules radially positioned about the motor axis and coupled to the yoke, wherein each coil module, in the set of coil modules, comprises;
    a coil winding;
    an electrical interface module:
      positioned radially adjacent to an inside face of the coil winding and electrically coupled to the coil winding; and
      comprising a connector electrically coupling the coil winding to a controller;
    a stator pole:
      arranged on the circular yoke adjacent to the coil winding;
      comprising a vertical element, an outer face, an inner face, a side face, and an opposing side face; and
      defining a recess arranged about the stator pole and configured to partially enclose adjacent coil windings and the electrical interface module.

2. The rotary electric machine of claim 1:
wherein the first set of magnetic elements comprises:
  a first inner radial magnetic wall;
  a first outer radial magnetic wall;
  a first upper axial magnetic wall; and
  a first lower axial magnetic wall, cooperating with the first inner radial magnetic wall, the first outer radial magnetic wall, and the first upper axial magnetic wall to form the first magnetic tunnel segment enclosing the set of coil modules; and
wherein the second set of magnetic elements comprises:
  a second inner radial magnetic wall;
  a second outer radial magnetic wall;
  a second upper axial magnetic wall; and
  a second lower axial magnetic wall, cooperating with the second inner radial magnetic wall, the second outer radial magnetic wall, and the second upper axial magnetic wall to form the second magnetic tunnel segment, adjacent the first magnetic tunnel segment, and enclosing the set of coil modules.

3. The rotary electric machine of claim 2:
wherein the first set of magnetic elements comprises a NNNN magnetic polarity configuration; and
wherein the second set of magnetic elements comprises a SSSS magnetic polarity configuration.

4. The rotary electric machine of claim 1:
wherein each coil module, in the set of coil modules, comprises an alignment feature arranged on an inner side of the coil module; and
further comprising an alignment ring comprising a set of spokes coupling the alignment feature, of each coil module in the set of coil modules, to locate the alignment ring radially enclosed within the set of coil modules.

5. A rotary electric machine comprising:
a set of coil modules:
  radially arranged about a motor axis;
  defining an inner radial facet, an outer radial facet, a first axial facet, and a second axial facet opposite the first axial facet; and
  comprising a first coil module comprising:
    a first coil winding;
    a first electrical interface module arranged on an inner radial side of the first coil winding and electrically coupled to the first coil winding; and
    a first connector coupled to the first electrical interface module and extending from the inner radial side of the first coil winding;
a set of magnetic elements:
  encompassing the inner radial facet, the outer radial facet, the first axial facet, and the second axial facet of the set of coil modules;
  forming a magnetic toroidal cylinder about the motor axis; and
  configured to generate a flux density distribution focused toward the set of coil modules; and
a controller:
  electrically coupled to the first connector of the first coil module; and
  configured to drive current through the set of coil modules to generate a toroidal magnetic field tunnel configured to sequentially and magnetically couple the set of magnetic elements.

6. The rotary electric machine of claim 5, wherein the magnetic toroidal cylinder comprises:
a first magnetic tunnel segment comprising a first subset of magnetic elements, in the set of magnetic elements, defining a first magnetic polarity configuration; and
a second magnetic tunnel segment:
  arranged adjacent the first magnetic tunnel segment; and
  comprising a second subset of magnetic elements, in the set of magnetic elements, defining a second magnetic polarity configuration opposite the first magnetic polarity configuration.

7. The rotary electric machine of claim 5, wherein the set of magnetic elements comprises:
a first subset of magnetic elements defining a NNNN magnetic polarity configuration and comprising:
  a first inner radial magnetic wall;
  a first outer radial magnetic wall;
  a first upper axial magnetic wall; and
  a first lower axial magnetic wall, cooperating with the first inner radial magnetic wall, the first outer radial magnetic wall, and the first upper axial magnetic wall to form the first magnetic tunnel segment enclosing the set of coil modules; and
a second subset of magnetic elements defining a SSSS magnetic polarity configuration and comprising:
  a second inner radial magnetic wall;
  a second outer radial magnetic wall;
  a second upper axial magnetic wall; and
  a second lower axial magnetic wall, cooperating with the second inner radial magnetic wall, the second outer radial magnetic wall, and the second upper axial magnetic wall to form the second magnetic tunnel segment, adjacent the first magnetic tunnel segment, enclosing the set of coil modules.

8. The rotary electric machine of claim 5:
wherein the first coil module further comprises:
  a first pole structure tapering toward the motor axis; and
  a second pole structure:
    tapering toward the motor axis;
    radially offset the first pole structure to define a radial interstice between the first pole structure and the second pole structure; and
    cooperating with the first pole structure to generate a three-dimensional flux path between the first pole structure and the second pole structure; and
wherein the first coil winding is arranged in the radial interstice between the first pole structure and the second pole structure.

9. The rotary electric machine of claim 8:
wherein the first pole structure comprises:
  a first set of flat magnetic elements arranged to form a first crescent shape; and
  a second set of flat magnetic elements arranged to form a second crescent shape coupled to the first crescent shape to form a first radial slot within the first pole structure;
wherein the second pole structure comprises:
  a third set of flat magnetic elements arranged to form a third crescent shape; and
  a fourth set of flat magnetic elements arranged to form a fourth crescent shape coupled to the third crescent shape to form a second radial slot within the second pole structure in radial alignment with the first radial slot of the first pole structure; and
further comprising a cylindrical yoke arranged about the motor axis and located within the first radial slot of the first pole structure and the second radial slot of the second pole structure.

10. The rotary electric machine of claim 8:
wherein the first pole structure comprises:
  a first set of magnetic elements arranged to form a first rectangular wedge tapered toward the motor axis; and
  a first radial slot arranged on a center of the first rectangular wedge;
wherein the second pole structure comprises:
  a second set of magnetic elements arranged to form a second rectangular wedge, radially offset the first rectangular wedge, tapered toward the motor axis; and
  a second radial slot arranged on a center of the second rectangular wedge and radially aligned to the first radial slot; and
further comprising a cylindrical yoke arranged about the motor axis and located within the first radial slot of the first pole structure and the second radial slot of the second pole structure.

11. The rotary electric machine of claim 5:
wherein the first coil module further comprises:
  a first pole structure:
    arranged adjacent a first side of the first coil winding;
    comprising a first rectangular wedge formed of a ferrous material tapering toward the motor axis; and
    defining a first recess arranged on a lateral side of the first pole structure; and
  a second pole structure:
    radially offset the first pole structure;
    arranged adjacent a second side, opposite the first side, of the first coil winding;
    comprising a second rectangular wedge formed of the ferrous material tapering toward the motor axis; and
    defining a second recess arranged on a lateral side of the second pole structure facing the first recess of the first pole structure; and
wherein the first coil winding is nested within the first recess of the first pole structure and the second recess of the second pole structure to locate the first electrical interface module on the inner radial side of the first coil winding.

12. The rotary electric machine of claim 11:
wherein the first pole structure further comprises a first slot arranged on an inner radial side of the first pole structure and adjacent a first side of the first connector extending from the first electrical interface module;
wherein the second pole structure comprises a second slot arranged on an inner radial side of the second pole structure and adjacent a second side, opposite the first side, of the first connector extending from the first electrical interface module; and
further comprising:
  an alignment ring comprising a set of spokes arranged radially about the alignment ring coupling the first slot of the first pole structure and the second slot of the second pole structure to locate the alignment ring radially enclosed within the set of coil modules; and
  a shaft coupled to the alignment ring and arranged in alignment with the motor axis.

13. The rotary electric machine of claim 11:
wherein the first coil module further comprises:
  the first pole structure defining a first aperture;
  the second pole structure defining a second aperture in radial alignment with the first aperture; and
  a first bobbin:
    interposed between the first pole structure and the second pole structure;
    comprising the first coil winding wound about the first bobbin; and
    defining a third aperture in radial alignment with the first aperture and the second aperture; and
further comprising a cylindrical yoke arranged about the motor axis and extending through the first aperture, second aperture, and the third aperture.

14. The rotary electric machine of claim 5, further comprising a cylindrical yoke arranged about the motor axis and coupled to the set of coil modules, the cylindrical yoke formed of a ferromagnetic open cell foam material infused with a non-ferrous metal matrix.

15. The rotary electric machine of claim 5, further comprising a back iron circuit comprising:
  a first outer plate:
    defining a first set of outer slots; and
    comprising a first subset of axial magnetic elements, in the set of magnetic elements, arranged at the first set of outer slots and facing the first axial facet of the set of coil modules;
  a second outer plate:
    arranged opposite the first outer plate;
    defining a second set of outer slots; and
    comprising a second subset of axial magnetic elements, in the set of magnetic elements, arranged at the second set of outer slots and facing the second axial facet of the set of coil modules; and
  an outer radial wall:
    interposed between the first outer plate and the second outer plate;

defining a set of outer radial slots arranged about the outer radial wall; and comprising a subset of outer radial magnetic elements, in the set of magnetic elements, arranged at the set of outer radial slots and facing the outer radial facet of the set of coil modules.

16. The rotary electric machine of claim 15:

wherein the back iron circuit further comprises an inner rotor core:

arranged within an inner radius of the set of coil modules;

defining a set of inner slots arranged about the inner rotor core;

comprising a subset of inner radial magnetic elements, in the set of magnetic elements, arranged at the set of inner slots and facing the inner radial facet of the set of coil modules; and cooperating with the first outer plate, second outer plate, and outer radial wall to form a cylindrical magnetic tunnel enveloping the set of stator pole assemblies; and further comprising a shaft coupled to the inner rotor core and arranged in alignment with the motor axis.

17. The rotary electric machine of claim 5, wherein the set of magnetic elements comprises:

a first subset of axial magnetic walls arranged in a radial pattern about the first axial facet of the set of coil modules;

a second subset of axial magnetic walls arranged in a radial pattern about the second axial facet, opposite the first axial facet, of the set of coil modules;

a subset of inner radial magnetic walls arranged in a radial pattern about the inner radial facet of the set of coil modules; and a subset of outer radial magnetic walls arranged in a radial pattern about the outer radial facet of the set of coil modules and cooperating with the first subset of axial magnetic walls, the second subset of axial magnetic walls, and the subset of inner radial magnetic walls to form a cylindrical magnetic tunnel enveloping the set of coil modules.

18. The rotary electric machine of claim 5, further comprising:

a stator yoke comprising:

a first yoke segment extending radially about the motor axis; and a second yoke segment:

coupled at a first end and a second end of the first yoke segment;

extending radially about the motor axis; and cooperating with the first yoke segment to define a cylindrical yoke for the set of stator pole assemblies; and a set of stator pole assemblies comprising:

a first subset of stator pole assemblies radially arranged about the first yoke segment to define a first set of radial interstices; and a second subset of stator pole assemblies:

radially arranged about the second yoke segment to define a second set of radial interstices; and cooperating with the first subset of stator pole assemblies to form a ring stator core of circumferential stator poles and radial interstices.

19. A system for a rotary electric machine comprising:

a set of coil modules:

radially arranged about a motor axis;

comprising a first coil module comprising:

a first coil winding;

a first electrical interface module arranged on an inner radial side of the first coil winding and electrically coupled to the first coil winding; and a first connector coupled to the first electrical interface module and extending from the inner radial side of the first coil winding;

a set of magnetic elements arranged about the motor axis and forming a magnetic toroidal cylinder enclosing the set of coil modules; and a controller:

arranged within an inner radius of the set of coil modules and electrically coupled to the first connector of the first coil module; and configured to drive current through the set of coil modules to generate a toroidal magnetic field tunnel configured to sequentially and magnetically couple the set of magnetic elements.

20. The rotary electric machine of claim 19, wherein the set of magnetic elements:

encompasses an inner radial facet, an outer radial facet, a first axial facet, and a second axial facet of the set of coil modules; and comprises:

a first magnetic tunnel segment comprising a first subset of magnetic elements, in the set of magnetic elements, defining a first magnetic polarity configuration; and a second magnetic tunnel segment:

arranged adjacent the first magnetic tunnel segment; and comprising a second subset of magnetic elements, in the set of magnetic elements, defining a second magnetic polarity configuration opposite the first magnetic polarity configuration.

* * * * *